Nov. 10, 1942.  L. F. J. ARNOLD  2,301,184
ELECTRICAL CLARINET
Filed Jan. 23, 1941  12 Sheets-Sheet 1

Inventor
Leo F. J. Arnold
By Francis H. Vandewater
Attorney

Nov. 10, 1942.　　　L. F. J. ARNOLD　　　2,301,184
ELECTRICAL CLARINET
Filed Jan. 23, 1941　　　12 Sheets-Sheet 2
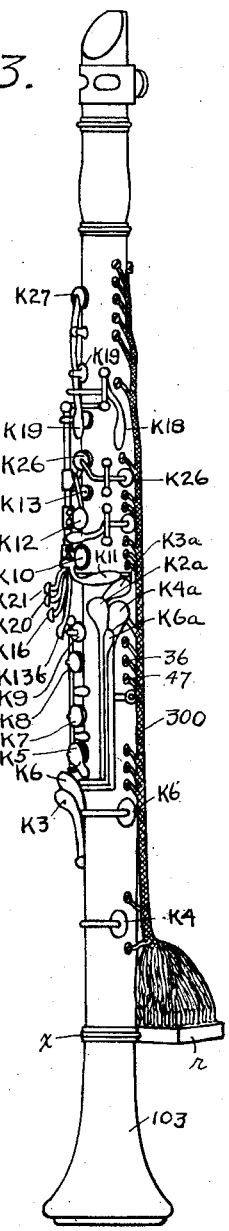
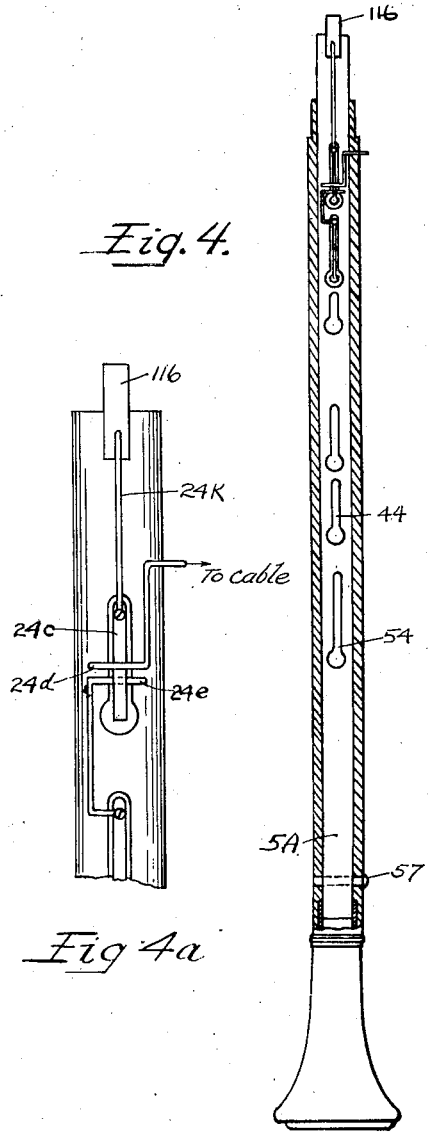
Inventor
Leo F. J. Arnold
By Francis H. Vanderwerken
Attorney

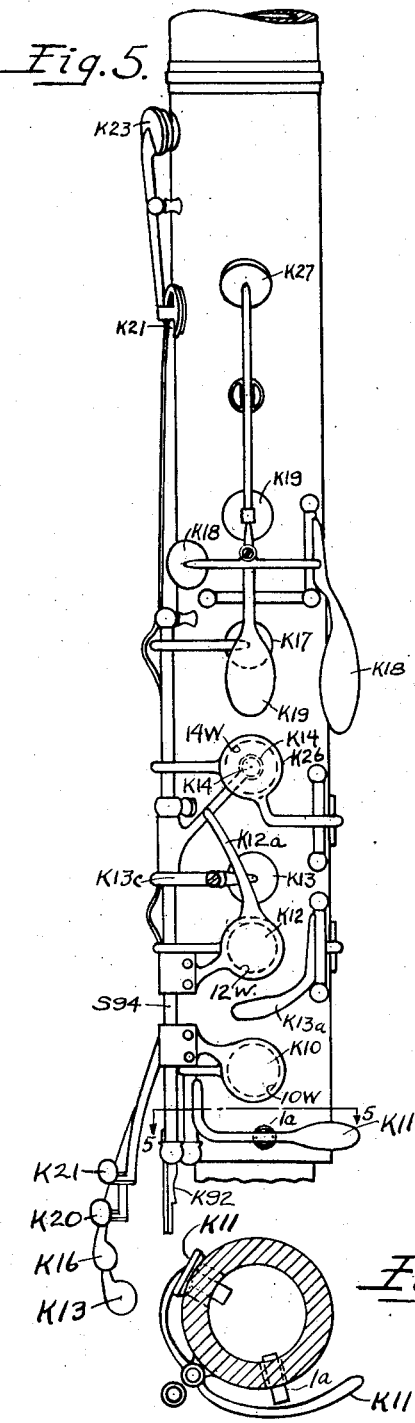
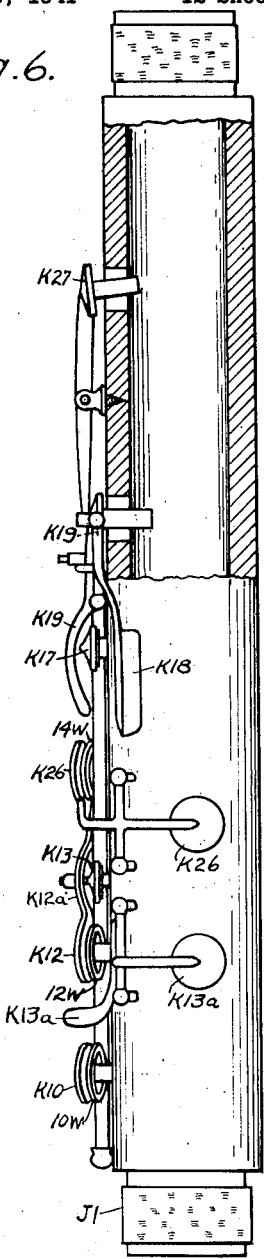

Nov. 10, 1942.　　　L. F. J. ARNOLD　　　2,301,184
ELECTRICAL CLARINET
Filed Jan. 23, 1941　　　12 Sheets-Sheet 4

Inventor
Leo F J Arnold
By Francis H Vandeveer
Attorney

Nov. 10, 1942. L. F. J. ARNOLD 2,301,184
ELECTRICAL CLARINET
Filed Jan. 23, 1941 12 Sheets-Sheet 5
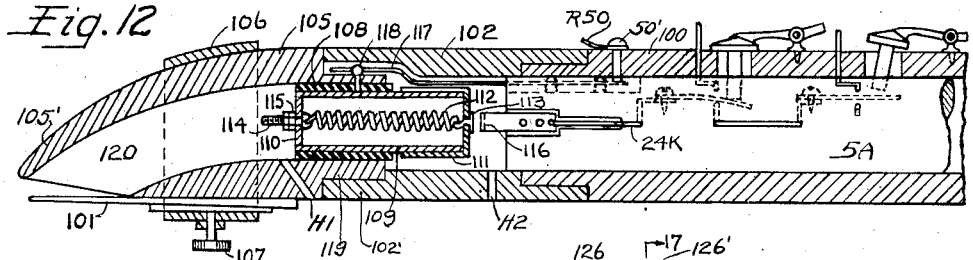
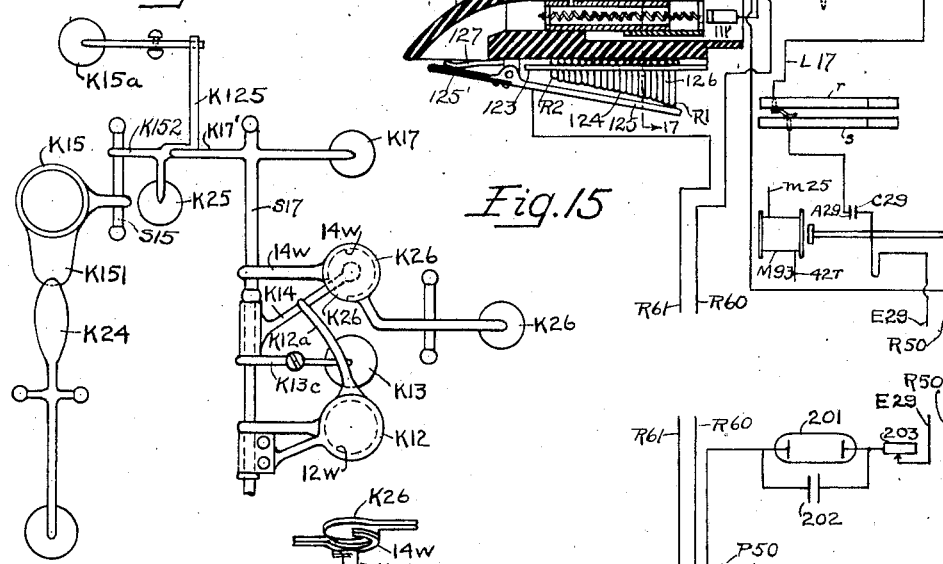
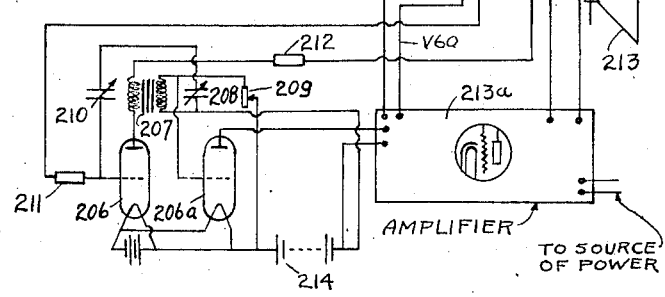
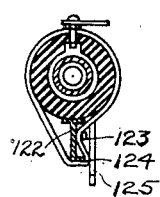
Inventor
Leo F. J. Arnold
By Francis H. Vandewater
Attorney

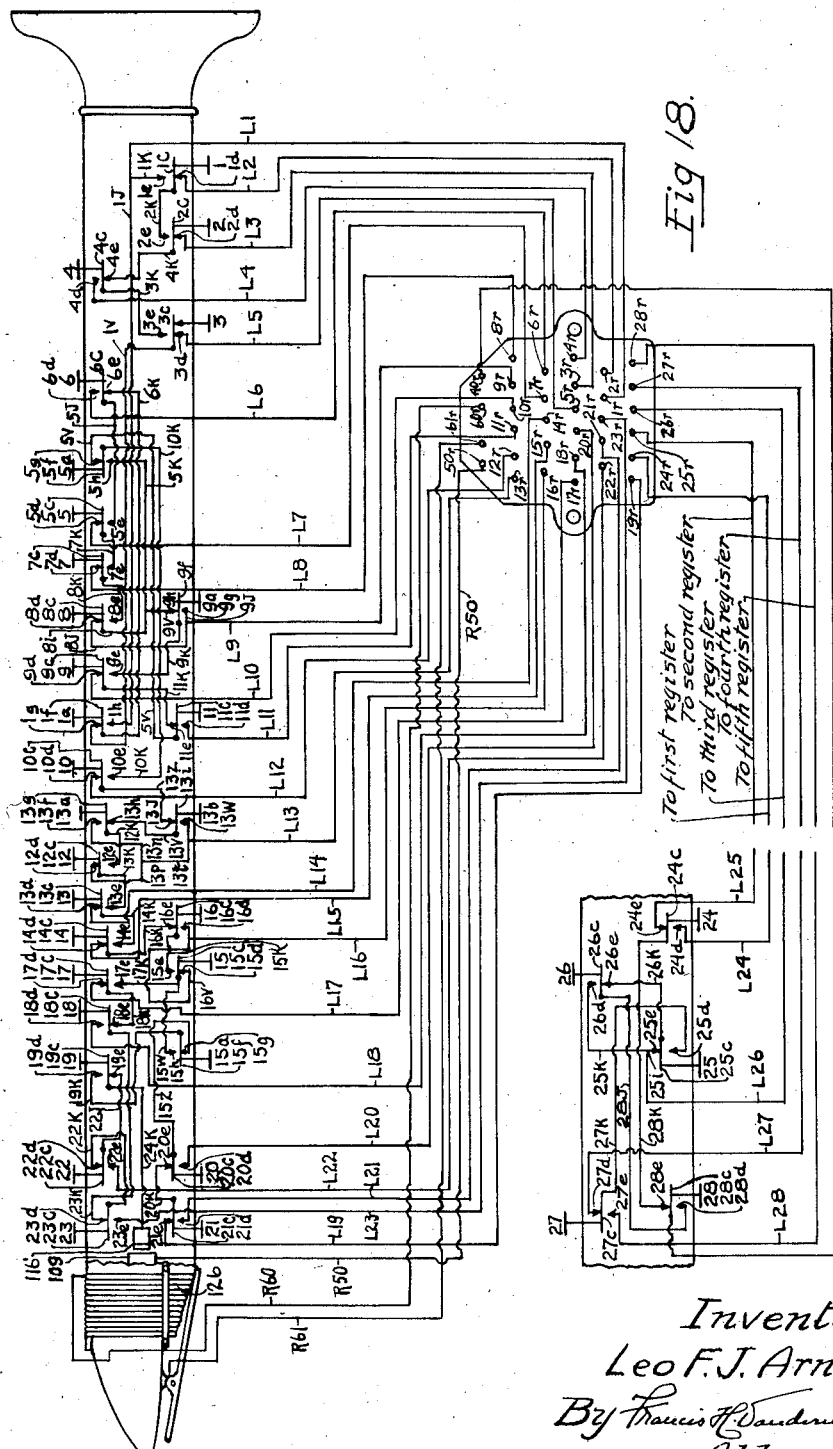

Nov. 10, 1942.　　　L. F. J. ARNOLD　　　2,301,184
ELECTRICAL CLARINET
Filed Jan. 23, 1941　　　12 Sheets-Sheet 7

Inventor
Leo F. J. Arnold
By Francis H. Vandenburgh
Attorney

Nov. 10, 1942.  L. F. J. ARNOLD  2,301,184
ELECTRICAL CLARINET
Filed Jan. 23, 1941  12 Sheets-Sheet 8
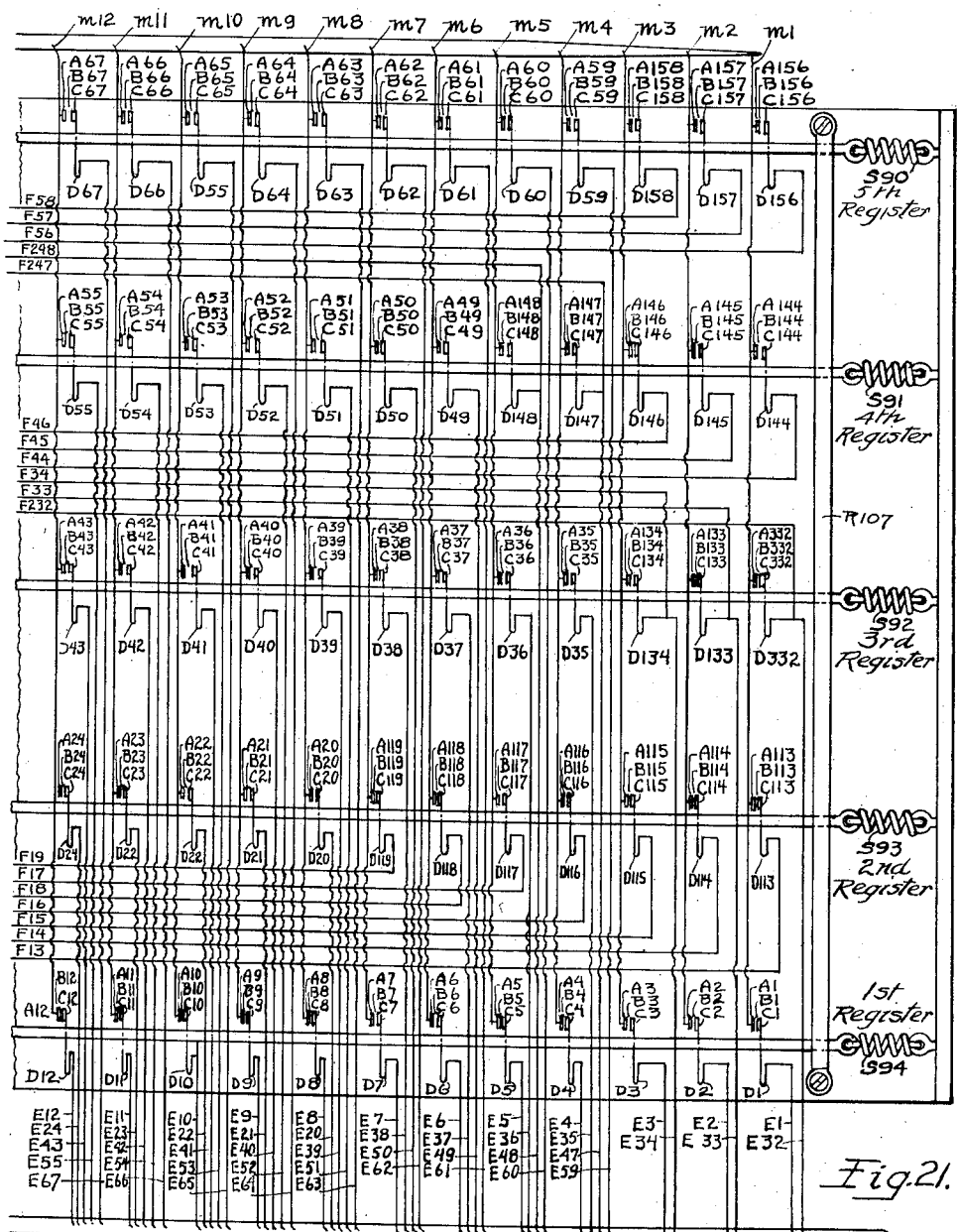
Fig. 21.
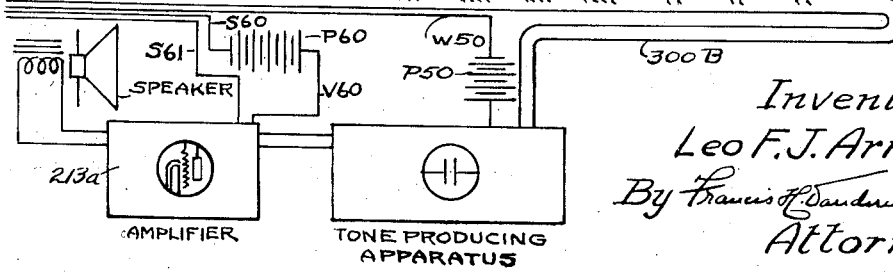
Inventor
Leo F. J. Arnold
By Francis H. Dandworth
Attorney Nov. 10, 1942.            L. F. J. ARNOLD              2,301,184
                         ELECTRICAL CLARINET
                         Filed Jan. 23, 1941           12 Sheets-Sheet 9

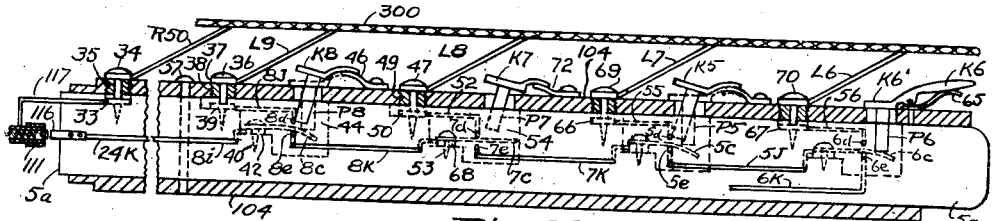

| | \multicolumn{5}{c|}{Contacts Interwired} | Interwiring Conductor | Common conductor to Tone Generator | Tone Produced Fig.22 |
|---|---|---|---|---|---|---|---|---|
| | 1st Register | 2nd Register | 3rd Register | 4th Register | 5th Register | | | |
| a | C13 | C113 | | | | F13 | E13 | T13 |
| b | C14 | C114 | | | | F14 | E14 | T14 |
| c | C15 | C115 | | | | F15 | E15 | T15 |
| d | C16 | C116 | | | | F16 | E16 | T16 |
| e | C17 | C117 | | | | F17 | E17 | T17 |
| f | C18 | C118 | | | | F18 | E18 | T18 |
| g | C19 | C119 | | | | F19 | E19 | T19 |
| h | | C31 C131 | | | | F31 | E31 | T31 |
| i | | C32 C132 | C232 C332 | | | F232 | E32 | T32 |
| j | | C33 | C233 C133 | | | F33 | E33 | T33 |
| k | | | C34 C134 | | | F34 | E34 | T34 |
| l | | | C47 | C247 C147 | | F247 | E47 | T47 |
| m | | | C48 | C248 C148 | | F248 | E48 | T48 |
| n | | | C44 | C144 | | F44 | E44 | T44 |
| o | | | C45 | C145 | | F45 | E45 | T45 |
| p | | | C46 | C246 C146 | | F46 | E46 | T46 |
| q | | | | C56 | C156 | F56 | E56 | T56 |
| r | | | | C57 | C157 | F57 | E57 | T57 |
| s | | | | C58 | C158 | F58 | E58 | T58 |

Fig. 22e

 -59

 -58

Fig. 22d

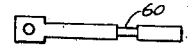

Fig. 22a

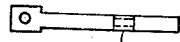

Fig. 22b

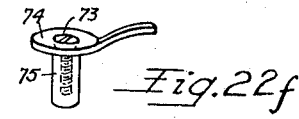

Fig. 22f

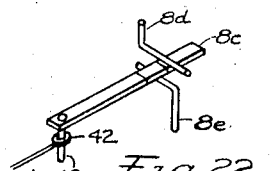

Fig. 22c

Inventor
Leo F. J. Arnold
By Francis P. Vanderwerf
Attorney

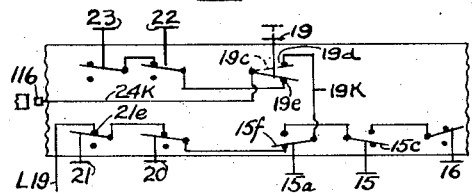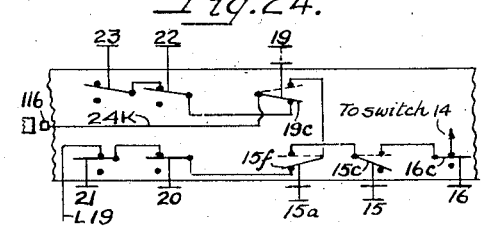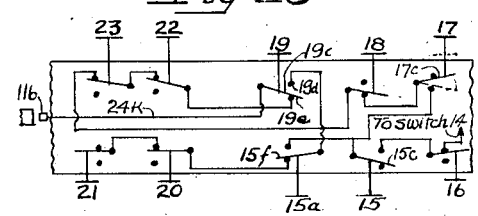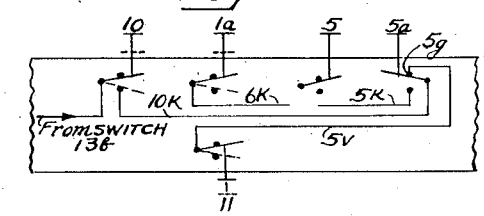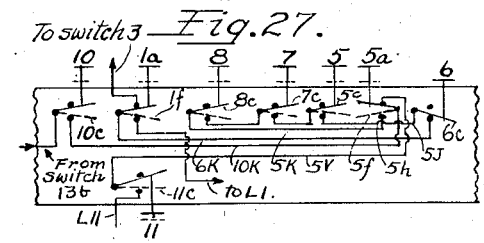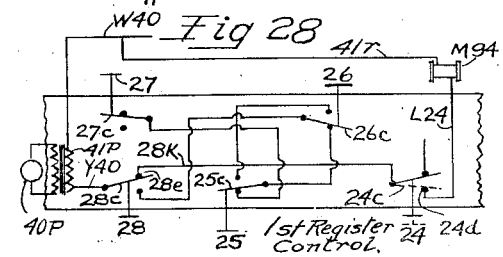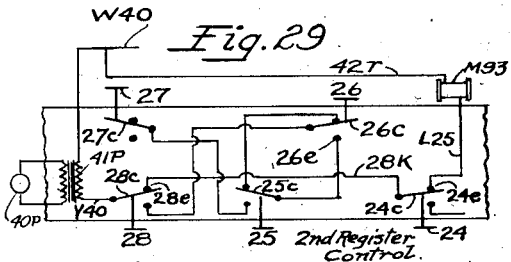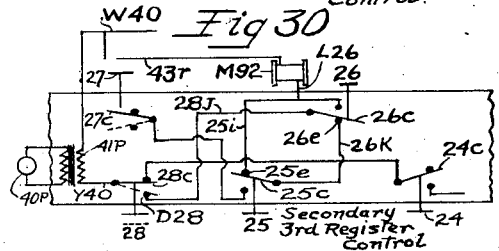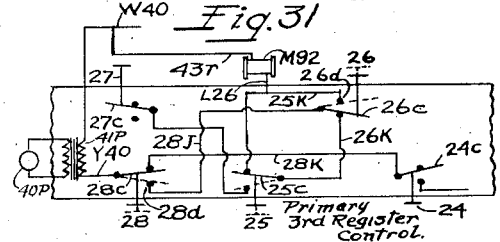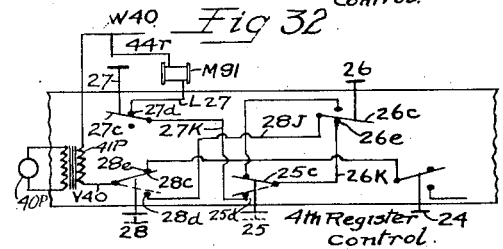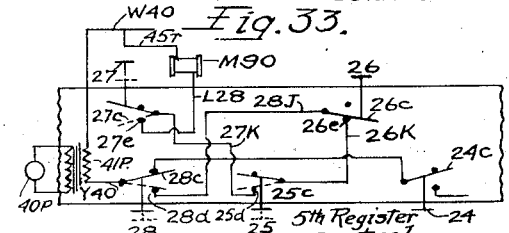

Fig. 35a. Fingering Chart (continued)

Nov. 10, 1942.   L. F. J. ARNOLD   2,301,184
ELECTRICAL CLARINET
Filed Jan. 23, 1941   12 Sheets-Sheet 12
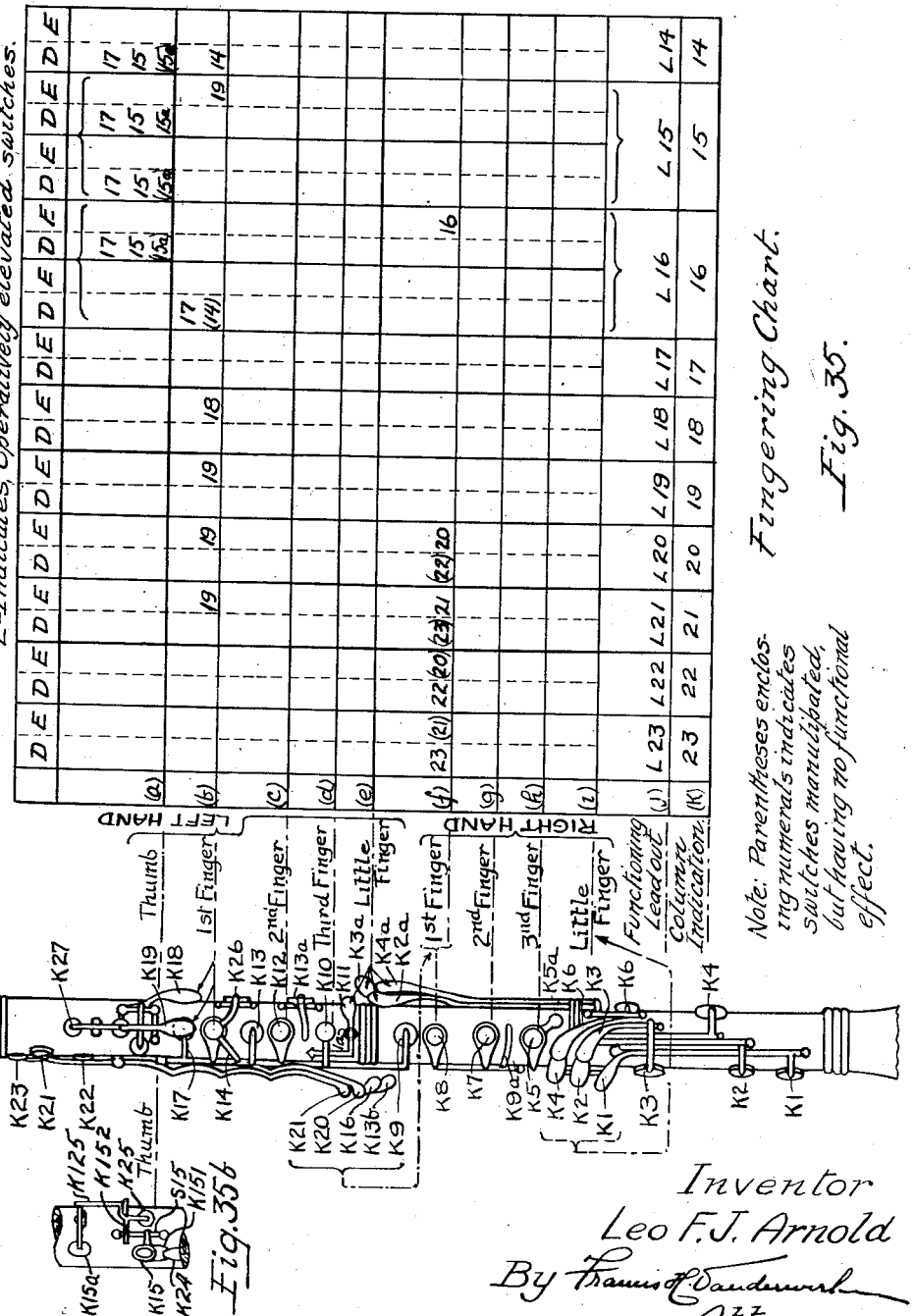
Fingering Chart. Fig. 35.
Inventor
Leo F. J. Arnold
By Francis C. Vanderwerk
Attorney.

Patented Nov. 10, 1942

2,301,184

UNITED STATES PATENT OFFICE 2,301,184

ELECTRICAL CLARINET

Leo F. J. Arnold, Washington, D. C.

Application January 23, 1941, Serial No. 375,546

34 Claims. (Cl. 84—1.01)

(Granted under the act of March 3, 1883, as amended April 30, 1928; 370 O. G. 757)

This invention described herein may be manufactured and used by or for the Government for governmental purposes, without the payment to me of any royalty thereon.

My invention relates generally to musical instruments, but more particularly it is directed to an electrical clarinet, having a keying system within the framework of the Boehm system clarinet, while supplementing this system by the use of additional keys and other means which extend and simplify the Boehm system of fingering; said electrical clarinet including a mouthpiece equipped with a wind operated master switch which is functionally inter-related with a series of tone circuits governing the operation of electrical sound generating units which are controlled selectively through a series of registers by manipulation of the keys of the clarinet in conjunction with the mouthpiece, the mouthpiece also embodying a pressure operated resistance controlling device for determining the volume of sound produced by the tone generating units.

The principal purpose of this invention is to provide an electrical music instrument of the clarinet type, having facilities for producing an improved and true quality of tone of extended range, and which is simplified sufficiently with respect to fingering and other technical requirements to enable a novice to attain proficiency in the playing of the instrument and a professional to render a more accurate and masterful performance than is ordinarily possible with conventional wood-wind instruments in common use today.

The invention herein disclosed is illustrated in connection with the clarinet. However, it is of such a nature as to allow its application to various other instruments, also, as will be shown subsequently.

The term "reed clarinet" will be used to distinguish the clarinet in common use today, in which the tone is produced by a reed of cane excited by the breath of the performer, from the electrical clarinet described herein, in which the tone is produced and controlled electrically.

It will help to understand the principles of this invention by noting that instead of having a vibrating column of air inside the tube of the clarinet for each tone produced, as is done with the reed clarinet, the tube is now adapted to control electrical circuits—one circuit for each tone produced, another independent and simultaneous circuit for the control of each register, and still another independent circuit for the control of volume and tremolo—one variable circuit, only, being used for this latter control.

The mouthpiece of this electrical clarinet is adapted with a device to control the tone circuits; said tone circuits being employed in connection with various elements, such, for example, as oscillating tubes, rotating discs, photo-electric cells, condensers, resistances, amplifying means, and/or other elements commonly known to those familiar with the art of producing musical sounds by electrical means, to produce the clarinet tone quality in the range of the herein described instrument, resulting in tones of correct pitch, of remarkable purity and clearness, and of pleasing quality, over the entire range of nearly six octaves, of said instrument.

Thus the reed of cane as employed on the reed clarinet, to supply the vibrations and other tonal properties, is eliminated with all its imperfections and difficulties, and instead, electrical oscillations or vibrations are employed, in addition to other necessary elements, to produce and control the frequencies, timbre and other properties required for well rounded musical tones.

The register circuits are in control of the tone circuits in that they operate gang switches through which the tone circuits must pass before reaching the tone generator, and thereby aid in making possible the extensive range of the clarinet.

The electrical clarinet set forth herein, may be fingered identically the same as the Boehm reed clarinet, from the lowest tone of said Boehm clarinet, which ordinarily is E flat on the fourth space below the treble clef on the 20-keyed clarinet, up to and including C on the second line above the treble clef; with simplified and improved fingerings from C sharp on the second line above the treble clef, up to and including the highest note possible on the Boehm clarinet. Numerous other fingerings exist in all five registers of this electric clarinet which are not at all possible on the Boehm—said fingerings greatly simplifying and improving its technic over that of the Boehm clarinet and being easy to acquire and master. An experienced player on the Boehm reed clarinet will have little difficulty in mastering the complete fingering of this electric clarinet, while other woodwind players may also readily "double" on it, due to the simplified mouthpiece operation and control.

In the main my invention consists of the mouthpiece manual, Fig. 1, a "switchboard" or register control, Figs. 20 and 21, and a tone generating and producing unit, Fig. 16, but it will be apparent that the present application pertains primarily to the mouthpiece, manual and the switchboard arrangement. The tone generating and producing device illustrated herein is but one of a considerable number and variety of such devices which the manual may control and operate, as will be apparent to those familiar with the art, and it is to be distinctly understood that the present manual is not limited to the operation and control of the one particular tone unit set forth herein.

As this invention is directed primarily to the clarinet, a brief reference to the clarinet tone, produced by a reed or electrically, is of importance. It is well known to those familiar with the art of producing musical sounds by electrical means, that it is possible and practical to construct various types of electrical tone generating and producing units to give the clarinet tone quality of great beauty and perfection. It is further well known that the tone color or timbre of the clarinet, as with the tones produced by other instruments, is based on the law that "the tone color or timbre of a sound depends upon the number and relative strengths of the harmonics or overtones present, in conjunction with the fundamental of the sound."

Grove's Dictionary of Music, vol. 1, page 362, cites the following: "Helmholtz has analyzed the tone and musical character of the clarinet among other wind instruments and shows that the sounds proper to the reed itself are hardly ever employed, being sharp and of very harsh quality; those actually produced being lower in pitch, dependent on the length of the column of air, and corresponding to the sounds proper to a stopped pipe. With the cylindrical tube these are the third, fifth, seventh and eighth partial sounds of the fundamental tone."

Electrically operated music systems are so well developed at the present time that it has been proven entirely practical, that the combinations of fundamental and harmonics with their various strengths which the vibrating reed of the reed clarinet gives off, can be matched by electrical vibrations of fundamental and harmonics with corresponding strengths, resulting in a true quality of clarinet tone. Since it is extremely difficult to produce a reed, which will give off perfect combinations of fundamental and harmonics when operated by the human embouchure, and since there are likely to be extraneous noises given off by this reed which detract from its quality, and further—since electrical music systems are so far and well developed at the present time that it is practical to utilize almost complete and perfect control of the various harmonics necessary to be employed in the building of any tone—it is apparent then, that electrical combinations of fundamental and harmonics may be employed to build a clarinet tone more rich, characteristic and nearly perfect, than is possible with the reed of cane on the reed clarinet.

I have determined from various tests made on well known present day electrical music devices which allow easy and extensive regulation of the harmonics necessary to build a multiplicity of tone colors, that the clarinet tone may be compounded and produced through quite an extensive variety of combinations of fundamental and harmonics. I have further found from these tests that a true and rich clarinet tone may be produced over an extensive range by the direct employment of only three ingredients of various strengths, i. e., using 8 units of strength as a basis for comparison, the ingredients and strengths are: fundamental, 8 units of strength; third harmonic, 6 units of strength, therefore three-fourths or 75% of the strength of the fundamental; fifth harmonic, 5 units of strength, therefore five-eighths or 62½% of the strength of the fundamental.

While the above ingredients were the only ones specifically generated, further tests of this clarinet tone revealed the presence of certain other harmonics or overtones not intentially generated. The overtones thus automatically generated do not detract from the quality, but rather add to it or enhance it.

Of course it is possible and practical to build the clarinet tone as stated previously, by using a great variety of combinations of fundamental and harmonics; the above is given as a comparatively simple formula for a quite true clarinet tone quality, although a somewhat more rich and characteristic tone may be produced by strengthening the upper harmonics as the tone descends in frequency, and decreasing the strength of the upper harmonics as the tone ascends in frequency.

As this electric clarinet has five different register ranges, it is possible to utilize different combinations of strengths for each register, thus readily permitting stronger upper harmonics for the lower registers than for the upper registers and vice versa. The above combinations of harmonics are cited only as examples and it is not intended that the instrument herein set forth be limited to the employment of any particular combinations of fundamental and harmonics, or to the employment of any particular strengths for the same.

It is further well known by those familiar with the art, that it is practical, (a) to electrically produce a chromatic scale of more than six octaves of correct pitch and quality for each tone as in the tempered scale (approximately six octaves being the range of the herein disclosed clarinet); (b) to render a delicate pianissimo to a double forte; (c) to employ or not to employ a pleasing vibrato effect; (d) to regulate the start and end of the tones for the proper musical and artistic effect; (e) to regulate the tuning of the device as a unit to bring it in tune with the instrument or instruments with which it is to be played; and (f) that since but one tone is to be sounded at a time and but one type of tone color need be produced on the tone generating unit which the manual of my invention may operate—thereby eliminating the use of complicated switching arrangements to sound several tones at once or to get a great variety of tone colors as is commonly done on electric organs—a tone unit may be constructed to produce only the clarinet tone, or any other single tone color desired, which will be compact and medium in bulk, readily transportable and reasonable in expense.

Experiments have shown conclusively that the clarinet tone properly compounded by means of electrical vibrations may be made most rich and attractive, and as this electrical tone is not dependent on the idiosyncrasies of the reed and mouthpiece of the reed clarinet and the human embouchure, it is apparent then, that the present invention provides means for improvement in the art of clarinet playing in this respect.

Those familiar with playing the reed clarinet and other woodwind instruments know that said instruments present a considerable number of imperfections and major difficulties to overcome in learning to play and master them. It is a general purpose of my invention to provide an electrical instrument of the woodwind type which reduces many of those imperfections and difficulties, or which is entirely free from them, among which are, referring primarily to the clarinet:

(a) The reed clarinet is not perfectly in tune, due to its construction and range, and a great deal of skill and care is required on the part of the performer to humor the defective tones to bring them in tune. Furthermore, heat affects the pitch, causing it to become sharper, while cold has the opposite effect. The condition of the mouthpiece, reed and embouchure may also easily affect the pitch in an adverse manner.

(b) Due to the construction of the tube and holes of the reed clarinet, together with slight imperfections in the mouthpiece or reed, it is quite difficult to produce scales and other musical progressions in which all tones are evenly balanced in strength and quality.

(c) While the Boehm system of fingering, as employed on the reed clarinet, is sufficient to permit a fluent technic in most keys, there are still very many technically difficult and awkward passages. The technic of the herein disclosed instrument is simplified and advanced to such a degree over all conventional woodwind instruments, as will be shown subsequently, that many of said technically difficult and awkward passages common to the Boehm system or other woodwind instruments are materially simplified or eliminated entirely.

(d) Certain trills on the reed clarinet cannot be executed perfectly, due either to faulty intonation or difficult mechanical manipulation.

(e) The reed and mouthpiece are a great source of trouble and anxiety to all players on the reed clarinet. The most skilled player is at the mercy of his reed, which, if not of the proper quality or if not carefully handled, will result in poor tone quality or poor intonation, or both; furthermore, if the reed is not "lipped" properly or if the fingers fail to hermetically seal the tube of the instrument over the functioning section of it, a squeak will be likely to result and thereby mar the finest performance. The reed and mouthpiece are undoubtedly the weakest part of all reed instruments, since the tone and to a large extent even a free and rapid technic, are dependent to such a great degree upon their proper functioning.

(f) The art of tonguing with speed and quality on the reed clarinet is one of the most difficult features to acquire and maintain, especially if the passage to be played is of considerable length. Furthermore, a performer on a reed instrument is limited to single tonguing only, and is thus handicapped in competing with players on instruments with which it is natural to single, double and triple tongue. I am aware that a few players claim to be able to double and triple tongue on certain reed instruments, but the majority of artists and authorities consider them, for all practical purposes, limited to single tongue articulations, only.

(g) As the B flat clarinet is principally employed in band music, and since its reasonable upper limit is G, on the fourth line above the treble clef, this, then, is the highest tone which may be practically utilized on that clarinet. Music of a useful nature of course extends much higher than the G referred to. Although the E flat clarinet, which has a higher range than the B flat clarinet, is employed, its upper range is difficult to handle satisfactorily and ordinarily only one E flat clarinet is employed. While the flute and piccolo, which have a high range, are also employed in bands, the piccolo is ordinarily used only for special effects, and though the flute may be employed over a considerable range, its voice is weak and therefore much of it is lost. It is, of course, possible to sound tones on the reed clarinet, higher than the G referred to, but due to "lipping" and difficult fingering of such tones, this G may be considered the resonable upper limit of the reed clarinet. The entire practical range of the reed clarinet, then is:

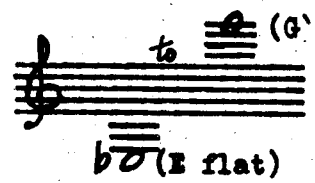

E flat, indicated, being the lowest tone of the 20-keyed clarinet, and G being the reasonable upper limit. The range of the electrical clarinet disclosed herein, extends from:

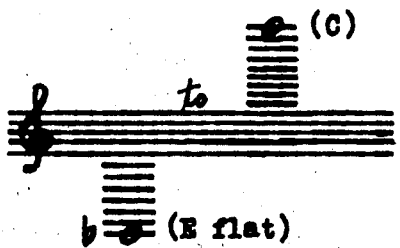

which is an increase of two octaves plus an interval of a fourth, over the practical range of the reed clarinet.

(h) Correct embouchure is decidedly difficult to acquire in playing the reed clarinet, and after the correct embouchure has been developed it can be maintained only with constant practice, otherwise the playing of the instrument will suffer. Should the loss of one or more teeth occur, or should the lips become impaired, it would be likely to cause the performer considerable difficulty in maintaining his former ability. Furthermore, with most individuals, after the teeth have reached their full development there is usually a gradual wearing on the incisal edges, in addition to other natural changes, which affects the covering of the lip over the teeth and the balancing and grip of the mouthpiece and instrument, which in turn affects the embouchure adversely, thus presenting a contributing cause to the difficulty experienced by many players on reed instruments to play well as they advance in age. The quality and speed of tonguing, in addition to tone production, depend largely on the condition of the embouchure, therefore as the embouchure deteriorates, the ability to tongue well and to produce a pleasing tone is likely to deteriorate with it. As the tone of the herein disclosed instrument is generated and produced entirely electrically, and not by a reed of cane, and further, as the tonguing is controlled almost entirely by the action of air from the lungs in conjunction with the action of the tongue, it will be apparent that embouchure, as applied to the reed clarinet and other conventional woodwind instruments, is eliminated almost entirely. However, it has been determined that embouchure of a certain new character (the term "embouchure" being broadly applied in this case) will be required to play this electric instrument properly; but this will consist mainly in (a) the action of the lips compressing around the mouthpiece to direct a column of air inside; (b) the action of the tongue and throat combined to produce the double and triple tongue articulations, as ordinarily executed on the flute and brass instruments to which these articulations are commonly applied; and (c) the employment of the jaws and lips combined to help hold and balance the clarinet and to manipulate the volume and tremolo control from the mouthpiece.

While the above imperfections and difficulties discussed under points (a) to (h) inclusive, have been directed to the clarinet, those familiar with the art of playing woodwind instruments, in general, know that most of said imperfections and difficulties common to the reed clarinet are also common in varying degrees to the other conventional woodwind instruments.

The following general and specific objects of my invention will be apparent from the previous discussion and the accompanying specification, while other objects will be apparent to those familiar with the art to which the present invention relates.

General objects:

(1) To provide an electrical instrument of the woodwind type which lessens, or is entirely free from many of the imperfections and difficulties attendant the reed clarinet and other woodwind instruments in common use.

(2) To provide an electrical instrument of the woodwind type which may be played and mastered more readily than conventional woodwind instruments in present day use.

(3) To provide an electrical system of interwiring of tone switches, interwiring of register switches, switch construction and manipulation, key construction and manipulation, and mouthpiece control, in addition to the other features herein disclosed, which may be easily and inexpensively adapted and applied to the body of the conventional Boehm clarinet, or to any other suitably similar body.

Other objects:

(4) To provide an electrical instrument of the woodwind type, with means for producing tones of improved quality, and tones which remain constant in quality under all conditions.

(5) To provide an electrical instrument of the woodwind type with a simplified and improved fingering system, and which still retains the conventional Boehm system of fingering.

(6) To provide an electrical instrument of the woodwind type which may be adapted to be fingered the same as the conventional oboe, flute, saxophone, or other desired instrument or system.

(7) To provide an electrical instrument of the woodwind type with various keys not on conventional woodwind instruments, to facilitate technic or to extend range.

(8) To provide an electrical instrument of the woodwind type with overlapping fingering facilities between all registers, to facilitate the connection of said registers while playing the instrument.

(9) To provide an electrical instrument of the woodwind type with which all trills of a half tone or a full tone may be executed perfectly in intonation and mechanical manipulation.

(10) To provide an electrical instrument of the woodwind type which facilitates the production of all tones of perfect pitch as of the tempered scale; tones which remain constant in pitch regardless of heat or cold; and tones which are not dependent on the human embouchure for pitch control.

(11) To provide an electrical instrument of the woodwind type with which it is not only natural to single, double and triple tongue, but with which it is comparatively easy to acquire and maintain this feature.

(12) To provide an electrical instrument of the woodwind type with which all of the tones of the various scales may be produced evenly balanced in strength and quality, and which will remain constant in that respect until voluntarily nuanced, as in the course of musical expression.

(13) To provide an electrical instrument of the woodwind type in which the difficulties attendant the reed and mouthpiece of conventional woodwind instruments, particularly the squeak of the clarinet, are eliminated entirely.

(14) To provide an electrical instrument of the woodwind type which eliminates the frailties of the human embouchure and which relies on embouchure only slightly in the process of playing.

(15) To provide an electrical instrument of the woodwind type which utilizes electric oscillations or vibrations for tone production, in distinction to conventional woodwind instruments in which the tone is produced by the vibration of a reed which excites a column of air inside the tube of the instrument.

(16) To provide an electrical instrument of the woodwind type which is adapted to control a different electrical circuit for the sounding of each tone in the complete range of the instrument.

(17) To provide an electrical instrument of the woodwind type which may be adapted to produce any single type of tone color or timbre desired.

(18) To provide an electrical instrument of the woodwind type which is operated and controlled by a combination of fingers plus breath, in distinction to conventional keyboard instruments which are operated by the fingers alone.

(19) To provide an electrical instrument of the woodwind type with an internal core to maintain switches, wiring and other elements necessary in the construction of operable electric circuits.

(20) To provide an electrical instrument of the woodwind type with a series of automatically elevating switchblades which are adapted to be controlled by the keys of the instrument.

(21) To provide an electrical instrument of the woodwind type which is adapted with a mouthpiece containing a master switch arrangement for the control of electrical circuits.

(22) To provide a mouthpiece adapted with a master switch arrangement for the control of electrical circuits, which may also be applied to a variety of electrical musical instruments, or to other bodies or arrangements.

(23) To provide a mouthpiece with electrical means to control volume and tremolo of tones under its control.

(24) To provide an electrical instrument of the woodwind type with a system of register key controls for the extension of the range of said instrument.

(25) To provide an electrical instrument of the woodwind type which is adapted to control a different electrical circuit for the control of each register of the instrument.

(26) To provide an external switching system or register changing mechanism, whereby various keys of an electrical instrument of the woodwind type may be utilized selectively to sound more than one tone.

(27) To provide a system of switchboard interwiring, whereby duplicate fingerings may be utilized in the same capacity.

(28) To provide an electrical instrument of the woodwind type with keys of the general type as used on conventional woodwind instruments, but which are adapted with pistons or plungers for the operation of electrical switches.

(29) To provide an electrical instrument of the woodwind type with means whereby individual keys of the manual may be utilized in a dual capacity in the same register, or in entirely different capacities.

(30) To provide means for carrying and connecting the manual circuits to the switchboard and tone generator.

(31) To provide means for insulation between the manual circuits and the performer's hands and mouth.

With these and other objects in view, the invention consists of certain features of construction and operation of parts which will hereinafter appear, and in which—

Fig. 3 is an elevation of the clarinet rotated about its longitudinal axis so as to expose to view keys not shown in either Fig. 1 or Fig. 2;

Fig. 4 is a sectionized view of the clarinet, showing the internal core on which the switch contacts, wiring and other elements are mounted;

Fig. 4a is an enlarged view of a portion of the core illustrated in Fig. 4, showing the switch construction and the arrangement of the electrical connections;

Fig. 5 is an elevation, illustrating the exterior of the clarinet and showing the arrangement and construction of parts of the piston switch operating mechanism of the upper section of the instrument;

Fig. 5a is a sectionized view taken on the line 5—5 of Fig. 5, in the direction of the arrows, illustrating the construction of the dual functioning of key K11;

Fig. 6 is a partially sectionized view of the upper section of the clarinet, shown in Fig. 5, rotated to further illustrate the construction of the piston switch operating mechanism;

Fig. 12 is a sectionized view of one form of mouthpiece, and a portion of the upper section of the clarinet, showing the construction of the air controlled master switch and its connection to two illustrational tone switches of the manual;

Fig. 13 is a plan view in developed form of switch operating mechanism shown partially in Fig. 5;

Fig. 14 is a perspective, illustrating the arrangement of the handle of K26, ring 14w, and piston of K14, shown in Fig. 13;

Fig. 15 is a combined sectionized view of a modified form of mouthpiece provided with a rheostat type of volume control, in addition to a master switch;

Fig. 16 is a diagrammatic view showing the arrangement of the units of the tone apparatus, amplifier and speaker, adapted to be electrically connected with the mouthpiece shown in Fig. 15;

Fig. 17 is a sectionized view taken on the line 17—17 in Fig. 15;

Fig. 18 is a diagrammatic view of the complete system of tone wiring and switches therewith, of the manual, with leadout conductors to the terminal panel;

Fig. 19 is a diagrammatic view of the complete system of register wiring and switches therewith, of the manual, with leadout conductors to the terminal panel;

Fig. 21 is a diagrammatic plan view of the right hand section of the register control board or switchboard, showing the five registers of magnetically controlled gang switches and the wiring connected therewith, also the amplifier and dynamic speaker;

Fig. 22 is a sectionized view of a portion of the clarinet, illustrating the core, construction and functioning of the manual switches, system of interwiring between switches, and leadout connections from switches to the cable;

Fig. 22a is a top plan view of a switchblade, showing restricted portion for reception of contact element;

Fig. 22b is a top plan view of a switchblade with contact element attached thereto;

Fig. 22c is a perspective view, showing a switchblade and terminal assembly;

Fig. 22d is a sectionized view showing an internally and externally threaded insert sleeve;

Fig. 22e is an elevation of a screw, adapted to engage the internal threads of the insert sleeve shown in Fig. 23d;

Fig. 22f is a perspective, showing a piston key assembly;

Figure 1:
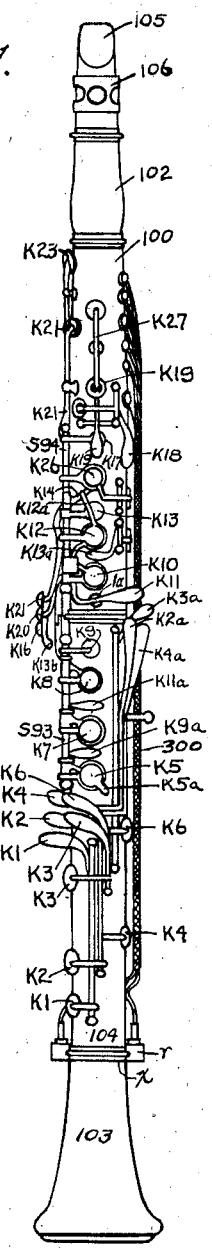
Fig. 1 is an elevation of the electrical clarinet manual showing the arrangement of the keys, and a rear view of the terminal panel attached thereto.

Fig. 23 is a diagrammatic view illustrating the control of switch 19 over switches 22 and 23, and the control of switch 19 and auxiliary switch 15a combined, over switches 20 and 21;

Fig. 24 is a diagrammatic view illustrating the functioning of switch 19 and auxiliary switch 15a, during the fifth register functioning;

Fig. 25 is a diagrammatic view illustrating the functioning of switch 19 to isolate switches 20 and 21 and to feed current to the other tone switches instead;

Fig. 26 is a diagrammatic view illustrating the connection of switch 11 and isolation of switch 1a through the normally elevated auxiliary switch 5a;

Fig. 27 is a diagrammatic view illustrating the isolation of switch 11 and connection of switch

*1a*, through the operatively depressed auxiliary switch *5a*;

Fig. 28 is a diagrammatic view illustrating the register switch positions and connections during the first register control;

Fig. 29 is a diagrammatic view illustrating the register switch positions and connections during the second register control;

Fig. 30 is a diagrammatic view illustrating the register switch positions and connections during the secondary third-register control;

Fig. 31 is a diagrammatic view illustrating the register switch positions and connections during the primary third register control;

Fig. 32 is a diagrammatic view illustrtating the register switch positions and connections during the fourth register control;

Fig. 33 is a diagrammatic view illustrating the register switch positions and connections during the fifth register control;

Fig. 34 is a chart illustrating the interwiring of duplicate or overlapping switches on the switchboard, and conductors therefrom;

Figure 35A:
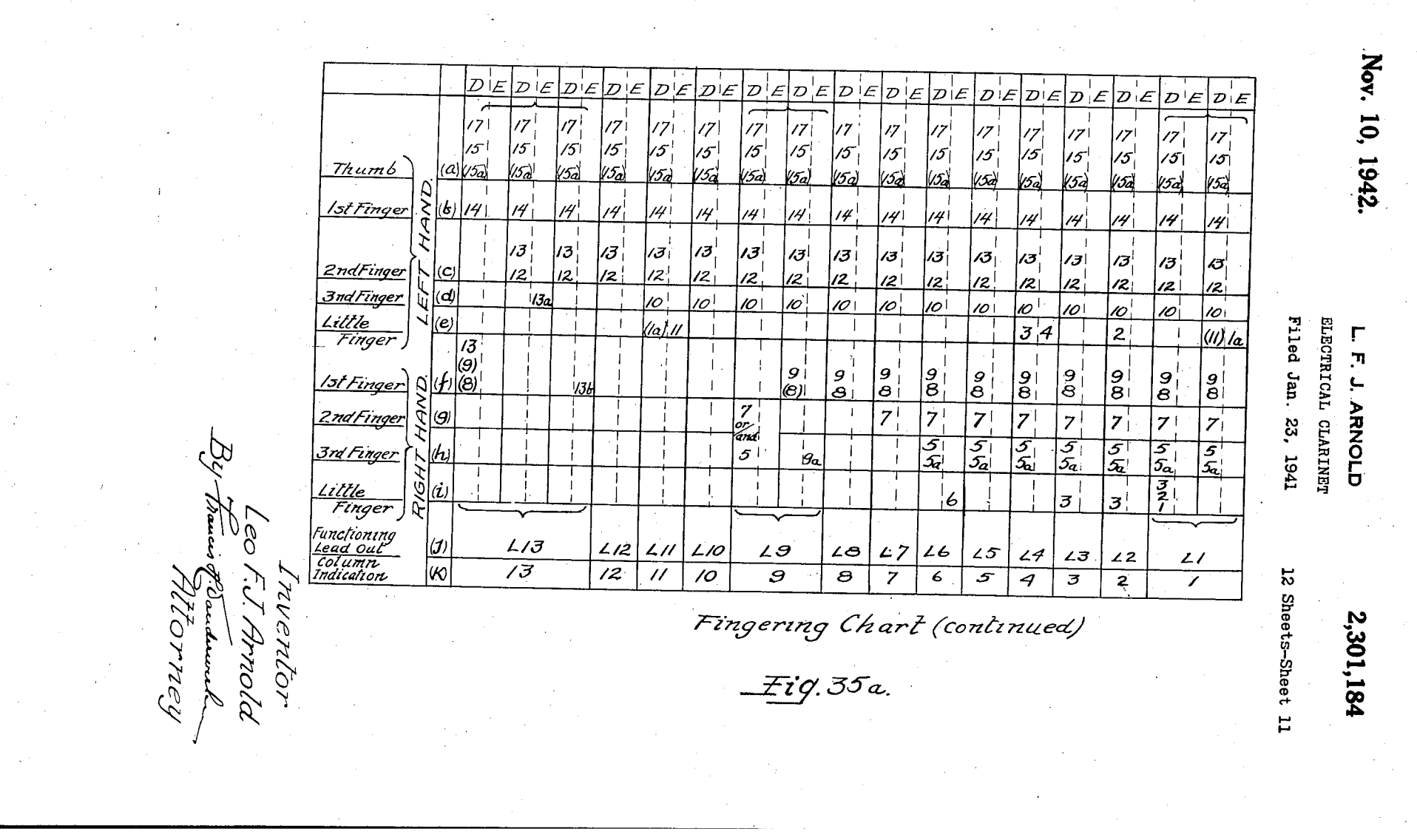

Fig. 35 is a chart showing which fingers are operatively depressed on keys, and which switches are operatively depressed or operatively elevated thereby, to cause all of the tone leadouts from 1 to 23 inclusive, of the manual, to function; and Fig. 35*a* is a continuation of the fingering chart shown in Fig. 35.

Fig. 35*b* is an elevation of a portion of the clarinet rotated about its longitudinal axis so as to expose to view keys K15 and K15*a*, not shown in Fig. 35.

GENERAL CONSTRUCTION AND CHARACTERISTICS

Figure 2:
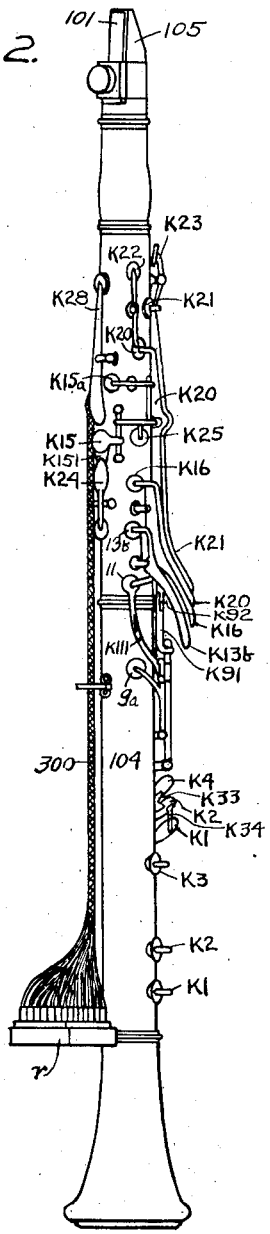
Fig. 2 is an elevation of the clarinet rotated about its longitudinal axis so as to expose to view keys not shown in Fig. 1.

Relative to the construction of the clarinet, it will be seen by reference to Figs. 1, 2 and 3, that the instrument comprises a mouthpiece 105, and tubular frame sections 102, 100, 104 and 103, forming a body similar to that of the conventional Boehm clarinet of 20 keys and 7 rings, although the electric clarinet which forms the subject matter herein, is not limited to the employment of that particular number of keys and rings. Furthermore, the tubular frame sections 100, 104 and 103 may be practically formed in one united section, or unbroken unit, if desired, instead of three separate sections as illustrated.

To the 20 keys and 7 rings of the conventional Boehm system have been added: (*a*) 18 new keys, (*b*) pistons, (*c*) switches, (*d*) wiring, (*e*) a core to hold the switches, wiring and other elements, (*f*) a cable, (*g*) a master switch and rheostat arrangement to the conventional mouthpiece, (*h*)— externally of the manual, the switchboard arrangement shown in Figs. 20 and 21—and finally, (*i*) the wiring necessary to complete the circuits and connections through the manual and switching arrangement to the tone generator, all of which will be further described.

The barrel joint 102, shown in Figs. 1 and 12, of the conventional clarinet may also be utilized on this electric clarinet as it provides a convenient means to reach the master switch contacts 113 and 116, and also to insert or remove the cylinder 109. The bell 103, of the conventional clarinet may also be employed, but it will be apparent that its use will be primarily ornamental.

With the herein described clarinet manual it is possible to manipulate and control 95 "tone circuits" and 5 "register circuits." By tone circuit is meant one identified directly with the sounding of a tone, and by register circuit is meant one utilized to energize an electro-magnet which pulls gang switches on the "switchboard" arrangement.

The 95 tone circuits are used in the sounding of but 70 tones, which is explained by the condition that several tones overlap between each register, as illustrated in the scale chart hereinafter to be referred to. The 7 upper chromatic fingerings of the first register of the manual overlap the 7 chromatic fingerings of the lower part of the second register, therefore 7 circuits overlap, or they are duplicates of each other. A somewhat similar condition exists between the other registers. This overlapping of registers of the manual is a decided advantage technically in the execution of certain trills, intervals and passages, as will be apparent to those familiar with the technic of the reed clarinet or other similar instrument.

With the mouthpiece I have devised for the clarinet, all tone circuits are immediately controlled by the breath, tongue and throat of the performer, in that they may be allowed to function for various lengths of time, thus making possible the various articulations of legato and staccato required in the performance of musical compositions. Single, double and triple tongue articulations may be produced and controlled with ease, and the fact that this tonguing is not dependent on embouchure as on the reed clarinet, affords the means for advancement in the art of clarinet playing in this respect. The mouthpiece also has direct control of the tones as regards volume and tremolo, through a rheostat control located on the mouthpiece and operated by pressure from the jaws of the performer. This volume and tremolo control is independent of the master switch in the mouthpiece which controls the articulation of the tone circuits. The mouthpiece therefore exercises a dual control, i. e., (*a*) articulation, and (*b*) volume and tremolo.

The clarinet herein disclosed has a range of 6 octaves lacking 3 semitones, which is an extension of an octave lower and an octave and a fourth above the practical range of the reed clarinet. This extensive range is obtained mainly through (*a*) an easy change of fingering from the Boehm system, from C sharp on the second line above the treble clef up to and including the highest note possible on the reed clarinet, and (*b*) through the addition of certain new keys, namely register keys K24, K25, K26, K27, auxiliary tone key K15*a*, and key K12*a*, which enable the employment of five different registers of range. It will be apparent that such an extensive range places this clarinet in a distinct class from clarinets of the reed type, as it takes in the range covered by bass clarinet, B flat and E flat clarinet, combined, plus an octave above the practical range of the E flat clarinet.

While this invention is intended primarily to produce the tones of the clarinet quality, it will be apparent that it may also be used to produce tones of any other desired timbre which the electrical tone producing unit is designed to generate, since the manual functions as a "keying" or "triggering" means to selectively cause the emission of tones by a sound apparatus. Triggering is accomplished through the combined action of the mouthpiece and keys to control circuits from the manual to electron valves, potentiometers, or any other electrical sounding or controlling means possible in the art.

While the invention herein disclosed is illustrated directly in connection with the clarinet, it must be distinctly understood that said invention may also be practically adapted and applied to various other instruments, without departing from the spirit and limits of the present invention. To be more explicit—I may take the conventional oboe in common use today, and, with slight modifications, adapt it with the system of wiring, switches, key pistons, mouthpiece control and other elements herein disclosed relative to the manual and switchboard, and with proper harmonic control and adjustment of the tone generator and amplification, I will then have an electric oboe.

Further—various special "bodies" may be constructed to hold and operate the elements herein illustrated relative to the manual; then with the switchboard system and an appropriate tone generating unit and amplification, I may have an electric flute, English horn, bassoon, saxophone or other desired individual instrument. In fact, as will be apparent to one skilled in the electrical music art, it will be practical through the facilities of this invention, to build a great number and variety of individual, small and readily transportable electrical music instruments of the same general type as of the instrument herein disclosed.

It is practical to construct the manual of my invention rather inexpensively, due to the fact that the tube or body does not require a special kind of wood which has been carefully seasoned for years to prevent cracking, neither is it necessary to have the holes and bore of the tube finished with the extreme precision required for the reed clarinet. It will be apparent that the main expense of construction of a complete electrical instrument of this type will lie with the tone generating and amplifying means, which, it must be remembered, is required to produce but one tone at a time and but one type of tone color, in distinction to the elements and means required in the construction of electric organs; therefore the construction of a complete electric clarinet in quantities and of reasonable and minimum expense will depend upon the state of the electrical music art and the ingenuity of the constructor.

*Mouthpiece*

Two forms of mouthpiece are shown in Figs. 12 and 15, either of which may be used with the instrument. The first form shown in Fig. 12, comprises chiefly, (a) a small cylinder 109, over one end of which is slidably fitted a cup 111, while the other end of the cylinder through which the air enters, is adapted with an opeen end piece or cross-bar 110 to which is attached a spring 112; and (b) a holder 105, which may conveniently be the usual form of mouthpiece as employed on reed clarinets. The cylinder and cup are preferably made of non-rust material.

Holder 105, is adapted with an adjustable element 101 (see also Fig. 2) which is used to regulate the gap for entrance of air into the mouthpiece, and to afford with the end 105' of the holder 105, a suitable grip in the mouth of the performer. The element 101 is held in place by means of ligature 106 and screw 107.

Cup 111 is held in position against the cylinder 109 by a spring 112, one end of which is attached to the cup by means of hook contact 113, the other end being attached to adjustably threaded bolt 114, which is in turn held by crossbar 110. Bolt 114 is retained and regulated by lock nuts 115.

Cylinder 109 is surrounded by a cork band 108, which is attached next to the open end of the cylinder for the purpose of retaining the cylinder inside holder 105. The entire cylinder may be adjusted farther in or out of the holder as desired. Spring 112 is preferably made of non-rust material and is of proper strength to allow the cup 111 to be readily moved by the breath of the performer. Bolt 114 and lock nuts 115 are for the purpose of regulating the strength or tension of the spring, 112, for accommodation in blowing or tonguing.

Cylinder 109 is further adapted to be contacted by screw 118, which goes through the wall of the holder 105 and also through cork band 108. Screw 118 is in turn contacted by metallic spring element 117 which is attached permanently to the core 5A and held against screw 118 by its own tension. This arrangement allows the joint end 119 of the holder 105, to be removed or inserted inside the joint end 102' of the intermediate section 102, commonly called the barrel joint on the conventional clarinet. Further, the screw 118 and the cork band 108 allow the cylinder with its cup to be removed from the holder 105.

Holder 105 may be conveniently provided with a small vent H1 to allow the escape of air, in order to facilitate the functioning of the mouthpiece; intermediate section 102 may be provided with a vent H2 to allow the escape of air and moisture from the breath which may leak into this compartment.

At a convenient distance of between one-eighth and one-sixteenth of an inch from the cup contact 113, is located the mate contact element 116 which is attached permanently to the core 5A inside the tube of the manual. Contact points 113 and 116 may be made of silver, or other suitable contact material such as platinum iridium points may be used.

It will be apparent from the construction described, that when air from the lungs is blown into cylinder 109, through the open tube 120 and end piece 110, with sufficient energy to overcome the strength of spring 112, that the cup 111 will move along cylinder 109 until point 113 comes into contact with point 116, thus closing the switch located at that place.

The path of the circuit in going through the mouthpiece will be from conductor R50, through screw 50', spring element 117, screw 118, cylinder 109, cup 111, and contact points 113 and 116, from where it continues over conductor 24K to the first tone switch inside the manual, and then to the other tone switches as illustrated in Fig. 18, which will be described subsequently.

Through the facilities of the mouthpiece just described, a "master switch" is thus provided over all of the tone switches of the entire clarinet, for it will be apparent that no tone switch can function unless the master switch in the mouthpiece is first closed. This master switch being operated by air from the lungs which is controlled by the tongue and throat of the performer, enables a very rapid articulation of the tones produced by the clarinet.

Various manuals, electric keyboards and remote controls are commonly employed in the performance of musical compositions, but to the best of my knowledge no electric manual has heretofore been devised which provides for a combination control of breath plus fingers over the tones manipulated, as does the manual which is herein disclosed. Through the employment of double tongue articulations, the master switch in the mouthpiece may be readily made to function 700 or more times per minute, thus making possible that number of detached tones per minute. It would obviously be impractical, or perhaps impossible, to reiterate a tone 700 times per minute by the use of one finger on a conventional keyboard, or by single tonguing on a reed instrument. Conventional keyboards are also handicapped in creating the proper nuances in articulations, especially mixed articulations consisting of slurs and staccatos. With the herein described invention the manual may exercise almost perfect control in that respect, being limited only by the capacity or capability of the tone unit which it controls.

The second type of mouthpiece, shown in Fig. 15, is similar to the first, also being provided with a master switch as described for the first, and in addition to this is adapted with a rheostat control consisting of the resistance coil 126 surrounding the mouthpiece, and a pivotally mounted contact arm or lever 125. This rheostat is independent of the master switch inside. The coil gradually increases in the length of its wrapping from forward to rear as illustrated in Fig. 15, passes over an L-shaped attachment 122, shown in Fig. 17, is forced inward against attachment 122 and held in this position by horizontal strip 123. This construction provides a projecting sloping edge 124 shown in Figs. 17 and 15, along which the pivotally mounted contact arm 125 may be moved. The end 125' of the arm reacts against a spring 127, which tends to move the contact arm 125 upward along the sloping edge 124 of the resistance coil. The lever contact member 125 is operated by jaw pressure of the performer, whose lower lip and jaw contact the forward end 125' which is made of nonconducting material.

Fig. 15 illustrates the lever member 125 in the position occupied when acted upon by the maximum jaw pressure, bringing the end of contact lever 125 into contact with point R1 of the resistance coil. The current having entered the coil at point 126', it will be apparent that the rheostat will be functioning at its least electrical resistance and therefore most power at that time. As the jaw pressure is gradually released, spring 127 will cause the lever 125 to move along the contact edge 124 of the coil from point R1 until it reaches the point R2, where at point R2 the rheostat will function at its greatest amount of electrical resistance and therefore at its least power. Point 126' of the coil and lever 125 are connected through conductors R60 and R61 respectively, to the power circuit of the amplifier 213a of the tone producing apparatus, as shown in Figs. 15, 16 and 18. Therefore when no jaw pressure is applied to the lever 125, leaving it in its normal position and contacting point R2, the rheostat will allow the amplifier to function at its least amount of power, and conversely, as the jaw pressure is gradually applied the rheostat will allow the amplifier to function at a greater degree of volume until the maximum is reached at point R1, which operative position is illustrated in Fig. 15.

With the rheostat arrangement just described, in addition to volume control, it may also be utilized to impart a slight tremolo effect, through a regular shifting of the lever 125 up and down along the contact edge 124 of the coil, by the action of the jaws.

With the first type of mouthpiece described, which is not adapted with a volume control, this control may be effected through a conventional foot pedal arrangements as on electric organs, or other similar devices may be employed.

Numerous changes and modifications may be made in the construction and design of the two types of mouthpiece which have been described, without departing from the spirit and scope of this phase of my invention which is intended primarily to present a mouthpiece with a wind operated and controlled master switch and a rheostat arrangement for control of volume.

*Construction and operation of keys of the manual*

All keys which are conventional on the 20 key, 7 ring, Boehm clarinet are constructed and manipulated in the same conventional manner on this electric clarinet, with a few inconsequential exceptions. One exception is that key K19, of Fig. 5, is entirely free from key K18 on the electric clarinet, which facilitates the manipulation of K19 and K27 which is attached to it; the other exception is that the piston end of K16, shown in Fig. 2, is located farther down on the body of the manual to provide a convenient place for K25, which occupies the place held by the cup of K16 on the conventional clarinet.

However, all keys of this electric clarinet which are directly concerned with the operation of a switch have been provided with pistons or plungers on the cup end, as illustrated by the keys shown in Fig. 23 and further illustrated by keys K19 and K27 in Fig. 6.

Fig. 22f illustrates one manner of attaching the pistons to the keys. It may be conveniently done by means of a threaded screw 73, which is screwed through the cup 74 of the key and into the piston 75. The cup 74 is of sufficient thickness to allow screw 73 to be sunk even with the top surface of the cup. Other practical ways to secure the pistons to the keys will be apparent and may be utilized if so desired.

It may be noted that key K6 of Fig. 22 has a handle or pressure plate which is to be contacted by a finger of the player, as on the conventionl reed clarinet, while the cup end K6' holds the piston or plunger P6 for the purpose of depressing the switch blade 6c, controlled by it, The other conventional keys of this clarinet function in a similar manner, being also adapted with pistons for the depression of switchblades as explained for K6.

Figure 7:
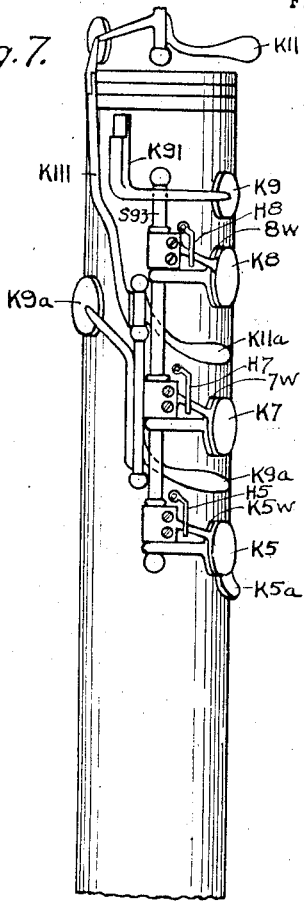
Fig. 7 is an exterior elevation showing part of the piston switch operating mechanism of the lower section of the clarinet.

In reference to new keys K5, K7, K8, K10, K12 and K14 illustrated in Figs. 5, 6, 7 and 8, these are attached to the rods or shafts S93 and S94 which normally hold only the rings on the Boehm clarinet, or they may be attached in any other convenient or practical manner. Reference to Fig. 22 shows the springs 46 and 72 which keep keys K8 and K7 automatically elevated when not depressed by a finger. Fig. 7 shows hooks H8, H7 and H5 which keep keys K8, K7 and K5 from opening too high. All new keys, K5, K7, K8, K10, K12 and K14 function as illustrated for the keys in Fig. 22, and are also provided with pistons to depress the switchblades operated by them.

The 18 new keys shown in Figs. 1 and 2, which have been added to the conventional Boehm system are: register keys K24, K25, K26 and K27; tone keys K23, K22, K15, K14, K12, K10, K8, K7, K5; auxiliary tone keys K15a, and K5a and other keys K12a, K151 and K111 extension.

Key K23, new, shown in Figs. 5, 1 and 2, with piston normally elevated, is attached to key K21 with piston normally depressed. These keys are fulcrumed centrally and the operating arm of K23 is pivotally connected with the piston end of K21. When the handle of K21 is depressed, which elevates its piston, this depresses the piston of K23, and vice versa.

K22, new, shown in Fig. 2, with piston normally elevated, is attached to K20 with piston normally depressed. These keys are also fulcrumed centrally with the operating arm of K22 pivotally connecting with the piston end of K20, so that when the handle of K20 is depressed this depresses the piston of K22, and vice versa.

Register key K27, new, shown in Figs. 5, 6 and 1, is attached to tone key K19. They are fulcrumed centrally with the operating arm of K27 pivotally connecting with the piston end of K19. The piston of K19 is normally depressed while the piston of K27 is normally elevated. When the handle of K19 is operatively depressed this will elevate the piston K19 and operatively depress the piston of K27 at the same time, and vice versa, as plainly illustrated in Fig. 6.

The tone key K15 shown in Figs. 13 and 2, having its piston normally elevated, is attached to an axially turnable shaft S15 (Fig. 13) to which the register key K25, new, is also attached, so that when K15 is normally elevated, key K25 is normally depressed. K15 is provided with projections K152 and K125 which connect the pivotal lever arm of K15a, new, so that depressing K15 will also depress K15a. The tone key K17 has the arm 17' which overlies arm K152, so that depressing K15 will depress K17 also, as on the conventional reed clarinet. K15 is further provided with projection K151, new, which is normally elevated since it is formed integral with key K15. K151 underlies the handle of register key K24, new, so that depressing the handle of K24 depresses projection K151 and key K15. Key K17 and ring 14w operate in unison since they are rigidly attached to the same partially rotatable shaft S17 as on the conventional clarinet. Key K14, new, and ring 14w work entirely independently of each other—that is either may be moved without affecting the other, through the break in ring 14w, shown in Figs. 14 and 13.

From the above description of key K15 and the other keys shown in Fig. 13, it will be seen that the tone key K15 with piston normally elevated, controls register key K25 with piston normally depressed, tone key K15a with piston normally elevated, tone key K17 with piston normally elevated, and the projection K151 normally elevated, also ring 14w normally elevated, all of which are attached or connected to it or operated thereby. When K15 is operatively depressed, then the other keys controlled by it change their positions, making K25 operatively elevated, and K15a, K17, K151 and ring 14w operatively depressed. Due to the projection K151 underlying the handle of K24—said K24 having normally elevated handle—when the handle of K24 is operatively depressed it also depresses K15 with it, and affects the other keys operated by K15 as explained in the preceding sentence. K17 and ring 14w are attached rigidly to shaft S17 and are independent of K15 in that they may be moved without moving K15 on account of the arm 17' overlying K152. The value of ring 14w is to operate key K17 with the first finger left hand, independently of K15, as on the conventional clarinet. When ring 14w is depressed by the first finger, left hand, it depresses K17 with it, and vice versa.

In further reference to keys shown in Figs. 13 and 14, consisting of the combination of register key K26, new, with handle normally elevated, K14, new, with piston normally elevated, ring 14w normally elevated, K12 and its extension K12a both normally elevated—when the handle of register key K26 is operatively depressed it will depress K14, ring 14w and K17. However, ring 14w and K14 are independent of K26 in that they may be moved without affecting K26 on account of underlying K26. It may be noted in Fig. 14 that the handle of K26 is not attached to the piston or arm of K14 or to ring 14w. Key K12, new, with piston normally elevated, has curved extension bar K12a, new, attached to it. Bar K12a overlies the arm of K14, but is not attached to it, so that K14 may be moved independently of K12 and K12a; however, when K12 is depressed it will depress K14 with it, through the bar K12a. K13 may be depressed by K12 through the ring connection made by 12w and K13c, as will be explained subsequently under "rings," but K13 is independent of the remaining keys shown in Fig. 13.

Key K11a (see Figs. 7, 1 and 2) has its extension bar K111 underlying the cup or plunger end of K11. K11a therefore has control of K11 in that when the handle of K11a is depressed it will elevate the piston of K11. K11 of course may be moved independently of K11a on account of overlying it. K11a is conventional on the 20-keyed Boehm system, but operates an independent hole by itself. On this electric clarinet I have adapted K11a to operate directly on the cup or piston end of K11 through the connection K111 which extends from the handle of K11a to the cup of K11, as shown in Fig. 7.

K11, shown in Fig. 5a, is adapted to function in a dual capacity by operating two switches which are controlled by the pistons 11 and 1a (Fig. 18). Piston 1a is not attached permanently to the handle of K11 as shown in Fig. 5a, but on account of being located and held in a hole in the manual wall, directly under the handle of K11 and over switchblade 1f of Fig. 18, which it operates, it will be depressed when the handle of K11 is depressed. The strength of the switchblade 1f, which piston 1a operates, will automatically elevate this piston when the handle of K11 is normally elevated.

In the following references to keys K1, K2, K2a, K3, K3a, K4, K4a, K6 and K6a (Figs. 1, 2 and 3) it will help to clarify their construction and operation, by noting that they are constructed and operated as on the conventional Boehm reed clarinet.

K1 is normally elevated; when it is operatively depressed it will depress K2 and K3 and pistons 1, 2 and 3 with it through the bars K34 and K33 (Fig. 2) as on the conventional Boehm clarinet.

Keys K3 and K3a are duplicates in that either will operate the piston 3 which is directly attached to K3. K3 may be moved independently of K3a on account of its connection (not shown) overlying K3a, but when K3a is depressed it will depress K3 with it.

K2 and K2a are duplicates in that either will operate the pistons 2 and 3 at the same time. Piston 2 is attached permanently to the cup of K2. A projection, K33, shown in Fig. 2, goes from the handle of K3 under the handle of K2, so that when K2 is depressed it will pull K3 depressed with it; therefore depressing the handle of K2 or K2a will depress pistons 2 and 3 at the same time for the proper and specified functioning of the tone switches illustrated in Fig. 18, as will be described subsequently.

K4 and K4a are duplicates in that either will operate the pistons 4 and 3. Note that the same projection, K33, which extends from K3 underneath K2, also goes under K4, as shown in Fig. 2. Therefore when the handle of K4 or K4a is depressed this will also pull piston 3 depressed with it, but will elevate piston 4 at the same time. Pistons 1, 2 and 3 are normally elevated; pistons 4 and 6 are normally depressed. It may be further noted that K3 may be moved without moving keys K2 or K4 on account of projection K33 underlying keys K2 and K4, but if either K2 or K4 is depressed, then K3 will be depressed also.

K6 and K6a shown in Fig. 3 are duplicates in that either will operate piston 6, which is attached to K6. It is understood that keys K1, K2, K3 and K4 are operated by the right hand and keys K2a, K3a, K4a and K6a are operated by the left hand. K6 is an extra convenience, enabling the operation of piston 6 by the left hand.

Keys which are entirely independent of the action of any other keys are K3a, K13, K20, K13a, K13b and K16. With K16 is also operated K13b at the same time on account of the proximity of these two keys to each other. This will have no functional effect on the switch operated by K13b at that time, as current cannot then get into the switch of K13b.

The remaining new keys which have been added, namely K5, K5a, K7, K8, K10 and K12, will be explained in connection with the functioning of the "rings," together with the conventional keys K9 and K13 which are operated by the rings of the clarinet.

"Rings" of the clarinet manual

Figure 8:
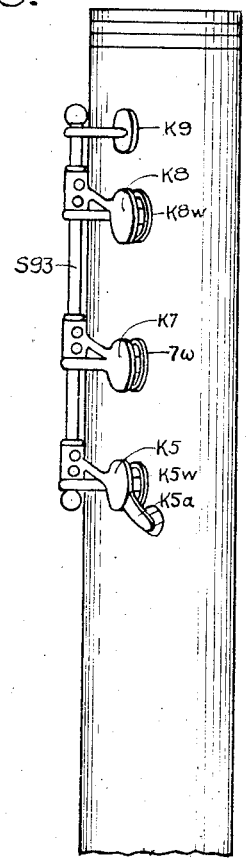
Fig. 8 is an exterior elevation of the lower section of the clarinet shown in Fig. 7, rotated to further illustrate the piston switch operating mechanism.

The "rings" of this electric clarinet, shown in Figs. 5, 6, 7 and 8, comprising rings 12w and 10w of Figs. 5 and 6, and rings 8w, 7w and 5w of Figs. 7 and 8, are constructed in the same manner and employed for the same purpose as the rings of the conventional clarinet—which is to operate keys K9 and K13. Rings 5w, 7w and 8w, together with key K9 shown in Figs. 7 and 8, are rigidly mounted on the partially rotatable shaft S83, and are normally in the elevated position. Therefore when rings 5w, 7w and 8w are operatively depressed they will depress K9, and vice versa.

It will be understood that the upper sections of the manual shown in Figs. 5 and 6, are united with the lower sections shown in Figs. 7 and 8 respectively, when in operative position, by means of cork joint J1 shown in Fig. 6, which is inserted in the open upper end of the sections shown in Figs. 7 and 8, as on the conventional clarinet.

By means of connections K91 and K92, shown in Figs. 7 and 5, when rings 5w, 7w and 8w are operatively depressed they will also depress the rings 10w and 12w and the key K13 on the upper section of the clarinet, which are also in the normally elevated position. It will be noted, then, that operatively depressing rings 5w, 7w and 8w, will depress both of the keys K9 and K13. It should be further noted that key K13 may be depressed by operatively depressing either one of the rings 10w or 12w, without at the same time depressing any of the lower rings 5w, 7w and 8w, on account of the connection K92 overlying K91. Ring 10w is entirely independent of rings 5w, 7w, 8w, 10w and 12w. Referring to K15 of Fig. 2, it will be noted that no ring is employed at this place as on the conventional clarinet; however, K15 is now adapted to operate the new keys shown in Fig. 13, which are not on the conventional Boehm clarinet, and which construction has been previously explained.

Relative to keys K5, K7, K8, K10 and K12, which are all new and are shown in Figs. 5, 6, 7 and 8, said keys are independent of the action of each other and also independent of the action of the rings underneath them, as they are mounted independently and partially rotatable, and overlie the rings. By being independent of the rings underneath them is meant that the rings 5w, 7w, 8w, 10w and 12w, may be operatively depressed without depressing the keys K5, K7, K8, K10 and K12 respectively, over them, as each of said keys move entirely independently on the shafts S83 and S84 on which they are rotatably mounted, as may be observed by noting the construction shown in Figs. 5, 7 and 8.

Now, on account of keys K5, K7, K8, K10 and K12 being mounted on top, or overlying the rings 5w, 7w, 8w, 10w and 12w respectively, when any one of the three keys on the lower section of the clarinet, namely keys K5, K7 or K8, are operatively depressed, this will depress all of the three rings underneath them, plus K9, and through the connections K91 and K92, will also depress rings 10w and 12w and key K13 on the upper section, the remaining keys staying in the normally elevated position, excepting the one operatively depressed.

The operative depression of either K10 or K12 on the upper section, will depress both rings 10w and 12w underneath, and the key K13, but will not affect any of the keys or rings on the lower section, on account of the connection K92 overlying K91. Ring 10w and key K13 (Fig. 5) are rigidly mounted on an independent shaft (not shown) which is directly underneath shaft S84; the operating arm of K13 (not shown) lies under and independent of the arm K13c of Fig. 5. Ring 12w and the arm K13c are mounted rigidly on the shaft S84; therefore from this construction of rings 10w, 12w and key K13, which is conventional on the Boehm clarinet, it will be seen that depressing key K10, new, with its ring 10w, will depress K13, but not K12, 12w or K13c. However, depressing key K12 with its ring 12w and the arm K13c, will depress K13 and ring 10w, and also key K10 through the arm K10c, but not K13.

Keys K5, K7, K8, K10, K12 and K13 may be held automatically elevated by the use of small springs, such as springs 68 and 70 under the keys K5 and K7, as illustrated in Fig. 22. Key K15 having somewhat complicated connections, functions efficiently by the use of a small spring to automatically elevate it.

Effects of new keys

Key K22, with its piston normally elevated, is attached to and operated by K20, shown in Fig. 2. Its chief function is to provide an additional fingering facility for the note A, on the second space of the treble clef, thereby permitting a perfect trill from G sharp on the second line, treble clef, to A, a half tone above it, by holding K16 and trilling with K20 (Figs. 1 and 2).

Key K29, with its piston normally elevated, is attached to and operated by K31, shown in Fig. 5. Its chief function is to finger the note A sharp on the second space, treble clef, thereby permitting a perfect trill from G sharp on the second line, treble clef, to this A sharp, which is a whole tone trill, by holding K18 and trilling with K21 (Figs. 5 and 1). The two trills referred to cannot be executed perfectly on the conventional Boehm clarinet.

K151 shown in Fig. 13, is rigidly attached to K15. K151 underlies register key K24 and is provided to enable the depression of K15 and the other keys associated with K15, by operatively depressing register key K24 by the thumb of the left hand, thereby freeing the thumb from the necessity of pressing on both K24 and K15 while playing in the first register of the clarinet.

K15a shown in Figs. 2 and 13, is an auxiliary tone key or master key, operating a switch controlling certain other switches inside the manual. Its function is to enable the use of K19 in a dual capacity, which it does by sidetracking the leadout L19, while K19 is operating K27 during the fifth register control, which will be explained in detail subsequently.

K5a, shown in Figs. 7 and 8, is another auxiliary or master key, operating a switch controlling other switches inside the manual. Its function is to enable K11 to be used in a dual capacity—that is to energize either of the leadouts L11 or L1, which will also be explained in detail subsequently.

K12a, shown in Figs. 5, 13 and 1, enables the holding of the key K14 depressed, by depressing K12 with the second finger left hand, thereby permitting the raising of the first finger, left hand, from the register key K26 as required for the fourth register control, or to depress the register key K27 as required for the fifth register control. K12a thus aids in making possible the fourth and fifth registers by maintaining a current connection through switch 14 to the lower switches of the manual, even though the first finger of the left hand be raised.

From the previous description relative to keys K15a, K12a and register keys K26 and K27, it will be seen that these keys make possible the fourth and fifth registers which control the two highest ranges of pitch, indicated in the scale above.

From the descriptions which were given relative to the construction and operation of the new keys K5, K6, K7, K8, K10, K12 and K14, under the discussions on keys and rings of this electric clarinet, it will be apparent that said new keys are adapted to operate tone switches, similar to the other manual keys. Their application to this clarinet is required for the reason that the conventional Boehm clarinet of 20 keys and 7 rings is not adapted with keys at the places where said keys K5, K7, K8, K10, K12 and K14 are utilized on the herein disclosed clarinet.

K111 has been provided to enable the operation of K11, especially for trilling, by the first or second fingers of the right hand, which ordinarily are more agile than the little finger of the left hand.

The register keys of the clarinet control switches which function in conjunction with each other and are interdependent, as are the tone switches of the manual. Register key K28 is a master key over the other register keys, in that when its piston is in the normally depressed position, the first or second register may function, the third, fourth and fifth registers being then isolated; but when the piston of key K28 is operatively elevated, the first and second registers are then isolated, and the third, fourth or fifth register may function, as may be observed by reference to Figs. 29 to 34 inclusive.

Register key K24 enables the extension of this clarinet an octave lower than the reed clarinet, in that when it is manipulated, i. e., its handle depressed and piston elevated, the first register can function.

Register keys K25 and K26 enable the securing of the third register through two paths, necessitated by the fingering of the clarinet, and at the same time they prevent switch 27, which connects the fourth and fifth registers, from functioning while the third register is functioning. Switches 25 and 26 (operated by keys K25 and K26) are quite dependent on each other to secure the two different connections for the third register control, as illustrated by Figs. 30 and 31.

Register key K27 is provided to secure the fifth register control. It controls the switch 27, as shown in Figs. 32 and 33, in that the leadouts for the fourth and fifth registers are connected to it. The paths for the fourth and fifth registers go through all of the register switches of the manual, while the paths for the remaining registers go through a lesser number of switches, therefore they are interdependent to secure the proper and specific functioning which will be described in detail under the topic on register wiring.

*Core, switches, pistons, cable and basic wiring plan*

In order to readily and fully understand the construction and manner of functioning of the switches inside the clarinet manual and the system of wiring in connection therewith, reference should be had to Fig. 22, which presents the section of Fig. 18 consisting of the keys K8, K7, K5 and K6, with their switches, wiring, leadouts, etc., which are characteristic of the working of the entire manual.

A core 5A (see also Fig. 4), is located inside the manual proper and prevented from moving by a cross pin 57, going through it and the walls of the manual at one end, while another such pin may be used near the opposite end to further secure the holding of it. This core is of non-conducting material, such as hard wood or other suitable material, and is removable to permit adjustments, repairs, etc. It provides an efficient means for constructing and maintaining the switches and wiring inside the manual, as grooves, such as 44 and 54, may be easily fashioned to locate the switchblades and terminals, and to permit entrance of the pistons or plungers to depress the switchblades. Reference to Figs. 4 and 4a will show a sectionized view of the core inside the tube of the manual and a top view of the grooves which hold the switchblades and receive the plungers, with an illustration of the interwiring of switches, and leadouts to the cable.

Furthermore, in connection with the interwiring of the switches, the wood core provides a most convenient and solid means for anchoring the various wires which are necessary between the switches themselves, and for the leadout wires shown in Fig. 22, such as 3J, 52, 55 and 56, which conduct the current from the switches to the contact points 39, 50, 66 and 67 respectively, and then through other elements to the cable 300, attached to the exterior of the manual. Small canals may easily be made at the surface of the core to carry some of the wires, and an extensive number of tunnels may be drilled in different directions through the wood to carry and extend other wiring to desired points. Wires located in canals at the surface may be firmly retained to the core by small staples, while wires which are tunneled will be held firmly by making the tunnels of a size to insure tight fitting of the wires inside them. The entire wiring system thus fastened to the core will be held rigidly and prevented from becoming tangled or shorted, and both the tone determining system and register selector system shown in Figs. 18 and 19 may therefore be maintained on the one core. Both systems are structurally interwoven but are insulated from each other and function entirely independently of each other. They are shown on separate drawings to simplify the tracing of each system.

The elements directly involved in the construction and operation of a manual switch of this invention are—an anchored, self-elevating, metallic switchblade, operated between two terminal conductors, by the piston of a key. Fig. 20c is a perspective of a switchblade between its two terminals, further showing the construction and operation. All switches of the clarinet, except the master switch in the mouthpiece, function as "two-way" switches. Outer terminals, or those nearest the wall of the manual, such as 8d of the switch operated by K8, connect with the cable 300, thus forming part of the leadout connections, while inner terminals, such as 8e of the same switch (see Fig. 22c) are connected with a following switch in the manual.

All switchblades, such as illustrated in Figs. 22a, 23b and 23c, and the blades 8c, 7c, 5c and 6c of Fig. 22, may be made of light spring steel, bronze, or other resilient conducting material preferably of non-rusting quality. They are bent or otherwise adjusted to provide springing tension within themselves when secured to the core in the proper manner, as for example, by the screw 40. Being self-elevating, they will automatically contact their outer terminal as illustrated by the blade 7c operated by K7, unless depressed by the action of a key which is normally closed on the manual such as K6, or operatively depressed by the action of a finger on a key as illustrated by keys K8 and K9 in dotted lines.

A small threaded holder 50, and screw 50, depicted in Figs. 22d and 22e, may be sunk in the core to receive and hold a switchblade. Holders are not shown surrounding the screws 40, 50, etc., of Fig. 22, in order to simplify the drawing. Such a holder provides secure and lasting anchorage, and further allows the blade to be removed for repair or replacement. Fig. 22, however, shows the application of similar holders 35, 36, 40, etc., which are sunk in the wall of the manual to hold the cable screws 34, 36, 37, etc., and the cable 300.

All switchblades may be conveniently made of the type shown in Figs. 22a and 22b, which present a flat top-view, with indentation 60, which allows contact material 61, such as silver or other suitable material to be pressed around or otherwise secured to the blade, thereby providing proper contact surface for the switchblade in its action between the two terminals 8d and 8e, as illustrated in Fig. 22c. Terminals 8d and 8e may be conveniently made of silver wire and anchored crosswise of the small grooves shown in Figs. 4 and 4a, in the core; sufficient space being provided between said terminals to allow the blade 8c (Fig. 22c) to be moved between them and to provide sufficient break in a circuit established between the switchblade and either terminal.

All keys of the manual which are associated directly with the operation of a switch are provided with a piston or plunger P8, attached to one end of the key as shown for the key K8 in Fig. 22. The pistons are made of non-conducting material such as fibre to provide insulation for the performer's hands, and are of sufficient length to fully depress a switchblade against its inner terminal—it being of considerable importance to have the piston long enough, that when the key is completely closed on the manual, the free end of the switchblade will be bent slightly inward, as plainly indicated by the depressed blades in Fig. 22. This slight bending of the free end of the blade is very important to the efficient functioning of the manual, in that it allows a key to be accidentally pressed slightly by the hands of the performer, as might happen in difficult or rapid technical passages, and still the connection with the inner terminal would not be broken, as it will be necessary to relieve the extra inward bend of the free end of the blade before contact will be broken.

The employment of fibre or other similar material not only provides insulation but also permits the operation of the switches with little or no noise. The tension or automatic springing feature of the switchblades allows rapid and accurate functioning of the switches as the blades will respond as fast as the player can move the keys which operate them.

Keys constructed similar to K6 are provided with a spring 65, which automatically depresses the piston end of the key when the handle is not being acted upon by the performer. It is necessary that the strength of the spring which operates such a key, be sufficient to overcome the strength or tension of the switchblade which it automatically depresses, to effect proper contact of the blade with its inner terminal when the key is naturally closed, i. e., the piston of the key fully depressed. It is further necessary that a key such as K7 open sufficiently on the manual when elevated, to permit the blade 7c controlled by it to fully contact the outer terminal 7d of its switch, by having the piston P7 fully removed from the switchblade 7c as plainly illustrated in Fig. 22, in which K7 is shown fully open, i. e., its plunger fully elevated. Keys of the K7 type are prevented from opening too high by a catch arrangement, such as K6, K7 and K8 shown in Fig. 7.

In further explanation of the construction and wiring of the switches inside the manual, referring to Fig. 22, it will be seen that inner terminal 8e of the first switch, which is operated by key K8, is connected by means of conductor 8K to the heel or base of the following switch operated by K7. The end of conductor 8K which is connected to the base of switchblade 7c, is fashioned in a loop 68 through which screw 55 passes, thereby forcing and holding said loop in contact with switchblade 7c.

Outer terminal 8d of the first switch, which is operated by K8, is wired by means of conductor 8J to contact point 39 anchored in the core, said conductor 8J being soldered permanently to contact point 39. A threaded holder 36, such as previously described in connection with anchoring the switchblades, is screwed permanently into the wall 104 of the clarinet manual to receive and hold threaded screw 36. Screw 36 passes through nut 37, to which is soldered wire conductor L8— conductor L8 going to cable 300 attached to the exterior of the manual. Screw 36 goes through holder 38 and connects with point 39 anchored permanently in the core.

This arrangement provides for removing the core for repairs, etc., after loosening all of the cable screws, such as screws 34, 36, 47, 69 and 70, removing the keys of the manual, and the holding pins such as pin 57. Cable 300 may also be removed by entirely removing all cable screws such as 36, 47, etc., from their holders 38, 49, etc.

Cable 300 is provided to carry the circuits to and from the manual and mouthpiece. It may be conveniently attached to the left side of the manual as illustrated in Figs. 1 and 2, where it does not interfere with the hands of the player or with any keys of the manual. It is retained firmly to the manual by cable screws, such as 36, 47, etc., and the terminal panel r, illustrated in Fig. 3, which is attached to the manual by means of the clamp X, shown in Figs. 9, 11 and 3.

Figure 9:
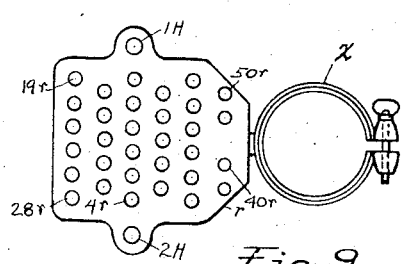
Fig. 9 is a top plan view of the terminal panel and clamp for attaching same to the manual.
Figure 11:
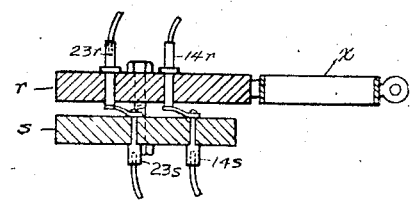
Fig. 11 is a sectionized view of the terminal panel and contact panel united as in operative position.
Figure 10:
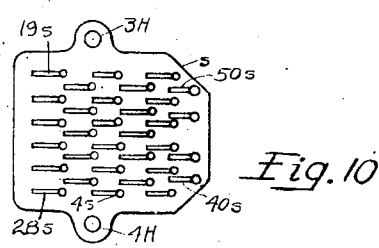
Fig. 10 is a top plan view of the complementary contact panel which is adapted for attachment to the terminal panel shown in Fig. 9.

The terminal panel r, shown in Fig. 9, and contact panel s, shown in Fig. 10, are provided to detach the clarinet manual from the remainder of the tone apparatus. Terminal panel r, is provided with contact points 50r, 40r, etc., which come in contact with spring contact elements 50s, 40s, etc., of the contact panel to effect the proper closure of all contacts between the panels when they are bolted together through holes 1H and 2H of the terminal panel which mate with holes 3H and 4H respectively, of the contact panel. Fig. 11 illustrates the connection of the two panels with only two contact connections being illustrated for convenience in drawing. This type of multiple plug is preferable to the "jack and jenny" type in that it may be more readily separated, by simply loosening the nuts of the two bolts which hold the panels together.

Fig. 22 being illustrational, the keys and switches are located for convenience in drawing and explanation. In actual construction it is of course necessary to locate each switch at a place in the core where it may be acted upon by its operating key of the manual. Key K8 and K5 are shown operatively depressed in Fig. 22. In regard to the remainder of the actual keys of the manual, some are normally elevated and some are normally depressed, as illustrated in Fig. 18.

Numerous changes and modifications of the switches, wiring and keys may be made, without departing from the basic principles of this feature of my invention, and therefore I do not wish to be limited to the precise details disclosed, relative to this feature, but to include such equivalent constructions and arrangements as will come within the same scope.

The system of interwiring of the switches makes them inter-dependent—that is switch 6 operated by key K6 cannot get current unless an unbroken line of connections exists from the master switch in the mouthpiece to that switch, thereby making switch 6 dependent on the action of the switches which precede it. Similarly, the lowest switch of the entire manual, which is operated by K1 of Fig. 18, cannot get current unless the switches preceding it are closed (in contact with their inner terminals, except switches 22, 23 and 1a, which must be in normal contact with their outer terminals), thereby presenting an unbroken line to switch 1.

In the following description it will be remembered that keys K8 and K5 with their switchblades 8c and 5c respectively, are in the operatively depressed position, indicated by pistons P8 and P5 in dotted lines, while keys K7 and K6 and their switchblades are in the normal position, indicated by pistons P7 and P6 in heavy lines. Keys K8, K7 and K5, are operated by the first, second and third fingers, respectively, of the right hand.

From the preceding description of construction and operation, it will be seen that from the closed master switch in the mouthpiece, over conductor 24K and through an unbroken line of connections from the mouthpiece to conductor 8i, which will be described in detail under the topic on the complete wiring system of the entire manual, current is led into the switchblade 8c, which is shown operatively depressed. However, if blade 8c were in its normally elevated position, it would be in contact with its outer terminal 8d and current would pass through outer terminal 8d, conductor 8J, contact point 39, screw 36, nut 37, and leadout L9, to the cable 300. When blade 8c is operatively depressed by the first finger, right hand, it will come in contact with its inner terminal 8e, which will result in breaking the connection which was established with the cable 300, and establishing a new connection through inner terminal 8e and conductor 8K to the following switch operated by K7, where if the blade 7c is in its normally elevated position as illustrated, current will pass through blade 7c, outer terminal 7d, conductor 52, and the other connections indicated, to the cable 300 as described for the previous leadout from switch 8. Should blade 7c be operatively depressed by the second finger, right hand, connection would be broken with outer terminal 7d and cable 300, and established with inner terminal 7e, and through conductor 7K to the following switch operated by K5, where the current could be directed into the cable or into the following switch operated by K6, as described for the preceding switches.

Fig. 22 will also serve to illustrate the facility with which this electric clarinet may be fingered in comparison with other conventional woodwind instruments. For example, let it be assumed that keys K8, K7 and K5 are operatively depressed by the first, second and third fingers respectively, of the right hand, and the piston of K6 is operatively elevated by depressing its handle with the little finger, right hand, which will allow the leadout L6 from switch 6 to function. Now should it be desired to make leadout L9, from the switch operated by K8 function, it will be necessary to raise only the first finger, right hand, from the depressed key K8, while the remaining keys K7 and K5 may be held operatively depressed. Such a fingering manipulation is impossible on other woodwind instruments now in common use, for in order to allow the hole operated by K8 to function properly on an instrument such as a reed clarinet, it will be necessary also to remove the fingers from the keys or holes operated by the keys K7 or K5. Further explanation of this fingering facility will be given under the description of the wiring system for the entire manual.

*Complete system of tone wiring of the manual with key and switch manipulations to cause all tone leadouts to function*

Since most of the keys of this electric clarinet manual work in combination with one or more other keys, a description of the effect of the various fingerings on the keys, and the resultant action on the switches inside the manual is important. The right hand thumb supports the instrument while playing as on the conventional clarinet; the left hand thumb together with the four fingers of the left hand and the four fingers of the right hand are used to operate the various keys of the manual in a manner practically identical to that required on the conventional Boehm reed clarinet. (Refer to Figs. 1 and 2 for manual and keys.)

Certain keys are so constructed that depression of the handle or pressure plate results in the elevation of the piston, as for example K18 shown in Fig. 5. Other keys are so constructed that depression of the pressure plate will result in direct depression of the piston attached to it, as for example K8 shown in Fig. 22, while still others are adapted to contact and operate keys connected to them, as in the case of K19 shown in Figs. 5 and 6, and K2a shown in Fig. 1. Therefore in the following description reference and distinction will be made to the depression or elevation of the handle or pressure plate of a key and to the depression or elevation of a piston attached to it.

Relative to the functioning of the various keys and switches, the term "depressed" refers to movement of the pistons and switchblades toward the central axis of the instrument, and the term "elevated" refers to movement of the pistons and switchblades in the opposite direction, or away from the central axis of the instrument. "Inner terminal" refers to the terminal of a switch contacted when a switchblade is depressed, and "outer terminal" refers to the terminal of a switch contacted when a switchblade is elevated. The terms "tone key," "tone switch" and "tone circuit" refer to a key, switch or circuit identified directly with the sounding of a tone, while the terms "register key," "register switch" and "register circuit" refer to means which control the electro-magnets governing the gang switches of the switchboard shown in Figs. 20 and 21.

The register keys K25, K26 and K27, are manipulated in connection with the tone keys to which they are attached or associated operatively; however, the system of wiring and keying of the tone determining system and register selector system is such that neither interferes with the other, as will be apparent in subsequent descriptions of the complete system of tone and register wiring, and key manipulation in connection therewith. A condition of the tone and register hook-ups is that only one tone leadout and only one register leadout may function at a time, which results in only one tone being sounded at a time on the tone producing apparatus. Each register circuit functions continuously during the period of its control, to direct the various tone circuits from the manual into one of five different register channels—thus each register circuit controls a different range of pitch.

The register wiring of the manual is such that the second register is connected automatically—that is, no keys are required to be manipulated to energize the magnet M93 (Fig. 20), which controls the gang switches of the second register. Further, the tone wiring of the manual is such that the tone leadout L17, which controls the tone G, on the second line of the treble clef and produced in the second register of the clarinet, is connected automatically; therefore to produce this tone no register and no tone keys are required to be manipulated, it being necessary only to blow into the mouthpiece, thereby closing the master switch there.

In the following description reference should be had to Fig. 18, which is a diagrammatic plan of the complete tone determining system of tone switches and wiring connections of the manual, and to Figs. 1 and 2, which show the keys of the manual which operate the switches. It will help to clarify the following description to note, that as far as practical, the same numeral is used to refer to a key of the manual, piston, switch, switch elements, conductors, etc., which have a common association—that is, key K1 of the manual operates piston 1, shown near the bell in the upper right hand section of Fig. 18; piston 1 operates switchblade 1c, between the terminals 1d and 1e and controls the leadout L1 of Fig. 18 and continuation leadout m1 of Fig. 21. Other connections follow the same system. The letter c in Fig. 18 applies to the switchblades, letter d applies to outer terminals and letter e applies to inner terminals. All leadouts have the capital letter L, prefixed. Switch 1 will be understood to be the switch operated by K1 and its piston 1, and this arrangement obtains for the remainder of the switches, keys, pistons, etc., shown in Fig. 18, and also in Figs. 23 to 33 inclusive.

Further reference to Fig. 18 will make apparent which pistons and switchblades are normally elevated and which are normally depressed, by noting that the normally depressed piston heads are shown located near the frame outline of the manual, while the normally elevated piston heads are shown located farther from the frame outline of the manual. The following pistons are normally elevated: 23, 22, 14, 13, 12, 10, 1a, 9, 8, 7, 5, 5a, 17, 1, 2, 3, 15 and 15a; the following pistons are normally depressed: 19, 18, 13a, 6, 4, 9a, 11, 13b, 16, 20 and 21.

It will further help to clarify the following description for one familiar with the fingering of the Boehm clarinet, to note that the fingerings of the second register of this electric clarinet, to produce the notes from E flat on the fourth space below the treble clef up to and including B natural on the third line of the treble clef, thereby utilizing all of the keys of the manual from K1 to K23 inclusive, are identical with the basic fingerings of the Boehm reed clarinet to produce the same range of notes, with the distinction that the employment of the new keys K22 and K23 to finger the notes A and A sharp respectively, on the second space of the treble clef, is not conventional on the Boehm clarinet, and further, that the key K11 has been adapted to produce an additional fingering for E flat on the fourth space below the treble clef and tones in the other registers associated with this fingering. A more detailed description of fingering facilities of this clarinet is given subsequently under the topic on new and unique fingerings for the electric clarinet.

The second register manipulation of the manual will be considered through the following description; in that no register keys are required to be manipulated (the second register control being connected automatically) therefore all of the tone keys may be utilized and all tone leadouts made to function.

Figs. 35 and 35a are simple charts indicating fingers depressed, switches operatively depressed, switches operatively elevated, and leadouts which function thereby, and are provided to assist in simplifying the fingering movements and switch movements in tracing the current connections to all of the leadouts of Fig. 18. In explanation of this chart, horizontal line (a) indicates the pistons operated by the left hand thumb; line (b) indicates pistons operated by the first finger, left hand, and so on for the remainder to line (j) which indicates the leadouts which function as a result of finger and switch movements. The capital letter, D, at the top of each vertical column indicates switches operatively depressed, the capital letter, E, at the top of each column indicates switches operatively elevated; therefore reading from the top downwards in vertical column 6 (Fig. 35a), to make the leadout L6 function, it will be apparent that the left hand manipulation will be: thumb depressing switches 17, 15 and 15a, first finger depressing switch 14, second finger depressing switches 13 and 12, and third finger depressing switch 10; the right hand manipulation will be: first finger depressing switches 9 and 8, second finger depressing switch 7, third finger depressing switches 5 and 5a, and little finger operatively elevating switch 6, which will result in an unbroken line of connections from the mouthpiece to leadout L6. The other vertical columns are indicative in a similar manner. This chart, then, used in connection with Fig. 18 and the description to be immediately given, will assist in tracing connections to get current into all of the various tone leadouts of the manual.

Having previously described the keys of the clarinet manual which work together, a detailed description will now be given of the various fingering movements on those keys, together with the action of the switches operated by the keys, to direct current through the various tone switches and to all of the tone leadouts of the manual.

Starting from a suitable source of power P50, as indicated in Figure 21, the current is directed over conductor W50, through the contact 50s of the complementary terminal plate (Fig. 20), contact 50r of the terminal plate (Fig. 18), and over conductor 50R to the pneumatic cylinder 109 (Fig. 18) in the mouthpiece and then through the closed contacts 113 and 116 which was described in detail under the topic on the mouthpiece. Current cannot get to any of the tone switches of the manual unless the master switch in the mouthpiece is first closed by air pressure from the lungs of the performer. From the closed master switch, current proceeds over the conductor 24K (Fig. 18) to switchblade 19c. Blade 19c is operated by the piston 19 of the key K19 (see Figs. 1 and 2 for key references). If the key K19 remains normally depressed, blade 19c will be in contact with its inner terminal 19e through which current will pass and proceed over conductor 22J to blade 22c.

Key K22 is normally elevated, therefore switchblade 22c is also normally elevated. If the piston of K22 is then operatively depressed by depressing the handle of key K20 (Fig. 2) with the first finger, right hand, blade 22c will be brought into contact with inner terminal 22e, through which current will pass to the leadout L22 (Fig. 35, vertical column 22).

Figure 20:
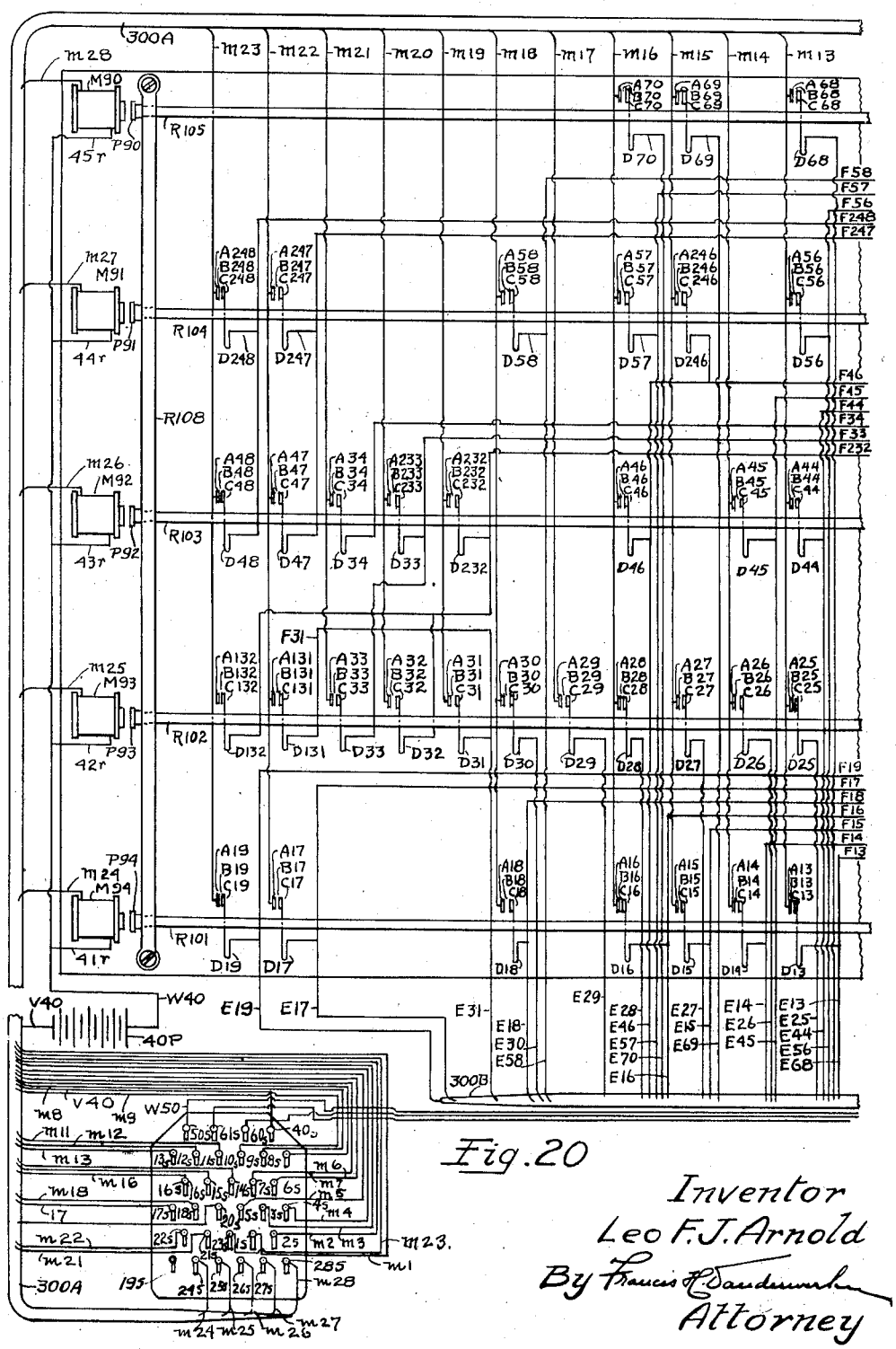
Fig. 20 is a diagrammatic plan view of the left hand section of the register control board or switchboard, showing the five registers of magnetically controlled gang switches and the wiring connected therewith, also the contact panel.

Leadout L22 proceeds through cable 300, through terminal and contact panels r and s, attached near the bell of the manual, then through cable 300A to the switchboard shown in Figs. 20 and 21, where its continuation m22 is wired to one of the stationary contacts of the fourth register, one of the third register, one of the second register and one of the first register. All tone leadouts from the manual follow the same general system as just described for L22, and will be fully traced and described in connection with the subsequent switchboard explanation.

Key K20 is used to operate switches 20 and 22, controlled by keys K20 and K22 respectively. The use of K20 to operate K22 has no functional effect on switch 20 at that time as switch 20 is then isolated by depressed blade 19c (see Fig. 25), an open connection existing at outer terminal 19d through which switch 20 is connected. Similarly, key K21 is used to operate switches 21 and 23, but the use of K21 to operate the switch of K23 has no functional effect on switch 21 at that time, as the same open connection described above exists at outer terminal 19d. Further, the use of keys K20 and K21 in the functioning of their own switches 20 and 21, has no functional effect on the switches operated by keys K22 and K23 at that time, as switches 22 and 23 will then be isolated through the open connection which will exist at inner terminal 19e (Fig. 23), on account of key K19 being operatively elevated to allow connection to be made with switches 20 and 21, which will be further explained.

Connection has been described as far as leadout L22, through the operatively depressed blade 22c. Now should key K22 be released, putting its piston in the normally elevated position, blade 22c will automatically resume its elevated position, which will break contact with inner terminal 22e, and leadout L22, and establish contact with outer terminal 22d through which current will then pass and proceed over conductor 22K to the normally elevated switchblade 23c (see Fig. 18).

If the piston of key K23 is operatively depressed by depressing the handle of K21 with the first finger, right hand, (see Fig. 5) blade 23c will also be operatively depressed and brought into contact with its inner terminal 23e through which curernt will pass and proceed over leadout L23, (Fig. 35, vertical column 23). Should key K23 be released, putting its piston in the normally elevated position, blade 23c will automatically resume its normally elevated position also, which will break contact with inner terminal 23e and leadout L23 and establish contact with outer terminal 23d through which current will pass and proceed over conductor 23K to normally depressed blade 18c.

If the piston of K18 is operatively elevated by depressing the handle of K18 by the first finger, left hand, blade 18c will automatically elevate itself and contact its outer terminal 18d through which current will pass and proceed over leadout L18 (Fig. 35, vertical column 18).

Should K18 be released, its piston will be automatically depressed which will in turn depress blade 18c, thereby breaking contact with outer terminal 18d and leadout L18, and establishing contact with inner terminal 18e, through which current will pass and proceed over conductor 18K to normally elevated blade 17c, outer terminal 17d and leadout L17. It may be noted by tracing the connections from the master switch to the blade 17c which is normally elevated, that leadout L17 may be made to function without manipulating any keys of the manual, but by simply closing the master switch in the mouthpiece.

Now, if the first finger, left hand, is depressed on the handle of register key K26, key K17 will be depressed through the ring 14w connection, illustrated in Figs. 13 and 14. Key K14 will also be depressed by the action of the handle of K26, and the piston of K26 will be elevated. However, the depression of K14 has no functional effect on its own switch 14, at that time, as current cannot get to switch 14, because switch 15 is still normally elevated (Figs. 18 and 25) neither can the manipulation of register switch 26 have any functional effect at that time, as switch 26 is isolated during the second register manipulation (Fig. 29); it being remembered that the second register manipulation of the manual is being considered through this topic on connections to leadouts.

Key K17 having been operatively depressed by the first finger, left hand, blade 17c will also be operatively depressed, which will break contact with outer terminal 17d and leadout L17 and establish contact with inner terminal 17e through which current will pass and proceed over conductor 17K to normally elevated blade 15c.

K17 may be depressed by another fingering manipulation and that is by depresing K15 with the left hand thumb, which also depresses key K15a, illustrated in Fig. 13, and of course also depresses the blades 15c and 15f (Fig. 18). When blade 17c is operatively depressed by the action of K15, current will proceed from blade 17c to operatively depressed blade 15c. Contact will also be established at that time with conductor 15w, inner terminal 15h of switch 15a, depressed blade 15f, and conductor 19K, but will run into an open switch at outer terminal 19d of switch 19, as K19 will be normally depresed at that time; therefore no leadout can function through any brack-tracking, thereby maintaining the condition of the hook-up—that only one tone leadout can function at a time. Current has now been described from the mouthpiece as far as the blade 15c of switch 15.

It is important at this time to describe the path and connections to get current into switches 20 and 21, and it is important further, to describe the function of auxiliary tone switch 15a. Figs. 23, 24 and 25 have been provided to more plainly illustrate the functioning of switches 19 and 15a singly, and in combination, than shown by Fig. 18. Few numerical designations are given with Figs. 23, 24 and 25, as the path from the master switch may be easily and clearly traced through switches 19 and 15a.

Key K19 has been adapted to function in a dual capacity, namely: (a) to cause its own leadout L19, to function from inner terminal 21e of switch 21, as illustrated in Figs. 23 and 18, while playing in the second and third registers, and (b) to operate the register key K27 for energizing the fifth register magnet which controls the gang switches of the fifth register on the switchboard—leadout L19 being rendered inoperative during this latter manipulation. (See Figs. 1 and 6 for keys K19 and K27, and see Fig. 33 for fifth register control.)

K19 then manipulates register key K27 while causing its own leadout L19 to function in the second and third registers, but this has no functional effect at that time on register switch 27 operated by K27, as said switch 27 is isolated while playing in the second and third registers as shown in Figs. 29, 30 and 31.

It is, however, necessary to provide means to prevent the leadout L19 functioning continuously while the piston of K19 is operatively elevated in manipulating register key K27 for the fifth register control, by throwing the current which would otherwise go to L19, into switch 15 from where it may be directed to any of the other tone switches below switch 15 in the manual. Therefore, the auxiliary switch 15a has been provided to do this as illustrated in Fig. 24. Switch 15a is operated by K15a which is in turn controlled and operated by K15, illustrated in Fig. 13. K15 and K15a are both manipulated by the left hand thumb and are in the normally elevated position, therefore both switches 15 and 15a are elevated or depressed at the same time.

Reference to Figs. 23, 24, 25 and 18 will show that auxiliary switch 15a cannot function unless switch 19, from which it gets its current, is operatively elevated. Therefore, when switch 19 is operatively elevated, switch 15a can throw the current into either of two paths, which are: (a) into switches 20 and 21, when switch 15a is normally elevated, as shown by Fig. 23, and (b) into switch 15, when switch 15a is operatively depressed, shown in Fig. 24, from where the current may be directed to any of the tone switches below 15. Switch 15a therefore allows the key K19 to function in two separate capacities.

Further reference to Figs. 23 and 25 will show that the switch 19 controls the functioning of switches 20 and 21 on the one hand and switches 22 and 23 on the other hand, in that (a) referring to Fig. 25, when switch 19 is normally depressed, switches 22 and 23 may function—switches 20 and 21 being then isolated, and (b) referring to Fig. 23, when switch 19 is operatively elevated, (with switch 15a normally elevated) switches 20 and 21 may function and switches 22 and 23 will then be isolated.

Switch 15 may get current over two paths: (a) referring to Fig. 25—through normally depressed switch 19, normally elevated switches 22 and 23, normally depressed switch 18, and operatively depressed switch 17, which has been previously described, and which path is followed when playing in the first, second and third registers; and (b) referring to Fig. 24—through operatively elevated switch 19 and operatively depressed switch 15a, which path is followed when playing in the fifth register, due to the continuously elevated piston of K19 operating register key K27 for the fifth register control.

Referring again to Figs. 18 and 23, in order to get current into switches 20 and 21 it is necessary that the handle of K19 be operatively depressed by the first finger, left hand, which operatively elevates its piston and switchblade, and it is also necessary that key K15a with its piston and switchblade remain in the normally elevated position at the same time. Current then proceeds from the master switch contact 116, over conductor 24K to operatively elevated blade 19c, outer terminal 19d and conductor 19K, to the normally elevated blade 15f of the switch operated by K15a, outer terminal 15g and conductor 15z, to normally depressed blade 20c of the switch operated by K20.

If the handle of K20 is operatively depressed by the first finger, right hand, the piston and switchblade operated by it will be brought into the operatively elevated position (the handle of K19 being held operatively depressed meanwhile, by the first finger left hand—see Fig. 35, vertical column 20). Current will then proceed from operatively elevated blade 20c through outer terminal 20d and to the leadout L20.

Should the key K20 be released, its piston and blade 20c will return to their normally depressed positions (key K19 being still held in the operative position). Current will then proceed from blade 20c, over conductor 20K to the normally depressed blade 21c, through inner terminal 21e and to the lead-out L19 (Fig. 35, vertical column 19). If the key K21 is operatively manipulated at this time by depressing its handle while the handle of K19 is held operatively depressed as before, the blade 21c will come in contact with its outer terminal 21d, through which current will pass to the leadout L21 (Fig. 35, vertical column 21). It may be noted that both terminals of switch 21 connect with leadouts. This same condition exists in switch 1, located at the opposite end of the manual, to be explained later.

The manipulation of the keys K20 and K21 also manipulates K22 and K23 respectively, but has no effect on the switches operated by K22 and K23 at that time as they are then isolated at terminal 19e, as has been previously explained.

Keys K20 and K21 will now be considered to be returned to their normal positions on the manual. If the auxiliary key K15a be operatively depressed at this time, by depressing K15 with the thumb of the left hand (Fig. 13), while the handle of K19 is held depressed by the first finger, left hand, (Fig. 35, vertical column 15), the switchblade 15f will be operatively depressed (Figs. 24 and 18), which will break the connection with switches 20 and 21 at outer terminal 15g of switch 15a, and then throw the current through inner terminal 15h and over conductor 15w to the operatively depressed blade 15c operated by K15 which is now being held operatively depressed by the left hand thumb. From the depressed blade 15c current will be directed to inner terminal 15e from where it may be directed to any of the other switches below switch 15 in the manual. The tone path just described is that taken by the current while playing in the fifth register of the clarinet. Two paths have now been described (Fig. 35, vertical column 15) to get current into switch 15 from where the tone manipulation is the same for all five registers of the clarinet.

It will be remembered that key K17 may be depressed by the action of the first finger, left hand, or it may be depressed by the action of the left hand thumb through the depression of K15, both of which have been previously described. The manipulation and functioning of all keys and switches between the mouthpiece and switch 15 having been described, the continuation of the current through the remaining switches of the manual and the key manipulation necessary therewith will now be described.

Should key K17 be depressed by the first finger, left hand, through the depression of the handle of register key K26 (Fig. 13), which elevates the register switch 26 and depresses the tone switch 14 at the same time—no other keys being manipulated and the two switches 26 and 14 having no functional effect at that time as previously explained—the switchblade 17C (refer to Fig. 18), will be brought into contact with its inner terminal 17e, through which current will pass and proceed over conductor 17K to normally elevated blade 15c, through outer terminal 15d and conductor 16v to the leadout L16 (Fig. 35, vertical column 16).

The second fingering manipulation to secure the functioning of L16 is: thumb depressing K15, which will also depress K15a but not K14 (Fig. 13), and the first finger, left hand, raised, which will cause the blades 17c, 15c and 15f to be operatively depressed and blade 14c of switch 14 to remain normally elevated. Current will then proceed from the blade 17c, through inner terminal 17e, over conductor 17K to the depressed blade 15c, through inner terminal 15e, over conductor 15K to the normally depressed blade 16c. If the handle of K16 is then operatively depressed by the first finger, right hand, which will elevate its piston, the blade 16c will come in contact with outer terminal 16d through which current will pass to the leadout L16 (Fig. 35, vertical column 16). To summarize the above—there are two distinct fingerings whereby leadout L16 may be made to function, namely (a) depression of the first finger, left hand, on the handle of K26, and (b) depression of the thumb on K15, plus the depression of the handle of K16 (Fig. 25, vertical column 16, for both).

If key K16 is reelased, its piston will be automatically depressed which will depress the blade 16c, thereby breaking contact with outer terminal 16d and leadout L16, and bringing the blade 16c into contact with inner terminal 16e, through which current will pass and proceed over conductor 16K to switchblade 14c. Blade 14c being normally elevated will be in contact with its outer terminal 14d through which current will pass to leadout L15. In order to make L15 function it is necessary only to depress the thumb on K15, which will maintain the unbroken path from the mouthpiece to L15 (Fig. 35, vertical column 15).

It should be observed that leadout L15 is from normally elevated switch 14 and not from switch 15, and further noted, that in practically all cases, keys which are normally elevated on the manual have their leadouts from the following normally elevated switch as explained for leadout L15, while keys which are normally closed, have their leadout from their own switch, such as L16 proceeding directly from switch 16.

The thumb having been operatively depressed on K15, if the first finger, left hand, is then operatively depressed on the handle of register key K26, the tone key K14 underneath it will also be depressed (Fig. 13). Elevation of piston 26 by depressing the handle of K26 has no functional effect on register switch 26 at that time, in that the second register functioning is now being considered—switch 26 being isolated at that time (Fig. 29), as previously explained.

Blade 14c being operatively depressed by the first finger, left hand, contact will be broken with its outer terminal 14d and leadout L15 and established with inner terminal 14e, through which current will pass and proceed over conductor 14K to blade 13c. Blade 13c being normally elevated and in contact with its outer terminal 13d, current will pass through 13d to leadout L14 (Fig. 35, vertical column 14).

If K13 be now operatively depressed, in addition to the already operatively depressed keys K17, K15 and K14, the blades operated by these keys will of course be in the operatively depressed position (Fig. 35a, vertical column 13). Depression of K13 may be accomplished by depressing the first finger, right hand, on K8 which acts on the "ring" connections between K8 and K13, or it may be depressed through the action of any of the other rings of the clarinet, as was explained under the topic on the rings of the clarinet.

Depression of blade 13c breaks contact with its outer terminal 13d and leadout L14, and establishes contact with inner terminal 13e, through which current will pass and proceed over conductor 13K to blade 12c. Blade 12c being in the normally elevated position and in contact with its outer terminal 12d, current will pass through 12d to the conductors 13p and 13t and to leadout L13.

Conductors 13p, 13t and 13n form part of the common connection between outer terminals 12d of switch 12, terminal 13f of switch 13a, and terminal 13w of switch 13b. Said common connection exists because there are three distinct fingerings, and therefore three different switches, which may directly function to send current over leadout L13.

The first fingering to energize L13 having been explained, the second fingering is as follows: thumb and first finger, left hand, remain operatively depressed as before; the second finger, left hand, is operatively depressed on K12, the third finger, left hand, is operatively depressed on the handle of K13a which elevates its piston, while the first finger right hand, may now be raised, as the depression of K12 depresses K13 with it, through the action of the ring under K12, as described under "rings" of the clarinet. Blades 17c, 15c, 14c, 13c and 12c are now operatively depressed and blade 13g operated by K13a is operatively elevated (Fig. 35a, vertical column 13). In addition to this blade movement, blades 22c and 23c are normally elevated, and blades 19c, 18c and 16c are normally depressed, to maintain the unbroken line from the mouthpiece to switch 13a which is now functioning. Current has been described to leadout L13 through normally elevated blade 12c. K12 and its blade 12c having been operatively depressed, contact will be broken with outer terminal 12d and leadout L13, and established with inner terminal 12e, through which current will pass and proceed over conductor 12K to operatively elevated blade 13g of the switch operated by K13a, through outer terminal 13f and over conductors 13n and 13t to leadout L13 (Fig. 35a, vertical column 13).

The third fingering movement to energize leadout L13 is: thumb, first and second fingers, left hand, remain operatively depressed as previously; key K13a is released by the third finger, left hand, and instead, the handle of K13b is operatively depressed by the first finger, right hand, which thereby elevates the piston of K13b (Fig. 35a, vertical column 13). It will be observed that keys K12, K13a and K13b are triplicates. Release of K13a depresses blade 13g operated by it, which breaks contact with outer terminal 13f, and establishes contact with inner terminal 13h, through which current will pass and proceed over conductor 13p to operatively elevated blade 13i, outer terminal 13w and leadout L13.

If the key K13b is now released it will depress the blade 13i, thereby breaking contact with outer terminal 13w and leadout L13, and establishing contact with inner terminal 13j through which current will pass and proceed over conductor 13z to the blade 10c operated by K10. In order to maintain the unbroken line from the mouthpiece to switch 10, the thumb, first and second fingers, left hand, will be operatively depressed and all of the other keys between the mouthpiece and the switch operated by K10 will be in their normal positions (Fig. 35a, vertical column 12). Blade 10c being in its normally elevated position, will be in contact with its outer terminal 10d through which current will pass to leadout L12. Leadout L12, then, proceeds from switch 10.

At this time, if key K10 and its blade 10c are operatively depressed by the third finger, left hand, contact will be broken with outer terminal 10d and leadout L12, and established with inner terminal 10e, through which current will pass and proceed over conductor 10K to the normally elevated blade 5f of the auxiliary switch 5a. Thumb, first, second and third fingers, left hand, will now be operatively depressed (Fig. 35a, vertical column 10).

It will be important at this time to explain the purpose and functioning of the auxiliary switch 5a. Key K11, operated by the little finger, left hand, has been adapted to operate two distinct switches as shown by Fig. 5a. The two switches operated by K11 (see Fig. 18), are: (a) switch 11 which functions underneath the piston end of K11, and (b) switch 1a which functions underneath the handle end of K11. Switch 11 may be distinguished as the normal or ordinary one which key K11 would be expected to operate, and switch 1a may be distinguished as a duplicate of switch 1, operated by the key K1 of the manual. Fig. 18 will show that switches 1 and 1a have a common leadout, L1, while switch 11 has its own leadout, L11.

Auxiliary key K5a and its switch have been devised to control the functioning of the two switches operated by K11. Reference to Figs. 1, 7 and 8 will show that key K5a is attached rigidly to the key K5. They are operated by the third finger, right hand, and both are elevated or depressed together. Current connections have been described to switch 10, which is in turn connected to switch 5a. When auxiliary switch 5a is in the normally elevated position, switch 11 can then function and switch 1a is isolated at that time, as illustrated in Fig. 26. When switch 5a is in the operatively depressed position, switch 11 is then isolated and switch 1a can function at that time after switches 8, 7 and 5 have been operatively depressed and switch 6 remains normally depressed, as illustrated in Fig. 27, which further shows that should the blade 1f of switch 1a be then operatively depressed the leadout L1 would function, while if the blade 1f remains in the normally elevated position connection will be made in the normally elevated position connection will be made to switch 3. K11, then, may be utilized for two distinct and different fingerings in each register, as will be explained subsequently under the description on new and unique fingerings.

Continuing now with the detailed path of the current from switch 10, reference will again be had to Fig. 18, where the depressed blade 10c directs the current through inner terminal 10e and over conductor 10K to blade 5f of auxiliary switch 5a. If the key K5a and its blade 5f remain normally elevated, blade 5f will contact outer terminal 5g, through which current will pass and proceed over conductor 5v to blade 11c of switch 11. If the handle K11 is now operatively depressed by the little finger, left hand, in addition to the previously depressed thumb, first, second and third fingers, left hand, the piston of K11 and blade 11c will be operatively elevated (Fig. 35a, vertical column 11), bringing blade 11c in contact with its outer terminal 11d through which current will pass to the leadout L11.

If key K11 is released, its piston will assume the normally depressed position, which will also depress blade 11c, thereby breaking contact with outer terminal 11d and leadout L11, and establishing contact with inner terminal 11e, through which current will pass and proceed over conductor 11K to normally elevated blade 9c of switch 9, through outer terminal 9d and to leadout L19. To get current from the mouthpiece to leadout L19 it is necessary only to have the thumb, first, second and third fingers, left hand, depressed on their respective keys K15, K26, K12 and K10 (see Fig. 1 for keys and Fig. 35a, vertical column 10, for switches operatively manipulated).

If key K9 is then operatively depressed through the action of the second or third fingers, right hand, depressing keys K7 or K5 respectively (Figs. 7 and 8), the blade 9c will also be operatively depressed as described under the explanation of the rings of the clarinet. Key K8 and its blade 8c will not be depressed at that time but will remain in the normally elevated position. Depression of K5, K7 or K8 will depress all of the rings 5w, 7w and 8w, respectively, and the key K9, but the depression of any individual key of the group K5, K7 or K8, will not affect the other keys of this group, as has also been explained under the discussion on the rings of the clarinet.

Blade 9c having been operatively depressed, contact will be broken with outer terminal 9d and leadout L10, and established with inner terminal 9e, through which current will pass and proceed over conductor 9K to the blade 9f of switch 9a. Blade 9f being in the normally depressed position and in contact with inner terminal 9h, current will pass through 9h and proceed over conductors 9v and 8i to normally elevated blade 8c, outer terminal 8d and over conductor 8J to leadout L8 (Fig. 35a, vertical column 9). Connection is also made from depressed blade 9f with conductor 5K, but runs into an open switch at lower terminal 5h of the switch operated by piston 5a, which is normally elevated.

There are two distinct fingerings by which leadout L8 may be made to function. The one just described requires the thumb and first three fingers, left hand, to be operatively depressed, and the second or third finger, right hand (or both of these latter fingers) to be operatively depressed, also, (Fig. 35a, vertical column 9). The second fingering required to make leadout L8 function is: thumb and first three fingers, left hand, depressed; first finger, right hand, depressed on K8 and the handle of K9a operatively depressed by the third finger, right hand (Fig. 35a, vertical column 9).

Depressing the handle of K9a elevates its piston, while the first finger, right hand, being operatively depressed on K8 also depresses K9 with it through the action of the ring connection under K8. Current will then proceed from the depressed blade 9c of switch 9, through inner terminal 9e and over conductor 9K to the operatively elevated blade 9f of switch 9a. Blade 9f being in operative contact with its outer terminal 9g, on account of the handle of K9 having been operatively depressed, as described for the second fingering above, current will pass through conductor 9J to leadout L8.

Now if key K9a is released, while the first finger, right hand, is operatively maintained on depressed key K8, the piston of K9a will be automatically depressed which will also depress the blade 9f, thereby breaking contact with outer terminal 9g and leadout L8, and establishing contact with inner terminal 9h, through which current will pass and proceed over conductors 9v and 8i to the operatively depressed blade 8c of switch 8, through inner terminal 8e, over conductor 8K to normally elevated blade 7c of switch 7, through outer terminal 7d and to the leadout L8 (Fig. 35a, vertical column 8).

If K7 is then operatively depressed by the second finger, right hand, at this time, the fingering on the manual will then be: thumb and first three fingers, left hand, operatively depressed and the first two fingers right hand also operatively depressed on their keys K8 and K7 respectively (Fig. 35a, column 7). The switchblade 7c will also be operatively depressed, breaking contact with its outer terminal 7d and leadout L8, and establishing contact with inner terminal 7e, through which current will pass and proceed over conductor 7K to normally elevated blade 5c of switch 5, through outer terminal 5d and leadout L7. Leadout L7, therefore, functions from switch 5.

The fingerings just described have been with auxiliary key K5a in the normally elevated position. When the key K5 is next operatively depressed by the third finger, right hand, key K5a will be automatically depressed with it on account of K5 and K5a being joined together. The fingering on the manual will then be: thumb and first three fingers, left hand, operatively depressed as previously, and the first three fingers of the right hand operatively depressed on the keys K8, K7 and K5, respectively. The depression of auxiliary key K5a and its blade 5f now switches the current path from that previously described and illustrated in Fig. 26, namely through outer terminal 5g of switch 5a, conductor 5v, switch 11, etc., to the new path shown in Fig. 27, from depressed blade 5f, over conductor 5K, through the operatively depressed blades 8c, 7c and 5c, inner terminal 5e and conductor 5J, to the normally depressed blade 6c of the switch operated by K6.

Connections at this time are also made from conductor 5K (Fig. 18) through conductor 9v, operatively depressed blade 9f of switch 9a, conductor 9K, operatively depressed blade 9c of switch 9, conductor 11K, normally depressed blade 11c of switch 11, and back over conductor 5v, but there is an open switch at the outer terminal 5g of the operatively depressed switch 5a, therefore there is no back-tracking and no two tone leadouts functioning at the same time, which further maintains the condition of the herein described hook-up of only one tone leadout functioning at a time.

If the handle of K6 is operatively depressed by the little finger, right hand, the fingering on the manual will then be: thumb and first three fingers, left hand, operatively depressed, first three fingers, right hand, operatively depressed and the little finger, right hand, operatively depressed on the handle of K6 (Fig. 35a, column 6). Depression of the handle of K6 elevates its piston, thereby allowing blade 6c to automatically elevate itself and contact its outer terminal 6d. Current connections having been previously described to the blade 6c, it will then pass through operatively elevated blade 6c, outer terminal 6d and to the leadout L6.

If the key K6 is released by the little finger, right hand, its piston will be automatically depressed which will also depress the blade 6c, thereby breaking contact with outer terminal 6d and leadout L6, and establishing contact with inner terminal 6e, through which current will pass and proceed over conductor 6K to blade 1f of switch 1a (see also Fig. 27).

Now if the handle of K11 is operatively depressed at this time by the little finger, left hand, the fingering on the manual will be: thumb and first three fingers, left hand, depressed as previously; the first three fingers, right hand, depressed, and the little finger left hand depressed on the handle of K11 (Fig. 35a, column 1). The depression of the handle of K11 depresses the piston of switch 1a and the blade 1f (Fig. 18). Current will then pass from depressed blade 1f, through inner terminal 1h and over conductor 1J, to leadout L1, which is also connected to the leadout from the lower terminal of switch 1, to be described subsequently. Depression of the handle of K11 will also elevate the switch 11 which works from the cup end of K11, but this has no functional effect at that time as switch 11 is then isolated on account of switch 5a being depressed, as explained previously (see Fig. 27).

If the handle of K11 is released, the blade 1f of switch 1a will automatically elevate itself, contacting its outer terminal 1g, through which current will pass and proceed over conductor 1v to normally elevated blade 3c of switch 3, outer terminal 3d and to leadout L5—L5 proceeding from the switch 3. The fingering to make L5 function is: thumb and first three fingers, left hand, depressed and the first three fingers, right hand, depressed (Fig. 35a, column 5).

The depression of the handle of K3 by the little finger, right hand, at this time, in addition to the depressed fingers and thumb to make L5 function, explained above, will operatively depress the blade 3c, thereby breaking contact with outer terminal 3d and leadout L5, and establishing contact with inner terminal 3e, through which current will pass and proceed over conductor 3K to the blade 4c. If the handle of K4a is operatively depressed by the little finger, left hand, which will also hold K3 depressed through the connection K33 shown in Fig. 2, the piston of K4a will be operatively elevated and blade 4c will come in contact with its outer terminal 4d, through which current will pass to the leadout L4 (Fig. 35a, column 4).

The release of K4a next (K3 being held operatively depressed by the little finger, right hand) will depress the piston of K4a and the blade 4c, thereby breaking contact with outer terminal 4d and leadout L4, and establishing contact with inner terminal 4e, through which current will pass and proceed over conductor 4K to the normally elevated blade 2c of switch 2, through outer terminal 2d and leadout L3 (Fig. 35a, column 3).

Should key K2a be operatively depressed by the little finger, left hand, at this time, it will hold K3 depressed with it through the connection K33 shown in Fig. 2. Then with the previously operatively depressed pistons by the first, second and third fingers of each hand, and the thumb, as previously described, the piston of K2 and the blade 2c will also be operatively depressed, thereby breaking contact with outer terminal 2d and leadout L3, and establishing contact with inner terminal 2e, through which current will pass and proceed over conductor 2K to the normally elevated blade 1c, outer terminal 1d and leadout L2 (Fig. 35a, column 2).

If K1 is then depressed by the little finger, right hand (said little finger having been removed from K3 which will still be held depressed by the little finger, left hand, on operatively depressed K2a) the switchblade 1c will be operatively depressed, thereby breaking contact with outer terminal 1d and leadout L2, and establishing contact with inner terminal 1e and leadout L1 (Fig. 35a, column 1). The fingering will then be: thumb and four fingers, left hand, depressed; first three fingers, right hand, depressed and the little finger, right hand, depressed on K1. Depression of K1 will hold keys K2 and K3 depressed with it, through the bars K33 and K34 shown in Fig. 2, therefore it would not be required to hold the little finger, left hand, depressed on K2a at that time.

It will be noted that both terminals of switch 1 are tone leadouts, as are both terminals of switch 21 at the other extremity of the manual. Leadout L1 was previously described as also functioning through switch 1a operated by K11, therefore two distinct fingerings may be used to make L1 function. Four cases in all exist in which two or more distinct fingerings, hence two or more duplicate switches may be utilized to make a leadout function, namely: (a) two for L16; (b) three for L13; (c) two for L9; (d) two for L1; see also Figs. 35 and 35a).

My invention is not limited to the exact system herein described for the interwiring and functioning of the various tone and register switches, as many changes, substitutions and modifications may be made without departing from the limits of this phase of my invention.

From the previous description it will be seen that in order to get current into switch 1, which is the switch farthest removed from the mouthpiece, it is necessary to have an unbroken current path from the mouthpiece to switch 1, and furthermore, that all leadouts from switches preceding switch 1, be disconnected from the current connection.

To more easily trace this path from the mouthpiece to switch 1, and to more readily understand which switches have been operatively manipulated either singly or in combination and which switches remain in their normal positions, the following condensed summary is given (refer to Fig. 18):

(a) The master switch in the mouthpiece is closed and current proceeds over conductor 24K to switch 19;

(b) Piston 19 remains normally depressed and current proceeds over conductor 22J to switch 22;

(c) Piston 22 remains normally elevated and current proceeds over counter 22K to switch 23;

(d) Piston 23 remains normally elevated and current continues over conductor 23K to switch 18;

(e) Piston 18 remains normally depressed and current continues over conductor 18K to switch 17;

(f) Piston 15 is operatively depressed by the left hand thumb, which also depresses pistons 17 and 15a (15a has no functional effect during the second register manipulation, and further—current cannot back-track over conductor 15w at that time) and current then continues over conductors 17K and 15K to switch 16;

(g) Piston 16 remains normally depressed and current continues over conductor 16K to switch 14;

(h) Piston 14 is operatively depressed by the first finger, left hand (Fig. 13), and current continues over conductor 14K to switch 13;

(i) Piston 12 is operatively depressed by the second finger, left hand, which also depresses piston 13 with it, and current continues over conductors 13K and 12K to switch 13a;

(j) Piston 13a remains normally depressed and current continues over conductor 13v to switch 13b;

(k) Piston 13b remains normally depressed and current continues over conductor 13z to switch 10;

(l) Piston 10 is operatively depressed by the third finger, left hand, and current continues over conductor 10K to auxiliary switch 5a;

(m) Piston 5a, together with piston 5, is operatively depressed by the third finger, right hand, and current continues over conductors 5K and 8i to switch 8; (switches 11, 9 and 9a are isolated by the depressed blade 5f of switch 5a, and current cannot back-track over the connection made through conductor 9v, switches 9a, 9 and 11, and conductor 5v, as there is an open switch at the outer terminal 5g of the operatively depressed blade 5f of auxiliary switch 5a);

(n) Piston 8 is operatively depressed by the first finger, right hand, (which also depresses piston 9—piston 9 having no functional effect at that time) and current continues over conductor 8K to switch 7.

(o) Piston 7 is operatively depressed by the second finger, right hand, and current continues over conductor 7K to switch 5;

(p) Piston 5, together with piston 5a, is operatively depressed by the third finger, right hand, (previously mentioned) and current continues over conductor 5J to switch 6;

(q) Piston 6 is normally depressed and current continues over conductor 6K, back to switch 1a;

(r) Piston 1a is normally elevated and current continues over conductor 1v to switch 3;

(s) Piston 3 is operatively depressed by the little finger, right hand, and current continues over conductor 3K to switch 4;

(t) Piston 4 is normally depressed and current continues over conductor 4K to switch 2;

(u) Piston 2 is operatively depressed by the little finger, left hand, on key K2a, and current continues over conductor 2K to switch 1.

It may be observed that every switch which was normally elevated, except switches 22, 23 and 1a, will be operatively depressed (in addition to the normally depressed switches of the manual) to secure the functioning of switch 1.

The path just described is followed during the functioning of the first, second, third and four registers. To get current into switch 1 during the fifth register manipulation, a change in the path occurs, near the beginning, caused by the operatively elevated piston 19 which is functioning to hold the register key K27 depressed. The path of the tone circuit to get to switch 1 during the fifth register functioning then, is:

(a) The same from the master switch in the mouthpiece to switch 19, as required during the first, second, third and fourth register manipulations;

(b) Piston 19 is operatively elevated, continuously, during the fifth register manipulation and current then proceeds over conductor 19K to the switch 15a;

(c) Piston 15a is operatively depressed by the left hand thumb through the operatively depressed key K15 (Fig. 13), and current continues over conductor 15w to the operatively depressed blade 15c of the switch 15, from where the connections are the same as described for the first, second, third and fourth registers.

From the preceding description of fingering movements and switch manipulation, further reference to Fig. 18 will readily illustrate the technical or mechanical ease with which many of the switches and leadouts may be made to function in succession, or in other words, through the manipulation of the switches by the fingering of the clarinet manual, many intervals of the printed music page may be executed quite easily, resulting in a decided improvement in this respect over other keyboards, or systems of fingering of woodwind instruments now in use.

To illustrate the above more clearly, suppose the fingering is taken on the manual for the tone E on the fourth space below the treble clef, which is produced through leadout L2 from the switch 1, requiring the fingering previously described to make this leadout function. It will be easy to see that should it be desired to make, for example, the leadout L12 function from the outer terminal of switch 10, it would be necessary only to elevate the blade of switch 10 which was held operatively depressed by the third finger of the left hand; all of the remaining operatively depressed fingers could remain in that position and therefore it would require the movement of but one finger. The leadout L12 functions for the production of the tone D, on the first space below the treble clef, therefore in playing the interval

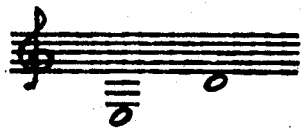

indicated, which is E on the fourth space below the treble clef to D on the first space below the treble clef, on this electric clarinet, it would be required to raise only the third finger, left hand, which manipulation is impossible on the reed clarinet, which requires the raising of the four fingers of the right hand in addition to the third finger of the left hand, to secure the proper sounding of the tone D referred to.

Numerous other intervals may be executed in as simple a manner as described for the one above, as will be apparent from the drawing in Fig. 18, while an understanding of the complete fingering system of this electric clarinet will make apparent to those familiar with the technic of instruments of the woodwind type, the simplifications and improvements effected in this respect. A more detailed description of fingering facilities will be given subsequently under the topic on fingering.

*Complete system of register wiring of the manual with key and switch manipulations to cause register leadouts to function*

The register wiring inside the manual is a separate system by itself and entirely independent of the wiring of the tone switches and circuits. The register circuits are controlled entirely by the thumb and first finger of the left hand, and have no connection with the mouthpiece, as do the tone circuits. It will be understood that the register selector system shown in Fig. 19 fits inside the manual of the clarinet as does the tone determining system shown in Fig. 18. They are shown separately in order to more clearly trace each system.

Figs. 28 to 33 inclusive are provided to show operative positions of the register switches and conductive paths which the current follows for each register control, more easily than by tracing the same through Figs. 19 and 20. But one magnet is shown in each of the drawings from Figs. 28 to 33 inclusive, to simplify the drawings, but it will be apparent that one common return connects all five magnets, as illustrated in Fig. 20. It will be understood that the pistons 24 to 28 inclusive, shown in Figs. 29 to 34 inclusive, are attached to and operated by the register keys K24 to K28 inclusive of the manual (see Figs. 1 and 2), and further understood that said pistons 24 to 28 inclusive operate the switchblades 24c to 28c inclusive which are shown in Figs. 28 to 33 inclusive, and also shown in Fig. 19.

It will be seen by reference to Figs. 30 and 31 that the third register control may be secured through two different paths—necessitated by the fingering system of the clarinet.

The first register is secured by operatively depressing the handle of register key K24 by the left hand thumb, which operatively elevates the switchblade 24c (see Figs. 28 and 19). The conductive path which the current will take through the register switches of the manual to energize the first register magnet M94 of the switchboard (Fig. 20) is as follows: From a source of energy 40P, through transformer 41P and conductor Y40 to normally depressed switchblade 28c, through inner terminal 28e, over conductor 28K to operatively elevated blade 25c, through outer terminal 24d and to leadout L24 which is connected to the magnet M94. From magnet M94 the circuit is completed by way of conductor 41r and over common return W40. Switches 25, 26 and 27 are isolated at that time.

The second register control is automatic—that is no register keys are manipulated for its control (see Figs. 29 and 19). To secure the second register after playing in the first register, it is necessary to release the register key K24, which will bring blade 24c into normal contact with its inner terminal 24e, thereby breaking connection with the first register magnet M94 and establishing connection with the second register magnet M93. The conductive path which the current will follow through the register switches of the manual to energize the second register magnet M93 of the switchboard, is as follows: From source of energy 40P, through transformer 41P and over conductor Y40 to normally depressed blade 28c, through inner terminal 28e, over conductor 28K to normally depressed blade 24c, through inner terminal 24e and to leadout L25 which is connected to the magnet M93. From magnet M93 the circuit is completed through conductor 42r and over common return W40. Switches 25, 26 and 27 are isolated during the second register connection.

To secure the secondary third-register after playing in the second register, it is necessary only to depress operatively the register key K28 by the left hand thumb (see Fig. 30), which will bring its switchblade 28c into operative contact with the outer terminal 28d, thereby breaking connection with the second register magnet M93 and establishing connection with the third register magnet M92. Switch 27 will be depressed operatively during the entire secondary third-register control, but this will have no functional effect. The conductive path which the current will follow to energize the third register magnet M92 during the secondary third-register control, as illustrated in Figs. 31 and 19, is: From source of energy 40P, transformer 41P and conductor Y40 to operatively elevated blade 28c, outer terminal 28d, conductor 28J, normally depressed blade 26c, inner terminal 26e, conductor 26K, normally depressed blade 25c, inner terminal 25e and over conductor 25i to the leadout L26 which is connected to the third register magnet M92. From magnet M92 the circuit is completed through conductor 43r and over common return W40.

To secure the primary third-register after playing in the secondary third-register, it is necessary to keep register key K28 operatively manipulated by the left hand thumb as in the secondary third-register control, and also to manipulate register keys K25 and K26, by depressing the thumb on K15, and the first finger, left hand, on the handle of K26 (Fig. 13), which then puts the blades 28c, 25c and 26c in the operatively elevated position. This will throw the current from the path previously described for the secondary third-register control, into the path illustrated in Fig. 31, for the primary third-register control. Both of these paths connect with the leadout L26 for the energization of the third register magnet. The conductive path which the current will follow to energize magnet M92 during the primary third-register control, as illustrated in Figs. 31 and 19, is: From source of energy 40P, transformer 41P, conductor Y40, operatively elevated blade 28c, outer terminal 28d, conductor 28J, operatively elevated blade 26c, outer terminal 26d, conductor 25K to leadout L26 which is connected to magnet M92. From magnet M92 the circuit is completed over conductor 43r and common return W40.

To secure the fourth register after playing in the primary third-register, it is necessary only to release register key K26 by the first finger, left hand, thereby putting blade 26c in normal contact with its inner terminal 26e—register keys K28 and K25 being kept in the operative position by the left hand thumb as in the primary third-register control. This will break the connection with the third register magnet M92 and establish contact with the fourth register magnet M91. Blades 28c and 25c, only, will then be elevated operatively. The conductive path which the current will follow to energize magnet M91, as illustrated in Figs. 32 and 19, is: From source of energy 40P and transformer 41P, over conductor Y40, operatively elevated blade 28c, outer terminal 28d, conductor 28J, normally depressed blade 26c, inner terminal 26e, conductor 26K, operatively elevated blade 25c, outer terminal 25d, conductor 27K, normally elevated blade 27c, outer terminal 27d and to the leadout L27 which is connected to the fourth register magnet M91. From magnet M91 the circuit is completed over conductor 44r and common return W40.

To secure the fifth register after playing in the fourth, it is necessary only to depress operatively the register key K27 by manipulating the tone key K19 by the first finger, left hand, (see Figs. 5 and 6) which will place the blade 27c in operative contact with its inner terminal 27e. Register keys K28 and K25 are also held in the operative position as for the fourth register manipulation. This will break contact with the fourth register magnet M91, and establish contact with the fifth register magnet M90. Blades 28c and 25c will be operatively elevated, and blade 27c will be operatively depressed.

The conductive path which the current will follow to energize the magnet M90, as illustrated in Fig. 33, is: From source of energy 40P and transformer 41P, over conductor Y40, operatively elevated blade 28c, outer terminal 28d, conductor 28J, normally depressed blade 26c, inner terminal 26e, conductor 26K, operatively elevated blade 25c, outer terminal 25d, conductor 27K, operatively depressed blade 27c, inner terminal 27e and to the leadout L28, which is connected to the fifth register magnet M90. From magnet M90 the circuit is completed over conductor 45r and common return W40.

Registers, switchboard control and switchboard wiring

The purpose of the five registers of this clarinet is to extend its range. Due to the arrangement of the key mechanism of the manual, it is possible to utilize at the most but twenty three basic chromatic fingerings in going from the lowest tone key, KI, on the manual, to the uppermost tone key K23. Therefore it is possible to utilize but 23 tone leadouts and the clarinet would be limited to a range of 23 tones if means were not devised to extend this range.

Foremost in making possible an increased range, is the employment of the register keys K24, K25, K26, K27 and K28 on the manual. These keys act as control or master keys over the tone keys of the manual and through their use it is possible to put most of the tone keys under five different controls, thereby making it possible to utilize the fingering of the tone keys from the lowest, upward, five times; hence the reference to the employment of five different "registers" on the clarinet manual.

By "register" on the manual, it will then be understood to mean each repetition or series of tone fingerings, from the lowest key, KI, upward—each repetition, series, or "register" of tone fingerings being put under a different control provided by the use of the register keys referred to previously.

Each register of tone fingerings on the manual may be utilized to sound a different range of tones on the sound producing device which the manual controls, and to effect this, the "switchboard" arrangement or register changing mechanism shown in Figs. 20 and 21, and consisting of five groups of gang switches with magnetic elements, is employed. Due to lack of space inside the clarinet manual, it becomes necessary to provide this means externally.

Through the use of the register keys, five circuits, referred to as "register circuits," are employed to energize magnets, relays or other similar devices which close gang switches on the switchboard through which the tone circuits must pass before reaching the tone generator, and it follows that there are five groups or registers of gang switches on the switchboard—one for each register controlled by the manual—and five corresponding registers, or ranges of pitch on the tone generator.

By means of the switchboard arrangement most of the 23 individual tone leadouts from the manual may be utilized to sound five different tones on the tone generator, by attaching said leadouts to a switch in each of the five different registers of the switchboard—each leadout and each register being selectively controllable. In this way the switchboard multiplies the range value of certain leadouts from the manual five times, and with the register keys makes possible the extensive range controlled by the manual. It is possible to utilize all 23 tone leadouts in the second register, but only a lesser number may be employed in the remaining registers, as will be explained subsequently.

The switchboard arrangement shown in Figs. 20 and 21, is diagrammatic—being employed on account of its ease in showing the complete system of gang switches, magnetically controlled, together with the wiring of the 23 tone leadouts from the manual to the 95 tone switches on the stationary side of the switchboard and the interwiring of duplicate switches on the movable side of the switchboard, resulting in 70 wires proceeding through the cable 300B to the tone generator, thereby providing 70 complete tone circuits which the manual controls for the sounding of the 70 tones in the complete range of the instrument.

The drawings in Figs. 20 and 21 illustrate the exact system of wiring employed with a plan of construction and operation of the gang switches, but this feature of the invention is not limited to the particular type of switches depicted therein nor to the particular type of magnetic element shown therein to close the gang switches, and it will be apparent to those skilled in the art, that relays, with the required number of contact elements for each register may be effectively used to secure the closure of the gang switches, or other elements and arrangements may be employed to secure the same effect without departing from the limits of this phase of my invention.

This switchboard consists primarily of two parts: (a) the section holding the stationary contacts between AI and AI9 of the first register; contacts between AI13 and AI32 of the second register; contacts between A332 and A48 of the third register; contacts between AI44 and A248 of the fourth register; contacts between AI56 and A70 of the fifth register, and (b) the section holding the movable portion and made up of the rods RI01 to RI05 inclusive which hold the movable contacts between CI and CI9 of the first register; contacts between CI13 and CI32 of the second register; contacts between C332 and C48 of the third register; contacts between CI44 and C248 of the fourth register, and contacts between CI56 and C70 of the fifth register. Each of the movable contacts of the entire switchboard is provided with a spring element such as shown between DI and DI9 of the first register, and the other elements designated by the letter D for the remaining registers, to effect proper closure of each individual switch of each gang by providing the proper "give" to make up for any slight unevenness between the contacts of each switch.

Figs. 20 and 21 are both utilized to show the complete switchboard arrangement, it being impractical to show it all on one drawing. Each of the non-conducting rods RI01 to RI05 inclusive, is held in slidable position by means of bars RI07 and RI08, and are adapted at one end with metallic elements P90 to P94 inclusive, to provide magnetic attraction for the magnets M90 to M94 inclusive; while at the opposite end they are provided with spring elements S90 to S94 inclusive, to hold the gang switches located on each rod automatically open until pulled shut by an energized magnet. The magnets are located at proper distance from the magnetic elements P90 to P94 to effect proper closure of the gang switches of each group.

The 23 tone leadouts from the clarinet manual are wired to the various stationary contacts of the switchboard. Reference to Fig. 21 will show that leadout $m1$, which is a continuation of LI of Fig. 18, is wired to stationary contacts AI56 of the fifth register, AI44 of the fourth register, A332 of the third register, AI13 of the second register, and AI of the first register. Enough switches are supplied on the switchboard to accommodate all of the basic tone fingerings which are possible in each register of the manual.

Register leadouts $m24$ to $m28$ inclusive of Fig. 20, which are a continuation of leadouts L24 to L28 inclusive of Fig. 19, are wired to magnets $M^{\wedge}4$ to M90 inclusive, for the energization of said magnets, which close the gang switches through which the tone circuits must pass. In this wise, the register circuits are in control of the tone circuits.

Relative to most of the tone leadouts from the manual being utilized to sound five different tones, it will be seen by referring to Figs. 20 and 21, that leadouts $m1$ to $m13$ inclusive, which are a continuation of $L1$ to $L13$ inclusive of Fig. 18, are each wired to five different switches—one in each register of the switchboard, as was described for $m1$. Even though most of the tone leadouts from the manual are wired to more than one switch leadout from the manual can function at a time—therefore only one tone can be sounded at a time.

Leadout $m1$ of Fig. 21 which is a continuation of $L1$ of Fig. 18 (said leadout being controlled directly by key $K1$ of the manual), is used to sound the first tone of each register—which tones are: $T1$ of the first register as seen in the following chart which shows the complete range of the clarinet, together with the range of each register and the overlapping tones between each register, $T13$ of the second register, $T32$ of the third register, $T46$ of the fourth register and $T56$ of the fifth register.

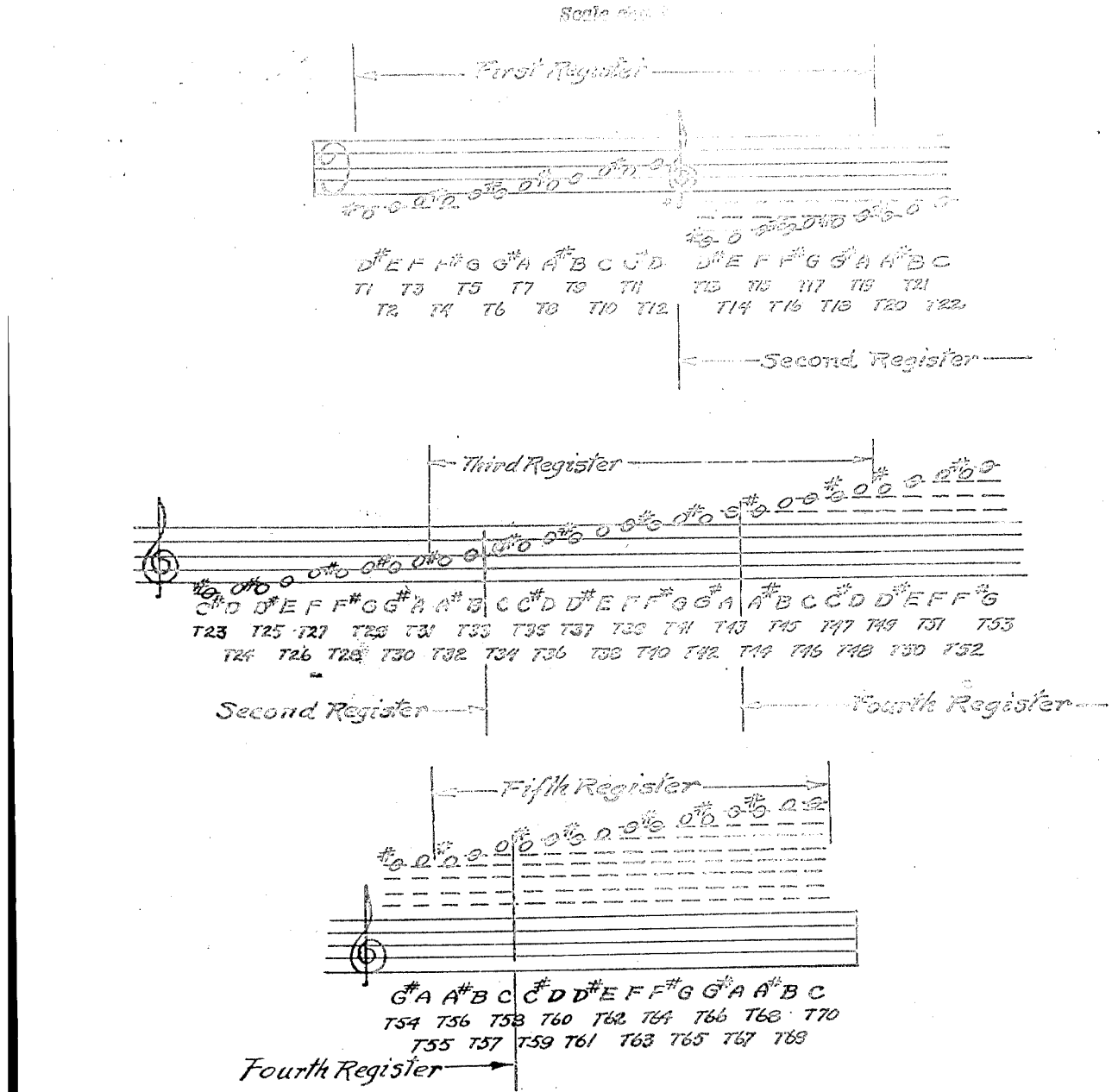

and are used to sound more than one tone, only one switch in all of the gang switches can function at a time, because only one series of gang switches is closed at a time, the remaining gangs being held open by a spring arrangement such as $S90$ to $S94$ inclusive of Fig. 21, and only one tone If it is desired to utilize the lead $m1$ to sound $T56$, it is then necessary to close all of the gang switches of the fifth register of the switchboard, which is done by energizing the fifth register magnet $M90$, explained under the topic on register wiring. When the fifth register gang switches are closed, contact point C156 of the switch B156 comes in contact with point A156 and current will pass from the lead $m1$ through the switch B156, through spring element conductor D156, over common connection F56 between the operatively closed switch B156 of the fifth register and the normally open switch B56 of the fourth register (Fig. 20), and then over conductor E56 and cable 300B, to the tone generating apparatus, where it may be utilized in a variety of manners known to the art, to sound the tone T56 as shown in the chart. Switches B144, B332, B113 and B1, to which lead $m1$ is also wired, can not function at that time as they are then normally open, therefore the other tones controlled by lead $m1$ cannot be sounded at that time and the condition of only one tone being sounded at a time is thus maintained.

Switch B56 in the fourth register exists for the reason that another fingering on the manual, hence another leadout, $m13$ in this case, may be utilized—thus enabling the sounding of tone T56 in either the fourth or fifth register control. The common connection F56, it will be apparent, is utilized to carry current, either from switch B156 or switch B56 to conductor E56 and thence to the tone generator.

Should it be desired to utilize lead $m1$ to sound T44, it will be necessary to open the gang switches of the fifth register by disconnecting the fifth register magnet M90, and then to close the fourth register gang switches by energizing magnet M91. Current will then pass from lead $m1$ around the open switch B156 of the fifth register and through closed contacts A144 and C144 of the switch B144 of the fourth register, to spring member D144. Current cannot get through switches B332, B113, B1 or B156 from lead $m1$, as said switches are normally open at that time. From spring member D144, the current goes over common connection F44 between closed switch B144 of the fourth register (Fig. 21) and open switch B44 of the third register (Fig. 20), then over conductor E44 (Fig. 20) and cable 300B, to the tone generating apparatus where it may be utilized to sound the tone T44 as shown in the above chart, as explained for the previous tone controlled by lead $m1$. Switch B44 in the third register exists for the reason that another fingering on the manual, hence another leadout, $m13$ in this case, may be utilized—thus enabling the sounding of tone T44 in either the third or fourth register control. The common connection F44, it will be apparent, is utilized to carry current, either from switch B144 or switch B44 to conductor E44 and thence to the tone generating apparatus.

Should lead $m1$ be utilized to sound tone T32, the gang switches of the fourth register will be opened and those of the third register then closed by energizing magnet M92. Current may then pass from lead $m1$ through switch B332, spring element D332 and over conductor E32 and cable 300B to the tone generator.

A common connection F232, exists between the switches B332, third register (Fig. 21) and B232 of the third register (Fig. 20), also between switches B32 and B132 of the second register (Fig. 20), on their movable side, and this common connection unites with conductor E32 (Fig. 21), thereby enabling any of said switches to be utilized in sounding tone T32. Four different switches may be utilized to sound tone T32, because there are four distinct fingerings on the clarinet manual for this tone, which are: utilizing (a) key K1 or K11 to energize lead $m1$ in the third register, (b) key K19 to energize lead $m19$ in the third register, (c) key K20 to energize lead $m20$ in the second register, and (d) key K23 to energize lead $m23$ in the second register.

Should lead $m1$ be utilized to sound T13, the gang switches of the third register will be opened and those of the second register closed by energizing magnet M93. Current may then pass from lead $m1$ through closed switch B113, in the second register (Fig. 21), through spring element D113, over common connection F13, to open switch B13 in the first register (Fig. 20), and over conductor E13 (Fig. 20) and cable 300B to the tone generator. Switch B13 exists in the first register for the reason that tone T13 may also be fingered by using any of the keys K13, K13a or K13b (Fig. 1), in the first register of the manual to energize the lead $m13$, and it will be apparent that tone T13 may be produced through either the first or second registers of the manual and switchboard.

Should lead $m1$ be utilized to sound tone T1, which is the lowest tone in the scale controlled by the manual, the gang switches of the second register will be opened and those of the first register closed, by energizing the magnet M94. Current will then pass from lead $m1$ through closed switch B1 and over conductor E1 and cable 300B to the tone generator.

It will be seen that only one of the switches connected to the lead $m1$ can function at a time and this same condition exists for all of the tone switches of the entire switchboard arrangement.

Reference to Figs. 20 and 21 will further show that all of the leadouts from $m1$ to $m13$ inclusive are wired to five different switches, as is also lead $m16$, but that the remaining leads are wired to a lesser number of switches. This latter condition is due to the thumb and first finger, left hand, being occupied in controlling a register key while playing in a certain register and therefore not available to manipulate certain tone keys at that time. Lead $m17$ is wired to but one switch, which is switch B29 in the second register (Fig. 20), and is used to produce the tone T29, only, for the reason that the fingering for the functioning of leadout L17 can be used only in the second register of the manual.

Further reference will show which keys of the manual (Figs. 1 and 2), leadouts (Fig. 18), and tone switches (Fig. 20), are used to control the remainder of the tones not controlled by the leadouts $m1$ to $m13$ inclusive.

The order in which the tone leadouts from the manual are wired to the switches on the switch board, together with the particular tone on the generator to which each switch of the switchboard is wired depends upon the system of fingering I have devised for the operation of the manual.

Leads $m1$ to $m13$ inclusive are wired to tones which are an octave apart in the first and second registers, a twelfth apart in the second and third registers, an octave apart in the third and fourth registers and an octave apart in the fourth and fifth registers, which incidentally facilitates the fingering system of the clarinet, in that the playing of octave intervals, controlled by those leads, can be done simply by moving a register key only.

The number of switches employed in each gang switch of the switchboard depends primarily on how many basic chromatic fingerings are possible in each register of the clarinet manual.

Since the second register control of the manual is automatic and no register keys are manipulated, all of the tone keys of the manual may be employed in said second register; therefore all 23 tone leadouts are employed, and there are 23 switches in the second register gang on the switchboard to which the 23 leads are wired. However, only 21 basic chromatic fingerings are utilized in the second register, for the reason that keys K23 and K22 are used to duplicate keys K20 and K19 respectively, for the production of tones T32 and T31 respectively, in the second register, rather than to provide two additional different tones.

The first register control of the manual is secured through the depression of the handle of register key K24 by the left hand thumb, which is held operatively depressed, continuously, during the functioning of the entire first register. The operative depression of the handle of K24 also depresses the tone keys K15, K17 and auxiliary tone key K15a (Fig. 13). Reference to Fig. 20 will show that the leads m17, m19, m20 and m21 are not utilized in the first register for the reason that the operatively depressed key K17 prevents the functioning of the leadout L17 and the operatively depressed key K15a prevents the leads L19, L20 and L21 from functioning (see Figs. 25 and 18). It should be remembered that all leads, from m1 to m28 inclusive of Figs. 20 and 21, are continuations of leads L1 to L28 inclusive of Figs. 18 and 19. All tone leads, except leads m17, m19, m20 and m21 are then wired to the movable contacts between A1 and A19 of the first register of gang switches, as illustrated in Figs. 20 and 21.

The secondary third-register control being secured by the depression of the handle of register key K28 by the left hand thumb, while the piston of tone key K19 is held operatively elevated and the piston of auxiliary tone key K15a remains normally elevated (see Fig. 23), allows only three leads, namely L19, L20 and L21 to be utilized during the secondary third-register control, for the production of the tones A sharp, B and C, on the second space, third line and third space, respectively, of the treble clef. Leads m19, m20 and m21 are wired to the stationary contacts A232, A233 and A34 of the third register gang switches (Fig. 20).

During the primary third-register control, the left hand thumb is kept operatively depressed on the register key K28 and the tone key K15 at the same time (K15 also holding keys K17 and K15a operatively depressed—Fig. 13), while the first finger, left hand, is kept operatively depressed on the handle of register key K26, which keeps the tone key K14 depressed; therefore lead L15 which proceeds from the switch 14 cannot be used at that time on account of the depressed blade of switch 14 isolating the lead L15 (refer to Fig. 18). Lead L17 cannot be utilized on account of its switchblade being held depressed by K15, and leads L19, L20 and L21 cannot function in this primary third-register control on account of the operatively depressed blade of K15a (Fig. 24), but it must be remembered that said leads L19, L20 and L21 have been utilized in the secondary third-register, previously described. Lead L18 is not utilized at that time on account of it being impractical to manipulate the key K18. Therefore all tone leads from the manual except leads L15, L17 and L18 may be used under one or the other of the third register controls, and are wired to their mate contacts between A332 and A48 of the third register of gang switches of the switchboard, as illustrated in Figs. 20 and 21.

During the fourth register control the left hand thumb is kept operatively depressed on the register key K28 and on the tone key K15 (Figs. 13 and 2) at the same time; the first finger, left hand, being kept raised during the fourth register, and the second finger, left hand, being kept operatively depressed on K12 (see Fig. 13) in order to get current below switch 14 while the first finger is raised. At that time lead L14 cannot be used on account of the depressed K12 holding key K13 depressed, thereby isolating L14 which proceeds from switch 13 (see Fig. 18); lead L17 is isolated on account of its blade being held depressed by K15 (Fig. 18); leads L19, L20 and L21 are isolated through operatively depressed K15a (Figs. 13 and 24). Therefore all tone leads, except leads L14, L17, L19, L20 and L21 may be utilized, and are wired to their mate contacts between A144 and A248 of the fourth register of gang switches on the switchboard.

During the fifth register control the left hand thumb is kept operatively depressed on register key K28 and on tone key K15 at the same time, while the first finger, left hand, is used to depress register key K27 by holding the handle of tone key K19 operatively depressed (Figs. 5 and 6). The second finger left hand, is kept operatively depressed on K12 during this control except while the switches 15 and 16 are being manipulated, in order to get current below switch 14 while the first finger, left hand, is raised, as explained for the fourth register. Lead L14 cannot be utilized during this register on account of the depressed finger on K12 keeping switch 13, from which L14 proceeds, depressed (Fig. 18). Lead L17 cannot be utilized on account of key K17 being held operatively depressed; lead L18 is not used on account of it being impractical to manipulate key K18; leads L19 to L23 inclusive cannot be utilized on account of being isolated through the operatively elevated blade of switch 19 and the operatively depressed blade of auxiliary switch 15a, illustrated by Fig. 24. Therefore the remaining leads which may be utilized in the fifth register are wired to their mate movable contacts between A156 and A70 of the fifth register of gang switches on the switchboard.

Further reference to Figs. 20 and 21 will show that each tone leadout from the manual forms a common connection between the switches of each register to which it is wired, as previously described for lead m1, which is wired to contacts A156, A144, A332, A113 and A1.

It has been previously cited that the manual is adapted to control 95 tone circuits which are utilized in the sounding of but 70 tones, due to the overlapping or duplication of fingering facilities between each register of the manual and in a few cases to duplicate fingerings in the same register of the manual. The extent which each register overlaps another with the exact tones which overlap, is shown in the chart. As the switchboard is adapted with 95 tone switches to accommodate all of the fingerings possible in all registers of the manual, it would be possible to complete 95 tone circuits to the tone generator through 95 independent conductors, thus requiring 95 different tone generating or controlling elements on the tone generator; however, with the system of interwiring of switches which overlap on the switchboard, it is possible to utilize but 70 conductors and 70 complete circuits to go from the movable side of the switchboard to the tone generator, thus requiring 70 tone generating or controlling elements on the tone generator, instead of 95.

This, then, results in the feature of one path through the master switch in the mouthpiece branching into 23 tone paths from the manual, through 95 switch paths on the switchboard and then through 70 conductor paths to the tone generator.

Fig. 35 is a chart showing which movable contacts of the five registers of the switchboard are interwired, the interwiring conductors, common conductor leading to the tone generator, and the tone produced. In explanation of this chart, the horizontal line $a$ indicates that contact C13 of the first register is wired to contact C113 of the second register by means of conductor F13. This interwiring is then connected to the tone generator through conductor E13, for the production of the tone T13, illustrated in the chart. Line $i$ indicates that contacts C32 and C132 of the second register are interwired with contacts C232 and C332 of the third register by means of conductor F232. This interwiring is connected to the tone generator through conductor E32 for the production of tone T32. The other lines of Fig. 34 indicates the same system as described for lines $a$ and $i$ above.

From previous descriptions of register and tone fingerings and connections on the manual, plus the switchboard construction of registers, switches and magnetic control, it may be seen that in order to "play" in the first register it will first be necessary to secure the first register control on the manual by depressing the handle of register key K24 which will be held in this operative position during the functioning of the entire first register. This will energize the first register magnet M94 which will pull the gang switches between B1 and B19 of that register located on the rod R101 on the switchboard, shut, bringing the movable contacts between C1 and C19 into contact with the stationary contacts between A1 and A19, while the remaining four registers of gang switches remain open. Then when the master switch in the mouthpiece has been closed by the breath of the performer, any of the 19 chromatic fingerings which are possible in the first register of the manual may be executed in any order desired, which will result in 19 circuits being completed through the first register of gang switches on the switchboard, and over the conductors E1 to E19 inclusive to the tone generator, where they may be used to sound the tones indicated in the first register range shown in the scale chart.

To "play" in the second register after having played in the first register, the register key K24 will be released which will disconnect the first register magnet M94, allowing the spring S94 to pull the gang switches of the first register open. Release of key K24 will then immediately connect the second register magnet M93, which will pull the gang switches B113 to B132 of the second register, located on the rod R102 of the switchboard, shut, thus bringing the movable contacts of the switches into contact with the stationary contacts, while the remaining four registers of gang switches remain open. Then, with the master switch in the mouthpiece closed as before, the 23 chromatic fingerings possible in the second register of the manual may be executed in any order desired, and 23 circuits may be completed through the gang switches of the second register and over conductors E13 to E33 inclusive to the tone generator, to sound the tones indicated in the second register range shown in the scale chart.

To play in the third, fourth or fifth registers, it will be necessary to follow the system described for the first and second registers—that is, after the proper register fingering has been executed for each register control and the master switch in the mouthpiece has been closed as before, the various tone fingerings which are possible in each register may be executed, which will result in the completion of the circuits associated with each register of gang switches, through the conductors E32 to E48 inclusive for the third register, conductors E44 to E58 inclusive for the fourth register, and conductors E56 to E70 inclusive for the fifth register, to the tone generator where the tones associated with the third, fourth and fifth register ranges shown in the chart, may be sounded.

*New and unique fingerings*

The system of fingering I have evolved, thus certain new keys which have been added to the Boehm system, simplifies the fingering of this electric clarinet, facilitating the ease with which it may be played and greatly increasing its adaptability for the execution of both difficult and ordinary fingering movements, thereby providing a much improved manual over conventional instruments of the woodwind type now in use.

The advantages in fingering this electric clarinet are mainly:

(a) that all of the notes from

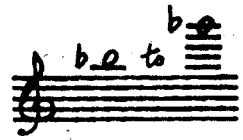

are fingered in octaves with the notes from

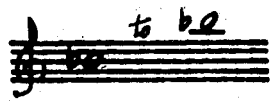

which is obviously impossible on the Boehm reed clarinet;

(b) that certain and many intervals may be executed by moving from one to seven or eight fingers, including the left thumb, less than is necessary to execute the same intervals on the Boehm or Albert system of fingering;

(c) that the three upper registers are in octave fingerings and the two lowest registers also in octave fingerings.

(d) that the key K11 is used in a dual capacity—that is, for its use in fingering the notes

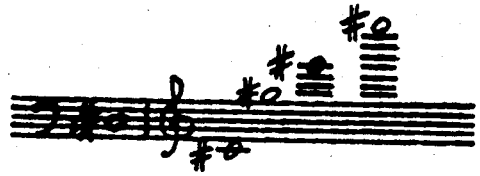

and also, with the aid of key K5a, to finger the notes

In explanation of the signs below the notes in the following notation and fingering explanations, these are conventional signs used in an ordinary treatise on fingering of woodwind instruments to indicate which fingers and keys are used to finger the notes. The dots, or closed circles, indicate fingers lowered or depressed on keys; open circles indicate fingers raised; signs above the line indicate the left hand, with the first finger controlling the uppermost dot or circle, the second finger controlling the middle dot or circle, the third finger controlling the lowest dot or circle and the little finger controlling numerals indicated; the signs below the line indicate the right hand, with the fingers in the same order as explained for the left hand. Thus

indicates that the first and second fingers of the left hand are depressed; the third finger of the left hand, raised; the first, second and third fingers of the right hand, depressed; and the little finger of the right hand depressed on key K3.

To illustrate the point (a), in playing the octave interval from G to G

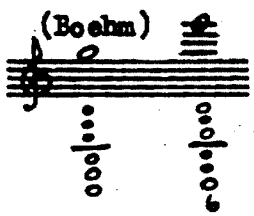

on the Boehm reed clarinet it is required to raise two and lower three fingers—a total of five fingers, as indicated.

Now to play the same interval

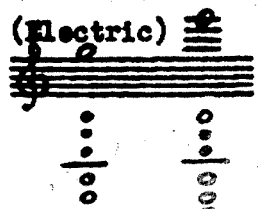

on this electric clarinet, it is required to move but one finger only, and that is to raise the first finger of the left hand, as indicated, which obviously is much more simple than the fingering required on the Boehm reed clarinet.

All of the notes of the fourth register range, illustrated in the scale chart, may be fingered in octaves with the notes of the third register range, also indicated in the scale chart, thereby requiring the movement of the first finger, left hand, only, to change the register control, and it will be immediately apparent to one familiar with the fingering of the Boehm reed clarinet, the simplification and improvement effected in this respect.

To illustrate the point (b), in playing the following interval from C to A

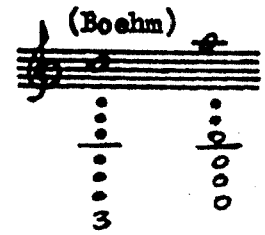

on the Boehm reed clarinet it is required to raise the third finger, left hand, and also the four fingers of the right hand, as indicated, while to play this same interval

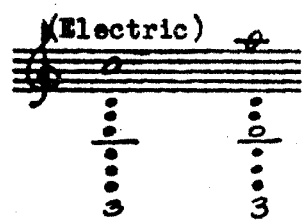

on this electric clarinet it is required to raise only the third finger, left hand, as indicated, although, as has been previously explained relative to the fingering of Boehm and electric systems, this interval may also be fingered identically the same on both Boehm and electric clarinets if desired. In further explanation of point (b) in playing the octave interval

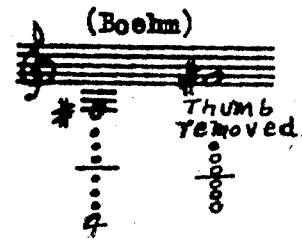

on the Boehm clarinet it is required to remove six fingers and the left hand thumb, as indicated, while to execute this same interval

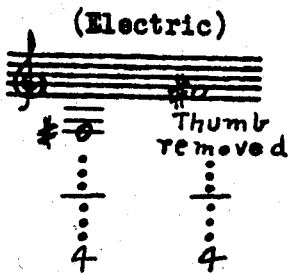

on this electric clarinet, it is required to remove the left hand thumb only, as indicated. As in the case of the interval previously indicated from C to A, this latter interval of the octave from F sharp to F sharp, may also be fingered identically the same on both Boehm and electric clarinets, if desired.

The illustrations of fingering advantages given under this topic are illustrational of the improvements and simplifications effected, and will serve in a general way to show this. A volume of considerable extent would be required to illustrate most, or all, of the advantages in fingering this electric clarinet over the Boehm system. However, an understanding of a complete fingering chart for each note in the entire range of this clarinet, or an understanding of the manipulation of the keys and switches shown in Fig. 18, will make apparent to one skilled in the art, the practical, unique and extensive fingering possibilities of this electric clarinet.

In connection with these unusual and extensive fingering facilities an important citation may be made relative to the note

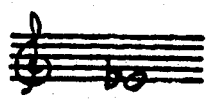

which may be fingered approximately one hundred different ways on this electric clarinet, while on the Boehm reed clarinet there are two practical, and about four more possible fingerings for it. In fingering this note (E flat), on the electric clarinet, an understanding of Fig. 18 will make apparent that it is necessary to have an unbroken line of current path from the mouthpiece to the elevated switch operated by key K13, K13a or K13b, therefore any possible or desired combinations whatsoever, of fingers, may be elevated or depressed below any of said switches operated by keys K13, K13a or K13b, and the leadout L13 which controls the note E flat, referred to, will continue to function.

To illustrate point (c), the notes

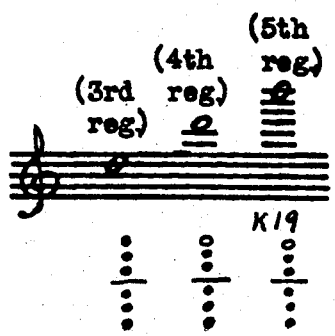

are fingered in octaves on this electric clarinet as indicated, it being necessary only to raise the first finger, left hand, to secure D in the fourth register, after D in the third register has been fingered, while to finger D in the fifth register, after D in the fourth register has been fingered, it is necessary only to depress the first finger, left hand, which was raised, on the key K19. The movement of the first finger, left hand, in these cases serves to change the register control. All of the octave notes shown in the scale chart which are in the third, fourth and fifth registers, are fingered on the same principle as explained for the three D's above, with a few exceptions.

It will be noted that the fingering of the third register of this electric clarinet in the same as the Boehm system for the same notes, with a few exceptions, therefore it is evident that it will not be difficult for an experienced player on the Boehm clarinet, or a beginner on this electric clarinet, to learn the fingering for the fourth and fifth registers of the electric clarinet.

To illustrate the similarity of fingering of the first and second registers, under point (c), the notes

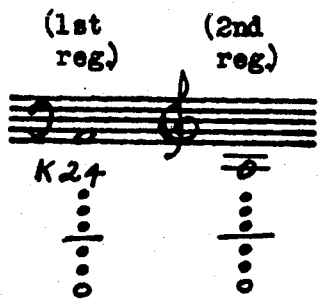

are fingered on this electric clarinet as indicated—that is, the tone fingering is identical, it being necessary only to change the register fingering by manipulating the register key K24 to get the first register, after the second register has been obtained. The first register of the electric clarinet is fingered the same as its second register, with a few exceptions—and as the second register of this electric clarinet is fingered the same as the Boehm in the same range of notes, it will be evident that it will be comparatively easy for an experienced player on the Boehm reed clarinet, or for a beginner on this electric clarinet, to acquire control of the first register of the electric clarinet—which is out of the range of the Boehm clarinet.

In connection with point (d), the adaptation of key K11 in a dual capacity to finger the second group of notes previously indicated under point (d) is an important help technically in that it materially simplifies the execution of many intervals and runs. The following groups of notes are illustrative of the simplifications effected by the new use of the key K11, and it may be noted from the fingering indications underneath the notes that it is necessary to move but one finger to execute each of the intervals given, except of course the last two examples (x) and (z), which however, are much simplified over that required on the 17-keyed Boehm clarinet. It will be understood that the fingerings indicated are not at all possible on the Boehm reed clarinet. The following groups of notes with fingering indications illustrate point (d) (numeral 11 indicating the key K11):

In further reference to point (a) relative to the fingering of the notes from it will be easily apparent to those familiar with the art, the technical advantages derived from the changed fingering for these notes. Due to these notes being fingered in octaves with the notes an octave lower, it will be comparatively easy for an experienced player on the Boehm system to effect this change, which may be rather easily accomplished by reading and fingering said notes as would be done when playing them an octave lower on the Boehm clarinet, but keeping the first finger, left hand, raised to secure the proper register control on the electric clarinet, and for the reason of the octave relationship between the fifth and fourth registers and the octave relationship between the first and second registers, it will be comparatively easy to master the first and fifth registers, which are out of the range of the Boehm clarinet, as has been previously cited.

To avoid any misunderstanding of the fingering system of this electric clarinet in relation to the fingering system of the Boehm clarinet, it must be distinctly understood that this electric clarinet may be fingered identically the same as the Boehm system in this range and as the practical range of the reed clarinet in common use today is it will be apparent that an experienced player on the Boehm system, in playing this electric clarinet, will be required to learn new fingering for but seven notes, namely in order to execute the music written for the present day reed clarinet, which will not be a difficult undertaking, due to the fact that the latter group of notes from C sharp to G shown above, are fingered in octaves with the notes an octave lower.

It must be further distinctly understood that the manual of this invention is not limited to the change of fingering just described, but that it may be adapted to be fingered identically the same as the reed clarinet throughout the entire practical range of the reed clarinet, except possibly for the loss of one or more fingerings for the high G of the reasonable upper limit of the reed clarinet, and still retain the new and unusual fingering facilities which have been described. Virtually no change in the manual described herein, would be required to finger it identically the same as the reed clarinet throughout the practical range of the reeed clarinet, as this is dependent upon the system of wiring and interwiring of the switchboard arrangement disclosed herein.

I have effected the change of fingering, explained herein, for the following reasons: (a) it is a simplification and improvement over that of the Boehm, and (b) it provides a convenient means for the extensive upper range of this clarinet which has been effected, and for the overlapping of fingering facilities which aids in certain trills and technical passages, and especially in moving from the end of one register into another.

Notation

Relative to the system of notation for this electric clarinet, it will not be necessary to employ the bass clef for the first register on account of the first and second registers being in octave fingering, but said first register range may be written in the second register range and indicated an octave lower with some conventional sign as "8va,-Basso":

It will not be necessary or advisable to use the extreme leger lines for the high notes above the treble clef, especially for the fifth register range, as it would obviously be difficult to read music so written; but on account of the third, fourth and fifth registers being in octave fingerings, the notes may be written in the third or fourth register range, and then indicated respectively 2-8va or 8va, or other conventional signs may be used to indicate the higher ranges, as

Construction and operation of tone unit

In order to show the operation of the instrument in its entirety—that is, the manual, switchboard, tone producing unit and amplifier combined—the path of current for the production of a single musical sound will be traced. Briefly, this path passes through the clarinet from the master switch in the mouthpiece to a tone leadout, then to a register of the switchboard arrangement and from there through the sound apparatus. The sound generated in this apparatus is transmitted to the amplifier and from there to the loud speaker.

Suppose it is desired to set into operation the elements required to sound the note or tone

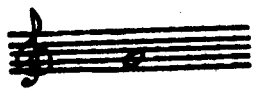

indicated by the designation T29 in the above mentioned chart, which, it will be noted, is produced through the second register manipulation of the manual. Since the register control of the clarinet is independent of the tone control, it will of course be necessary to have a separate switch to turn on the current for the register control, while another switch is provided for the tone control. These switches may be conveniently located on a special music rack which may be constructed also to hold the music to be played and any other necessary or advisable controls. As soon as the register current is turned on—no register keys being manipulated, as the second register is connected automatically—the gang switches of the second register on the switchboard will be immediately closed. When the current for the tone circuits of the manual is turned on, no action will take place until the master switch, which is normally open, is closed by air from the lungs of the performer. When the master switch is then closed in the process of "blowing" the instrument—no tone keys and no register keys being manipulated to produce the tone T29 (G, on the second line of the treble clef), as has been previously explained—the tone circuit path will be as follows:

Starting at the source of energy P50 indicated in Fig. 21, it proceeds over conductor W50, through terminals 50s and 50r of the complementary terminal plates s and r of Figs. 20 and 18, over conductor R50, Fig. 18, inside the cable 300, Figs. 1 and 2, to the pneumatic cylinder 109 in the mouthpiece, Figs. 12 and 18, master switch contacts 113 and 116, Fig. 12, conductor 24K, Fig. 18, through normally depressed switchblade 19c, inner terminal 19e, conductor 22J, normally elevated blade 22c, outer terminal 22d, conductor 22K, normally elevated blade 23c, outer terminal 23d, conductor 23K, normally depressed blade 18c, inner terminal 18e, conductor 18K, normally elevated blade 17c, outer terminal 17d, leadout conductor L17, through the cable 300, Fig. 1, contacts 17r and 17s of the complementary terminal plates r and s, Figs. 18 and 20, through cable 300A, Fig. 20, conductor m17, contacts A29 and C29 of the gang switch B29, Fig. 20, conductor E29 and cable 300B, Fig. 20, to the tone producing apparatus illustrated in Fig. 21 and then to the source of power P50, from where the circuit was described as beginning.

The register circuit for the energization of magnet M93 which controls the gang switches of the second register has been fully described and traced under the topic on register wiring and will therefore be unnecessary to be described here.

The amplifier is controlled by the rheostat 126, Fig. 15, which is mounted on the mouthpiece. The path of the current in the circuit connecting the rheostat to the amplifier is as follows: From the coil 126, through conductor R61, contacts 61r and 61s of the complementary terminal plates r and s, Figs. 18 and 20, conductor S61 to the amplifier Fig. 21, then over conductor V60, through source of power P60, conductor S60, contacts 60s and 60r of the terminal plates s and r, Figs. 20 and 18, and over conductor R60 to the coil 126, Fig. 15.

To trace the current through the sound apparatus, reference will be had to Fig. 16. The conductor E29, Fig. 15, from the manual and switchboard for the production of the tone G, on the second line of the treble clef, is connected to the terminal E29 of the tone unit, Fig. 16, and the return conductor R50, Fig. 15, to the mouthpiece, is connected to the terminal R50' of the tone unit, Fig. 16, but before following the path of the current through the tone device, it will be well to discuss the particular type of electrical sound producing apparatus which is illustrated herein, in connection with the clarinet.

The tone producing unit, as shown in the diagrammatic sketch, Fig. 16, is that illustrated in Patent No. 2,039,201, granted to F. Trautwein, April 28, 1936, and forms no part of this invention. The electric clarinet manual herein described may be connected to this tone device, or to various other types of tone devices, as will be apparent to those skilled in the art.

In accordance with the device shown in Patent No. 2,039,201, two different frequencies are produced, which are associated with each other in a certain manner. The first frequency group is to impart the timbre to the tone produced, whilst the frequency of the fundamental tone is determined by the second frequency, which is mostly lower than the first frequency group. In accordance with this invention, these two frequencies are not simply added, but are interlinked with each other in a different manner. In conjunction with this interlinking it is, however, essential that certain first frequencies or frequency mixtures decisive in regard to the character of the musical sound and constituting the soundformer, are rhythmically varied in their amplitude corresponding to the frequency or frequencies of the desired fundamental tone or tones (second frequencies).

For the electrical production of musical sounds the combination of an oscillation producer with resonant formations is necessary, the natural oscillations of which are lying higher than those of the oscillation producer, in connection with which suitable measures are provided for causing the excitation of the natural motions of the resonant bodies to take place shock-like. Apart from selecting a form of oscillation with points of discontinuities, this may also be secured by effecting the coupling of the resonant combinations with the oscillation producer by means of an element, which shows discontinuity.

Fig. 16 illustrates an example of the electrical apparatus used. Referring to this figure the numeral 201 denotes a gas filled discharge vessel (gaseous conduction lamp with or without heated cathode, partly also with further electrodes, e. g. for joining auxiliary potentials), which, together with the condenser 202 and the resistance 203, produces electrical oscillations, the curvature of which is known to show discontinuities on igniting and darkening the gaseous conduction lamp. The electrical energy for the maintenance of the oscillations is obtained from the source of current P50. With the aid of the transformer T50 these oscillations are transferred to the grid of the amplifier valve 206 in the anode filament circuit of which a resonant combination, consisting of the self-induction 207 and capacity 208, is situated. In order to be able to adjust the damping and with it the period of the fading out, ad lib, the resistance 209, an additional damping and the back-coupling by means of the condenser 210 as regeneration, have been provided. For the purpose of regulating the degree of coupling of the amplitudes and partly also of the damping, steady current resistances or complex resistances 211 and 212 may be provided in the grid circuit and in the anode filament circuit. The combined oscillation acts, if need be, in conjunction with the interpolation of amplifying means 206a, on the loud speaker, or else on a further amplifier 213a interpolated at this point. The source of plate current 214 of the amplifier may be identical with the source of current P50. Fig. 16 is only to represent the underlying principle, the design of which naturally admits of variation.

Further elaboration of the type of sound apparatus concerns arrangements for carrying out the process, especially for the construction of electrical musical instruments. In regard to a musical instrument it is required in the first instance that the pitch of tone be variable ad lib. This may be attained either with the aid of a plurality of oscillation generators, one of which is shown by way of example in Fig. 16, or the pitch of tone of one, or of separate oscillation generators may be arranged to be adjustable. In the connection in accordance with Fig. 16 for instance, the pitch of tone is determined by the rheostat 203 and the condenser 202, which latter may also be connected in parallel with the rheostat, or at both points condensers may also be provided. In view of the fact that the rheostat variation may technically be carried through in a very simple manner this kind of adjustment for the pitch of tone is preferred.

In accordance with the design shown the oscillation generator is tuned by adjustment of the rheostat 203, so that it will render a desired musical note in this case G, or T29, as indicated in the scale chart. The rheostat is allowed to remain at this setting so that by connection of the conductor E29 from the manual to the terminal E29 and the rheostat 203 of Fig. 16, the tone G, or T29 will be produced. A plurality of similarly designed oscillation generators are likewise adjusted and conductively connected to the manual as explained above, so that the notes shown in the scale in the scale chart may be selectively played by manipulation of the manual. Corresponding fixed resistances could of course be substituted in place of the tuned rheostats.

The tone unit set forth herein is intended to illustrate one type of sound unit which the manual may control and operate and it is not intended in the present application to expressly show the smallest and most compact tone unit which it is possible to construct; it being the purpose to show primarily a workable arrangement of the manual and a tone unit in combination.

It will be understood that since the manual may be attached to a variety of tone units, and keeping in mind that but one tone is to be sounded at a time and but one type of tone color is required to be produced with the tone unit, the compactness and simplification of the tone unit together with a reasonable cost of construction will depend upon the state of the electrical music art and the ingenuity and skill of the constructor of the tone and amplification units.

In further reference to this invention as a whole, it will be readily apparent that the instrument will be easier to play and master than the reed clarinet, by either a novice or a professional musician. A brief reference to the history and evolution of the clarinet will be pertinent at this time in that it will provide a further understanding of the present invention. The following three paragraphs are quoted from Grove's Dictionary of Music, vol. 1, pages 361 and 364:

"Clarinet or Clarionet. An instrument of 4-foot tone, with a single reed and smooth quality, commonly said to have been invented about the year 1690, by Johann Christopher Denner, at Nuremberg. Mr. W. Chappell is however of opinion that he can trace the instrument back to mediæval times as the shawm, schalm or schalmuse (Hist. of Music, i. 264).

"A few words are required in concluding, as to the weak points of the instrument. It is singularly susceptible to atmospheric changes, and rises in pitch very considerably, indeed more than any other instrument, with warmth. It is therefore essential, after playing some time, to flatten the instrument; a caution often neglected. On the other hand it does not bear large alterations of pitch without becoming out of tune. In this respect it is the most difficult of all the orchestral instruments.

"Lastly, the whole beauty of the instrument depends on the management of the reed. A player, however able, is very much at the mercy of this part of the mechanism. A bad reed not only takes all quality away, but exposes its possessor to the utterance of the horrible shriek termed 'couac' (i. e., quack) by the French, and a 'goose' in the vernacular. There is no instrument in which failure of lip or deranged keys produces so unmusical a result, or one so impossible to conceal; and proportionate care should be exercised in its prevention."

The evolution of the clarinet was gradual—from a tube with a reed mouthpiece and open finger holes, through various additions of keys to the application of the Boehm system of keys and fingering about 100 years ago. However, not a great deal of improvement and change has been effected since that time. The clarinet has played an important part in the art of music since long before the application of the Boehm system, due to its attractive, smooth tone and almost perfect blending quality. It is, however, generally known that it is quite difficult to play well, due to previously mentioned embouchure, reed and mouthpiece difficulties, and to certain natural defects. Many players struggle for years and then succeed only partially in producing a real clarinet tone, and a limited amount of technic, while virtually all players have much difficulty in producing a rapid staccato, and in maintaining the correct quality of tone while tonguing. All players have a great amount of difficulty with reeds—being fortunate if able to secure 5 or 10 good reeds out of a lot of 100, and it is reasonably certain that the present difficulties and defects common to the reed clarinet will remain as long as the instrument is constructed and played in the conventional manner.

Those familiar with tones produced by means of electrical vibrations, as convincingly demonstrated by electric organs widely used at the present time, know the rich and fascinating, and very great variety of tones which may be produced by electrical means. The clarinet tone quality, with its deep richness, may be produced with great fidelity through the medium of the electrical vibrations or oscillations, and in fact the tone may be made to sound far more rich, characteristic and beautiful than that of the conventional reed clarinet. It will be obvious that the change from the conventional reed clarinet, which has been illustrated herein, will enable a more easy playing and more rapid mastery of the instrument than is possible on the reed clarinet. The troublesome embouchure, reed and mouth-piece features, common to conventional reed instruments, are eliminated almost entirely. A performer on this new type clarinet, after proper proficiency has been attained, due to the almost perfect tones at his command, plus the extensive range and unusual facilities of fingering and tonguing, will be enabled to interpret the works written for the clarinet with comparative ease, and with a superior degree of skill and accuracy.

In regard to identifying this clarinet with a particular "key" or "pitch," such as a B flat clarinet, A clarinet, C clarinet, or such, it will be apparent that the instrument is not limited to any one particular pitch or key, as the tone unit may be built or adjusted to any desired key or the circuits controlled by the fingering of the manual may be connected to the tone unit in a manner to give any key desired.

Furthermore, a simple shifting device, or automatic transposing device, may be easily inserted in the cable line between the manual and tone unit, to shift the tone leadouts from the manual up or down, one or more semitones, from a normal or specified connection—that is, supposing tone leadout conductor from the manual for the fingering of the note C has been connected to the tone elements on the tone producing device which generate and produce the tone B flat concert, thereby allowing the clarinet to function as a B flat clarinet—then by means of the shifting device this same tone leadout from the manual for the fingering of the note C may be connected to the elements on the tone unit which generate and produce the tone A concert, with a corresponding shift for the remaining tone leadouts from the manual, which will then allow the clarinet to function as an A clarinet. Shifts or transpositions for any desired pitch or key may thus be easily and practically arranged, by following this basic system, and a performer may conveniently have under his command the four keyed clarinets most commonly used at the present time—namely B flat, A, E flat and C clarinets, in addition to a most convenient and accurate means to automatically transpose a single line score up or down one or more semitones.

It has been previously cited in the specification that the range of the electrical clarinet herein set forth, takes in the lowest tone of the bass clarinet and extends one full octave above the practical range of the E flat clarinet (said E flat clarinet sounding a perfect fourth above the B flat clarinet), therefore with the extensive range and the transposition feature explained, the facilities of this instrument in that connection will be immediately manifest.

Throughout the specification attention has been directed to the condition that many of the elements and features of this invention may be changed or modified, or that substitutions may be made without departing from the spirit and basic principles of the invention. It will be apparent to one skilled in the art, that still other changes, modifications and substitutions besides those specifically mentioned, may be made, without departing from the spirit and basic principles of this invention; therefore I desire not to be limited to the exact details set forth herein, and the accompanying claims are intended to include within their scope such obvious modifications, equivalents and substitutions as will be readily suggested to those skilled in the art.

Having described my invention, what I claim as new and wish to secure by Letters Patent is:

1. In an instrument for electromechanically producing musical tones, the combination with a mouthpiece, a fingering manual, and an electrical tone producing unit, of a tone determining system intermediate the manual and the tone producing unit and selectively controlled by manipulation of the manual for the production of musical tones, and pressure responsive means within the mouthpiece and operatively associated with said tone producing unit through the tone determining system for effecting an electrical relation between said system and tone producing unit, whereby fingering of the manual, supplemented by response of said means within the mouthpiece to the breath action of the player, is translated into musical tones.

2. In an instrument for electromechanically producing musical tones, the combination with a mouthpiece, a fingering manual, and an electrical tone producing unit, of a tone determining system intermediate the manual and the tone producing unit and selectively controlled by manipulation of the manual for the production of musical tones, and pressure responsive means within the mouthpiece operatively associated with the tone producing unit through the tone determining system for effecting an electrical relation between said system and tone producing unit, said means being responsive to rapid pressure variations within the mouthpiece, whereby fingering of the manual, supplemented by the response of said means within the mouthpiece to the breath, modified by tongue and throat action of the player, is translated into musical tones.

3. In an instrument for electromechanically producing musical tones, the combination with a mouthpiece, a fingering manual of the type used in connection with a woodwind instrument, and an electrical tone producing unit, of a tone determining system intermediate the manual and tone producing unit and selectively controlled by fingering of the manual for the production of a series of tones, and pressure responsive means within the mouthpiece and operatively associated with the tone producing unit through the tone determining system for effecting its electrical relation with said tone producing unit, said means being responsive to rapid pressure variations within the mouthpiece whereby fingering of the manual, supplemented by the response of said means within the mouthpiece to the breath, modified by the combined tongue and throat action of the player, is translated into musical tones.

4. In an instrument for electromechanically producing musical tones, the combination with a mouthpiece, a fingering manual, and an electrical tone producing unit, of a tone determining system intermediate the manual and tone producing unit, said system including interconnected means electrically related with the tone producing unit for normally producing a predetermined tone but selectively operable by manipulation of the manual for the production of a plurality of different tones, and pressure responsive means within the mouthpiece and operatively associated with the tone producing unit through the tone determining system for establishing an electrical relation between said tone producing unit and said tone determining system, said means being responsive to rapid pressure variations within the mouthpiece, whereby fingering of the manual, supplemented by the response of said means within the mouthpiece to the breath, modified by tongue and throat action of the player, is translated into musical tones.

5. In an instrument for electromechanically producing musical tones, the combination with a mouthpiece, a fingering manual, and an electrical tone producing unit, of a tone determining system intermediate the manual and the tone producing unit and selectively operable by means of manipulation of the manual for the production of a series of musical tones, air pressure responsive means within the mouthpiece and operatively associated with the tone producing unit through the tone determining system for establishing an electrical relation between said tone producing unit and said tone determining system, said pressure responsive means including a device provided with means responsive to rapid pressure variations within the mouthpiece whereby fingering of the manual, supplemented by the response of said device within the mouthpiece to the breath, modified by tongue and throat action of the player, is translated into musical tones.

6. In an instrument for electromechanically producing musical tones, the combination with a mouthpiece, a fingering manual, and an electrical tone producing unit, of a tone determining system intermediate the manual and tone producing unit, said system including interconnected means electrically related to the tone producing unit and normally serving to provide a predetermined tone but selectively operable by manipulation of the manual for the production of a plurality of tones, and pressure responsive means within the mouthpiece and operatively associated with the tone producing unit through the tone determining system for establishing an electrical relation between said tone producing unit and said tone determining system, said means including a device provided with means responsive to pressure variations within the mouthpiece whereby fingering of the manual, supplemented by the response of said device to the breath, modified by the combined tongue and throat action of the player, is translated into musical tones.

7. In an instrument for electromechanically producing musical tones, the combination with a mouthpiece, a fingering manual of the type used in connection with a woodwind instrument, and an electrical tone producing unit, of a tone determining system intermediate the manual and tone producing unit, said system including interconnected means electrically related with said tone producing unit and normally serving to provide a predetermined tone but selectively operable for the production of a plurality of tones, and means within the mouthpiece operatively associated with the tone producing unit through the tone determining system for establishing an electrical relation between said tone producing unit and said tone determining system, said means including a make and break device responsive to rapid pressure variations within the mouthpiece whereby fingering of the manual supplemented by the response of said make and break device to the breath, modified by the combined tongue and throat action of the player, is translated into musical tones.

8. In an instrument for electromechanically producing musical tones, the combination with a mouthpiece, a fingering manual, and an electrical tone producing unit, of a tone determining system including a series of interconnected elements electrically related with the tone producing unit and serving to provide a predetermined tone but selectively operable by manipulation of the manual for the production of a plurality of different tones, and air pressure responsive means within the mouthpiece operatively associated with the tone producing unit through the tone determining system for establishing an electrical relation between said tone producing unit and said tone determining system, said means including a device provided with movable means responsive to rapid pressure variations within the mouthpiece, whereby fingering of the manual, supplemented by the response of said device to the breath, modified by the combined tongue and throat action of the player, is translated into musical tones.

9. In an instrument for electromechanically producing musical tones, the combination with a mouthpiece, a fingering manual of the type used in connection with a woodwind instrument, and an electrical tone producing unit, of a tone determining system including a series of interconnected elements electrically related with said tone producing unit and normally serving to provide a predetermined tone but selectively operable by manipulation of the manual for the production of a plurality of different tones, of air pressure responsive means within the mouthpiece and operatively associated with the tone producing unit through the tone determining system for establishing an electrical relation between said tone producing unit and said tone determining system, said means including a device provided with movable means responsive to rapid pressure variations within the mouthipece whereby fingering of the manual, supplemented by the response of said device to the breath, modified by the tongue and throat action of the player, is translated into musical tones.

10. In an instrument for electromechanically producing musical tones, the combination with a mouthpiece, a fingering manual, and an electrical tone producing unit, of a tone determining system including a series of interconnected elements electrically related with the tone producing unit and normally serving to produce a predetermined tone but selectively operable by manipulation of the manual for the production of a plurality of different tones, and air pressure responsive means within the mouthpiece operatively associated with the tone producing unit through the tone determining system for establishing an electrical relation with said tone producing unit, and said tone determining system, said means including a make and break device of the plunger type responsive to rapid pressure variations within the mouthpiece, whereby fingering of the manual, supplemented by the response of said make and break device to the breath, modified by the combined tongue and throat action of the player, is translated into musical tones.

11. In an instrument for electromechanically producing musical tones, the combination with a mouthpiece, a fingering manual, and an electrical tone producing unit, of a tone determining system including a series of interconnected elements electrically related with said tone producing unit and normally serving to provide a predetermined tone but selectively operable by manipulation of the manual for the production of different tones, and air pressure responsive means within the mouthpiece operatively associated with the tone producing unit through the tone determining system for establishing an electrical relation between said tone producing unit and said tone determining system, said pressure responsive means including a make and break device embodying a retractile movable contact member, and a stationary contact member, said movable member being normally separated from the stationary member but operable into engagement therewith in response to pressure effects within the mouthpiece whereby fingering of the manual, supplemented by the response of said make and break device to the breath, modified by the combined tongue and throat action of the player, is translated into musical tones.

12. In an instrument for electromechanically producing musical tones, the combination with a mouthpiece, a fingering manual of the type used in connection with a woodwind instrument, and an electrical tone producing unit including a series of tone circuits, of a tone determining system intermediate said manual and the tone producing unit, said system including a plurality of switches normally interrelated and electrically related with the tone producing unit to provide a predetermined tone but selectively operable by manipulation of the manual for producing a plurality of tones, one of said switches being located in each of said tone circuits and an air pressure responsive means within the mouthpiece operatively associated with the tone producing unit through the tone determining system for establishing an electrical relation between said tone producing unit and said tone determining system, said pressure responsive means including a make and break device responsive to rapid pressure variations within the mouthpiece whereby fingering of the manual, supplemented by the response of said make and break device to the breath, modified by the combined tongue and throat action of the player, is translated into musical tones.

13. In an instrument for electromechanically producing musical tones, the combination with a mouthpiece, a fingering manual within the framework of the Boehm system, and an electrical tone producing unit provided with a series of tone circuits, of a tone determining system including a series of switches, one of which is disposed in each of said tone circuits, said switches being normally interconnected and electrically related with the tone producing unit to produce a predetermined tone, but selectively operable by manipulation of the manual for the production of a series of tones, and air pressure responsive means within the mouthpiece operatively associated with the tone producing unit through the tone determining system for establishing an electrical relation between said tone producing unit and said tone determining system, said means including a make and break device of the plunger type responsive to rapid variations of pressure within the mouthpiece, whereby fingering of the manual supplemented by the response of said make and break device to the breath, modified by the combined tongue and throat action of the player, is translated into musical tones.

14. In an instrument for electromechanically producing musical tones, the combination with a mouthpiece, a fingering manual and an electrical tone producing unit, of a tone determining system intermediate the manual and the tone producing unit, and controlled by manipulation of said manual for the production of a series of different tones, and pressure responsive means within the mouthpiece operatively associated with the tone producing unit through the tone determining system for establishing an electrical relation between said tone producing unit and said tone determining system, said means being responsive to rapid variations of pressure within the mouthpiece, whereby fingering of the manual, supplemented by the response of said means within the mouthpiece to the breath, modified by the combined tongue and throat action of the player, is translated into musical tones, and a pressure operated device in connection with the mouthpiece and electrically associated with the tone producing unit whereby actuation of said device will provide volume and tremolo control simultaneously with the production of said musical tones.

15. In an instrument for electromechanically producing musical tones, the combination with a mouthpiece, a fingering manual, and an electrical tone producing unit, of a tone determining system including a series of elements normally interconnected and electrically related with the tone producing unit to produce a predetermined tone but selectively operable by manipulation of the manual for the production of a plurality of different tones, and pressure responsive means within the mouthpiece operatively associated with the tone producing unit through the tone determining system for establishing an electrical relation between said tone producing unit and said tone determining system, said means including a device provided with movable means responsive to rapid pressure variations within the mouthpiece, whereby fingering of the manual, supplemented by the response of said device to the breath, modified by the combined tongue and throat action of the player, is translated into musical tones, and a pressure-controlled variable resistance carried by the mouthpiece and associated with the tone producing unit for controlling volume and tremolo simultaneously with the production of said musical tones.

16. In an instrument for electromechanically producing musical tones, the combination with a mouthpiece, a fingering manual, and an electrical tone producing unit, of a tone determining system including a series of elements normally interconnected and electrically related with the tone producing unit to produce a predetermined tone but selectively operable by manipulation of the manual for the production of a plurality of different tones, and air pressure responsive means within the mouthpiece operatively associated with the tone producing unit through the tone determining system for establishing an electrical relation between said tone producing unit and said tone determining system, said means including a make and break device responsive to rapid pressure variations within the mouthpiece, whereby fingering of the manual, supplemented by the response of said make and break device to the breath, modified by the combined tongue and throat action of the player, is translated into musical tones, and a bite-operated device carried by the mouthpiece and electrically associated with the tone producing means whereby actuation of said device provides volume and tremolo control simultaneously with the production of said musical tones.

17. In an instrument for electromechanically producing musical tones, the combination with a mouthpiece, a fingering manual, and an electrical tone producing unit, of a tone determining system including a series of elements normally interconnected and electrically related with said tone producing unit to produce a predetermined tone but selectively operable by manipulation of the manual for the production of a plurality of different tones, air pressure responsive means within the mouthpiece operatively associated with the tone producing unit through the tone determining system for establishing an electrical relation between said tone producing unit and said tone determining system, said means including a make and break device of the plunger type responsive to rapid pressure variations within the mouthpiece, whereby fingering of the manual, supplemented by the response of said make and break device to the breath, modified by the combined tongue and throat action of the player, is translated into musical tones, and a pressure-controlled variable resistance means carried by the mouthpiece and associated with the tone producing means, said means being bite operated by the player for controlling volume and tremolo simultaneously with the production of said musical tones.

18. In an instrument for electromechanically producing musical tones, the combination with a mouthpiece, a fingering manual of the type used in connection with a woodwind instrument, and an electrical tone producing unit including a series of tone circuits, of a tone determining system intermediate said manual and the tone producing unit, said system including a plurality of switches normally interrelated and electrically related with said tone producing unit to produce a predetermined tone, but selectively operable by manipulation of the manual for producing a plurality of tones, one of said switches being located in each of said tone circuits, and air pressure responsive means within the mouthpiece operatively associated with the tone producing unit through the tone determining system for establishing an electrical relation between said tone producing unit and said tone determining system, said pressure responsive means including a make and break device responsive to rapid variations of pressure within the mouthpiece, whereby fingering of the manual, supplemented by the response of said make and break device to the breath, modified by the combined tongue and throat action of the player, is translated into musical tones, and a pressure controlled variable resistance means in connection with the mouthpiece and electrically associated with the tone producing unit, said means being bite operated by the player for controlling volume and tremolo simultaneously with the production of said musical tones.

19. In an instrument for electromechanically producing musical tones, the combination with a mouthpiece, a fingering manual including tone and register keys, an electrical tone producing unit embodying means for production of tones in different registers of pitch, and a register changing mechanism operatively connected with said tone producing unit, of a tone determining system controlled by manipulation of the tone keys and operatively connected with said tone producing unit through said register changing mechanism, a register selecting system coacting with the register keys of the manual for electromagnetically controlling the operation of the register changing mechanism, whereby selective actuation of the register keys will electrically connect the tone determining system and tone producing unit through the register changing mechanism for the production of tones in different registers of pitch, and air pressure responsive means within the mouthpiece and operatively associated with the tone producing unit through the tone determining system and register changing mechanism, for establishing an electrical relation between said tone determining system and said tone producing unit in a register of pitch determined by the register changing mechanism, said means being responsive to pressure variations within the mouthpiece, whereby fingering of the manual, supplemented by response of said means within the mouthpiece to the breath action of the player, is translated into musical tones produced in a selected register of pitch.

20. In an instrument for electromechanically producing musical tones, the combination with a mouthpiece, a fingering manual including tone and register keys, an electrical tone producing unit embodying means for the production of tones in different registers of pitch, and a register changing mechanism operatively associated with the tone producing unit, of a tone determining system controlled by manipulation of the tone keys and operatively associated with said tone producing unit through said register changing mechanism, said tone determining system and said tone producing unit being normally interconnected through said register changing mechanism for the production of a predetermined tone in a single register of pitch, a register selecting system coacting with the register keys and controlling the operation of the register changing mechanism whereby selective actuation of the register keys will electrically connect the tone determining system and tone producing unit through the register changing mechanism for the production of tones in different registers of pitch, and air pressure responsive means within the mouthpiece operatively associated with the tone producing unit through said tone determining system and said register changing mechanism for establishing an electrical relation between said tone producing unit and said tone determining system, said means being responsive to pressure variations within the mouthpiece, whereby fingering of the manual, supplemented by the response of said means in the mouthpiece to the breath action of the player, is translated into musical tones produced in a selected register of pitch.

21. In an instrument for electromechanically producing musical tones, the combination with a mouthpiece, a fingering manual including tone and register keys, an electrical tone producing unit embodying means for the production of tones in different registers of pitch, and a register changing mechanism operatively associated with the tone producing unit, of a tone determining system controlled by manipulation of the tone keys and operatively connected with said tone producing unit through said register changing mechanism, said tone determining system including a series of elements normally arranged to interconnect said tone determining system with said tone producing unit through said register changing mechanism for the production of a predetermined tone in a single register of pitch, a register selecting system coacting with the register keys and controlling the operation of the register changing mechanism whereby selective actuation of the register keys will electrically connect the tone determining system and tone producing unit through the register changing mechanism for the production of tones in different registers of pitch, and air pressure responsive means within the mouthpiece operatively associated with said tone producing unit for establishing an electrical connection between said tone determining system and said tone producing unit through said register changing mechanism, said means including a make and break device responsive to rapid pressure variations within the mouthpiece, whereby fingering of the manual, supplemented by manipulation of the register keys, and response of said make and break device to the breath modified by the combined tongue and throat action of the player, is electrically translated into musical tones produced in a selected register of pitch.

22. In an instrument for electromechanically producing musical tones, the combination with a mouthpiece, a fingering manual of the type used in connection with a woodwind instrument and including tone and register keys, an electrical tone producing unit embodying means for the production of tones in different registers of pitch, and a register changing mechanism operatively associated with the tone producing unit, of a tone determining system controlled by manipulation of the tone keys and operatively connected with said tone producing unit through said register changing mechanism, said tone determining system including a series of switches normally arranged to interconnect said tone determining system with the tone producing unit through said register changing mechanism for the production of a predetermined tone in a single register of pitch, a register selecting system coacting with the register keys and controlling the action of the register changing mechanism whereby selective actuation of the register keys will electrically connect the tone determining system and tone producing unit through the register changing mechanism for the production of tones in different registers of pitch, and pressure responsive means within the mouthpiece operatively associated with the tone determining system for establishing an electrical connection between said tone determining system and said tone producing unit through said register changing mechanism, said means including a make and break device responsive to rapid pressure variations within the mouthpiece, whereby fingering of the manual, supplemented by response of said make and break device to the breath modified by the combined tongue and throat action of the player, is electrically translated into musical tones produced in a selected register of pitch.

23. In an instrument for electromechanically producing musical tones, the combination of a mouthpiece, a fingering manual of the type used in connection with a woodwind instrument and including tone and register keys, an electrical tone producing unit embodying means for the production of tones in different registers of pitch, and a register changing mechanism operatively associated with the tone producing unit, of a tone determining system controlled by manipulation of the tone keys and operatively connected with said tone producing unit through said register changing mechanism, said tone determining system including a series of switches normally arranged to interconnect said tone determining system with the tone producing unit through said register changing mechanism for the production of a predetermined tone in a single register of pitch, a register selecting system coacting with the register keys and controlling the operation of the register changing mechanism whereby selective actuation of the register keys will electrically connect the tone determining system and tone producing unit through the register changing mechanism for the production of tones in different registers of pitch, and air pressure responsive means within the mouthpiece operatively associated with the tone producing unit through the register changing mechanism for establishing an electrical connection between said tone determining system and tone producing unit, said means including a make and break device of the plunger type responsive to rapid pressure variations within the mouthpiece, whereby fingering of the manual supplemented by response of said make and break device to the breath modified by the combined tongue and throat action of the player, is electrically translated into musical tones produced in a selected register of pitch.

24. In an instrument for electromechanically producing musical tones, the combination with a mouthpiece, a fingering manual within the framework of the Boehm system and including tone and register keys, a tone producing unit including means for the production of tones in different registers of pitch, and a register changing mechanism operatively associated with the tone producing unit, of a tone determining system controlled by manipulation of the tone keys and operatively connected with said tone producing unit through said register changing mechanism, said tone determining system including a plurality of switches normally positioned to connect said tone determining system with said tone producing unit through the register changing mechanism for the production of a predetermined tone in a single register of pitch, a register selecting system coacting with the register keys and electromagnetically controlling the operation of the register changing mechanism, said register selecting system including a plurality of interconnected switches selectively operable by the register keys whereby actuation of the register keys will effect connection of the tone determining system and tone producing unit through the register changing mechanism for the production of tones in different registers of pitch, and air pressure responsive means within the mouthpiece operatively associated with the tone producing unit through the register changing mechanism for establishing an electrical relation between said tone determining system and said tone producing unit, said means including a make and break device responsive to rapid variations of pressure within the mouthpiece, whereby fingering of the tone keys supplemented by manipulation of the register keys, and the response of said make and break device to the breath, modified by the combined tongue and throat action of the player, is translated into musical tones produced in a selected register of pitch.

25. In an instrument for electromechanically producing musical tones, the combination with a mouthpiece, a fingering manual within the framework of the Boehm system and including tone and register keys, an electrical tone producing unit including means for the production of tones in different registers of pitch, and a register changing mechanism operatively associated with the tone producing unit, of a tone determining system controlled by manipulation of the tone keys and operatively connected with said tone producing unit through said register changing mechanism, said system including a plurality of switches normally positioned to connect the tone determining system to the tone producing unit through the register changing mechanism for the production of a predetermined tone in a single register of pitch, a register selecting system coacting with the register keys and electromagnetically controlling the operation of the register changing mechanism, said register selecting system including a plurality of interrelated switches selectively operable by the register keys whereby actuation of the register keys will effect an electrical connection between the tone determining system and tone producing unit through the register changing mechanism for the production of tones in different registers of pitch, and air pressure responsive means within the mouthpiece operatively associated with the tone producing unit through the tone determining system and register changing mechanism for establishing an electrical relation between said tone determining system and said tone producing unit, said means including normally separated movable and stationary contact members, said movable member being responsive to rapid variations of pressure within the mouthpiece to engage said stationary member, whereby fingering of the tone keys, supplemented by manipulation of the register keys, and the response of said movable member to the breadth, modified by tongue and throat action of the player, is translated into musical tones produced in a selected register of pitch.

26. An instrument of the character described, comprising a frame provided with a fingering manual including a series of different keys, a mouthpiece attached to the frame, pressure responsive means within the mouthpiece and including normally separated movable and stationary members, said movable member being responsive to pressure variations within the mouthpiece to engage said stationary member, a tone determining system within the frame and including a plurality of electrically related switches adapted to be selectively actuated by manipulation of said keys, said system being provided with a single electrical input formed by the stationary member of said pressure responsive means and a plurality of electrical output terminals, said input and output terminals defining a number of paths through the tone determining system produced by actuation of said switches, a terminal panel mounted upon the frame intermediate its ends and formed with an input and a series of output contacts, the input contact being electrically connected with a movable member of said pressure responsive means and the output contacts with the output terminals of the tone determining system, whereby manipulation of the fingering manual supplemented by the engagement of the movable and stationary members of the pressure responsive means will effect an electrical connection between the input contact of the terminal panel and one of its output contacts through one of the paths of said tone determining system, the selection of the path being determined by the fingering of the manual.

27. An instrument of the character described, comprising a tubular frame provided with a fingering manual including a series of different keys, a mouthpiece attached to the frame, air pressure responsive means within the mouthpiece including normally separated movable and stationary members, said movable member being responsive to pressure effects within the mouthpiece to engage said stationary member, a core fitted within the frame, a tone determining system carried by the core and including a plurality of electrically related switches adapted to be selectively actuated by the manipulation of the keys of said manual, said system being provided with a single electrical input formed by the stationary member of said pressure responsive means and a plurality of electrical output terminals, said input and output terminals defining a number of paths through the tone determining system determined by actuation of said switches, a terminal panel mounted upon the frame intermediate its ends and formed with an input and a series of output contacts, the input contact being electrically connected with the movable member of said pressure responsive means and the output contacts with the output terminals of the tone determining system whereby manipulation of the fingering manual supplemented by the engagement of the movable and stationary members of the pressure responsive means will effect an electrical connection between the input contact of the terminal panel and one of its output contacts through one of the paths of said tone determining system, the selection of the path being determined by the fingering of the manual.

28. An instrument of the character described, comprising a tubular frame provided with a fingering manual of the type used in connection with a woodwind instrument and including a series of different keys, a mouthpiece attached to the frame, a make and break pressure responsive device within the mouthpiece including normally separated movable and stationary members, said movable member being responsive to pressure variations within the mouthpiece to engage said stationary member, a tone determining system within the frame and including a plurality of electrically related switches adapted to be selectively actuated by manipulation of said keys, said system being provided with a single electrical input formed by the stationary member of said pressure responsive means and a plurality of electrical output terminals, said input and output terminals defining a number of paths through the tone determining system determined by actuation of said switches, a terminal panel mounted upon the frame intermediate its ends and formed with an input and a series of output contacts, the input contact being electrically connected with the movable member of said pressure responsive means and the output contacts with the output terminals of the tone determining system whereby manipulation of the fingering manual supplemented by the engagement of the movable and stationary members of the pressure responsive means will establish an electrical connection between the input contact of the terminal panel and one of its output contacts through one of the paths of said tone determining system, the selection of the paths being determined by the fingering of the manual.

29. An instrument of the character described, comprising a tubular frame provided with a fingering manual of the type used in connection with a woodwind instrument and including tone and register keys, a mouthpiece attached to the frame, a make and break pressure responsive device within the mouthpiece including normally separated movable and stationary members, said movable member being responsive to pressure variations within the mouthpiece to engage said stationary member, a core removably positioned within the frame, a tone determining system carried by the core and including a plurality of switches interrelated and adapted to be actuated by manipulation of the tone keys of said manual, said system being provided with a single electrical input formed by the stationary member of said make and break pressure responsive device and a plurality of electrical output terminals, said input and output terminals defining a number of paths through the tone determining system determined by actuation of said tone keys, a terminal panel mounted upon the frame intermediate its ends and formed with an input and a series of output contacts, the input contact being electrically connected with the movable member of said make and break device and the output contacts with the output terminals of the tone determining system, whereby fingering of the manual supplemented by the engagement of the movable and stationary members of the make and break device will establish an electrical connection between the input contact of the terminal panel and one of the output contacts through a selected path of the tone determining system, the selection of the path being determined by the fingering of the manual, and a register selector system carried by said core and controlled by said register keys, and means on said terminal panel constituting input and output contacts for said register selector system.

30. A musical instrument mouthpiece adapted to be attached to a musical instrument of the woodwind type wherein manipulation of the manual is electromechanically translated into musical tones, and comprising a body portion formed at one end with an air inlet communicating with one end of a passage extending through said body portion, and air pressure responsive electric switching means disposed within and closing the opposite end of said passage, said means including a movable member responsive to variations of pressure within said passage produced by the breath of the player.

31. A musical instrument mouthpiece adapted to be attached to a musical instrument of the woodwind type wherein manipulation of the manual is adapted to be electromechanically translated into musical tones, and comprising a body portion formed at one end with an air inlet opening into one extremity of a passage extending longitudinally of the body portion, and air pressure responsive electric switching means disposed within and closing said passage, said means including a reciprocatory plunger normally retained against movement but responsive to air pressure effects within said passage produced by the breath modified by the combined tongue and throat action of the player.

32. A musical instrument mouthpiece adapted to be attached to a musical instrument of the woodwind type wherein manipulation of the manual is adapted to be electromechanically translated into musical tones, and comprising a body portion formed at one end with a restricted air inlet opening into one extremity of a passage extending longitudinally of the body portion, and air pressure responsive electric switching means disposed within and closing the opposite end of said passage, said means including a reciprocatory plunger, resilient means normally restraining said plunger against movement, said means being responsive to variations of pressure within said passage produced by the breath modified by the combined tongue and throat action of the player.

33. A musical instrument mouthpiece adapted to be attached to a musical instrument of the woodwind type wherein manipulation of the manual is electromechanically translated into musical tones, and comprising a body portion formed at one end with an air inlet communicating with one extremity of a passage in said body portion, and air pressure responsive electric switching means disposed within and closing the opposite end of said passage, said means including a movable member responsive to variations of pressure within said mouthpiece produced by the breath of the player.

34. A musical instrument mouthpiece adapted to be attached to a musical instrument of the woodwind type wherein manipulation of the manual is electromechanically translated into musical tones, and comprising a body portion formed at one end with an air inlet communicating with one extremity of a passage formed interiorly of said body portion, said passage being provided with an air vent to the exterior of the body, and air pressure responsive electric switching means disposed within and closing the opposite end of said passage, said means including a reciprocatory plunger normally restrained but responsive to pressure effects within said passage produced by the breath modified by the combined throat and tongue action of the player.

LEO F. J. ARNOLD.

CERTIFICATE OF CORRECTION.

Patent No. 2,301,184.  November 10, 1942.

LEO F. J. ARNOLD.

It is hereby certified that error appears in the printed specification of the above numbered patent requiring correction as follows: Page 8, second column, line 31, for "Fig. 23" read --Fig. 22--; page 12, first column, line 19, for "Fig. 20c" read --Fig. 22c--; page 13, first column, line 43, for "Key" read --Keys--; page 17, second column, line 12, for "Fig. 25" read --Fig. 35--; line 14, for "reelased" read --released--; page 27, first column, line 27, for "indicates" read --indicate--; and second column, line 22, for "thus" read --plus--; and that the said Letters Patent should be read with this correction therein that the same may conform to the record of the case in the Patent Office.

Signed and sealed this 9th day of March, A. D. 1943.

(Seal)

Henry Van Arsdale,
Acting Commissioner of Patents.